US012783102B2

(12) United States Patent
Wallace

(10) Patent No.: US 12,783,102 B2
(45) Date of Patent: Nov. 3, 2026

(54) COMMERCIAL KITCHEN GRILL STATION COMPUTING DEVICE AND METHOD

(71) Applicant: Perfect Company, Vancouver, WA (US)

(72) Inventor: Michael W Wallace, Vancouver, WA (US)

(73) Assignee: Perfect Company

( * ) Notice: Subject to any disclaimer, the term of this patent is extended or adjusted under 35 U.S.C. 154(b) by 0 days.

(21) Appl. No.: 19/075,433

(22) Filed: Mar. 10, 2025

(65) Prior Publication Data

US 2025/0231662 A1 Jul. 17, 2025

Related U.S. Application Data

(63) Continuation of application No. PCT/US2024/014683, filed on Feb. 6, 2024.

(60) Provisional application No. 63/443,695, filed on Feb. 6, 2023.

(51) Int. Cl.
*A47J 36/32* (2006.01)
*G06F 3/04817* (2022.01)
*G06Q 50/12* (2012.01)

(52) U.S. Cl.
CPC .......... *G06F 3/04817* (2013.01); *A47J 36/32* (2013.01)

(58) Field of Classification Search
CPC .. G06F 3/04817; A47J 36/32; G06Q 10/0633; G06Q 10/0639; G06Q 10/0874; G06Q 30/0635; G06Q 50/12
USPC .......................................................... 715/835
See application file for complete search history.

(56) References Cited

U.S. PATENT DOCUMENTS

2005/0021407 A1 1/2005 Kargman
2009/0193364 A1* 7/2009 Jarrett ................. G06F 3/04817 715/838
2012/0185789 A1* 7/2012 Louch ................... G06F 3/0488 715/769
2013/0130208 A1 5/2013 Riscalla
(Continued)

FOREIGN PATENT DOCUMENTS

CN 108369479 A * 8/2018 ......... G06F 3/04886
KR 20030086865 12/2003

OTHER PUBLICATIONS

Shane Thomas, Written Opinion of the International Searching Authority, PCT/US2024/014683, Jul. 25, 2024, pp. 1-14, ISA/USPTO, Alexandria VA, USA.
(Continued)

*Primary Examiner* — Russell S Glass
(74) *Attorney, Agent, or Firm* — Rylander & Associates, PC; Philip R.M. Hunt

(57) ABSTRACT

A system and method for a commercial kitchen order processing and workstation management. A grill station computing device provides visual guidance for completing the tasks at a grill station in the commercial kitchen. A plurality of grill lanes are presented on the grill station user interface, corresponding to lanes on a physical grill. Each of the grill lanes is divided into a queue grill lane and an active grill lane. Icons representing ingredients to be grilled are presented in the queue grill lanes. Upon user input, an icon representing an ingredient can be moved from the queue portion of a grill lane to an active portion of the same grill lane, indicating that the ingredient has been placed on the corresponding lane on the physical grill.

24 Claims, 85 Drawing Sheets

(56) References Cited

U.S. PATENT DOCUMENTS

| | | | | |
|---|---|---|---|---|
| 2013/0339905 | A1* | 12/2013 | Liu | G06F 16/22 715/835 |
| 2017/0024789 | A1* | 1/2017 | Frehn | G06Q 50/12 |
| 2020/0121125 | A1 | 4/2020 | Zito | |
| 2020/0357083 | A1 | 11/2020 | Wallace | |
| 2022/0108250 | A1 | 4/2022 | Pietz | |
| 2022/0292834 | A1* | 9/2022 | DeSantola | G06N 20/00 |
| 2024/0029019 | A1 | 1/2024 | Litzenberger | |

OTHER PUBLICATIONS

Shane Thomas, International Search Report, PCT/US2024/014683, Jul. 25, 2024, pp. 1-4, ISA/USPTO, Alexandria VA, USA.

Russell Glass, International Preliminary Report on Patentability, PCT/US2024/014683, Jan. 15, 2025, pp. 1-131, IPEA/USPTO, Alexandria VA, USA.

* cited by examiner

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.19B

FIG.17A

Cont. From FIG.19A

Child Build List for California Steakburger

| Ingredients | Plain | Split | Weight |
|---|---|---|---|
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
|---|---|---|---|---|---|
| Bun Top | | | | | |
| Onion Slice | | | | | |
| American Cheese | | | | | |
| Steakburger Patty | | | | | |
| Tomato | | | | | |
| Lettuce | | | | | |
| Thousand Island | | | | | |
| Bun Bottom | | | | | |

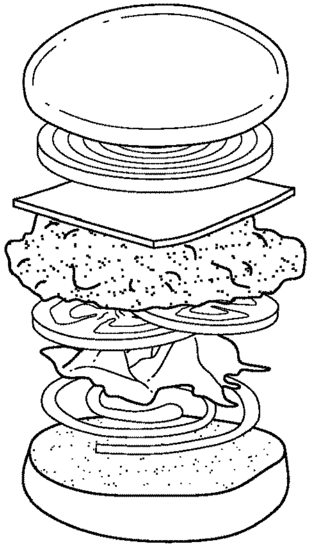

FIG.17B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.20B

FIG.18A

Cont. From FIG.20A

Child Build List for California Steakburger

| Ingredients | Plain | Split | Weight |
| --- | --- | --- | --- |
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
| --- | --- | --- | --- | --- | --- |
| Bun Top | | | | | |
| ~~Onion Slice~~ | | | | | |
| American Cheese | | | | | |
| Steakburger Patty | | | | | |
| ~~Tomato~~ | | | | | |
| Lettuce | | | | | |
| Thousand Island | | | | | |
| Bun Bottom | | | | | |

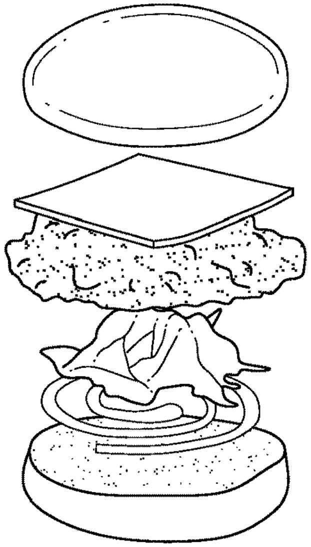

FIG.18B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.21B

FIG.19A

Cont. From FIG.21A

Child Build List for California Steakburger

| Ingredients | Plain | Split | Weight |
|---|---|---|---|
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
|---|---|---|---|---|---|
| Bun Top | | | | | |
| American Cheese | | | | | |
| Steakburger Patty | | | | | |
| Lettuce | | | | | |
| ~~Thousand Island~~ | | | | | |
| Ketchup | | | | | |
| Bun Bottom | | | | | |

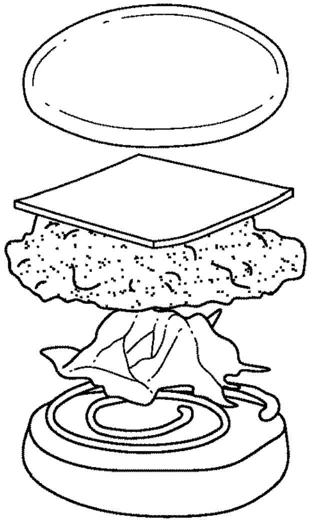

FIG.19B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.22B

FIG. 20A

Cont. From FIG.22A

Child Build List for California Steakburger

| Ingredients | Plain | Split | Weight |
|---|---|---|---|
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
|---|---|---|---|---|---|
| Bun Top | | | | | |
| American Cheese | | | | | |
| Steakburger Patty | | | | | |
| American Cheese | | | | | |
| Steakburger Patty | | | | | |
| Lettuce | | | | | |
| Ketchup | | | | | |
| Bun Bottom | | | | | |

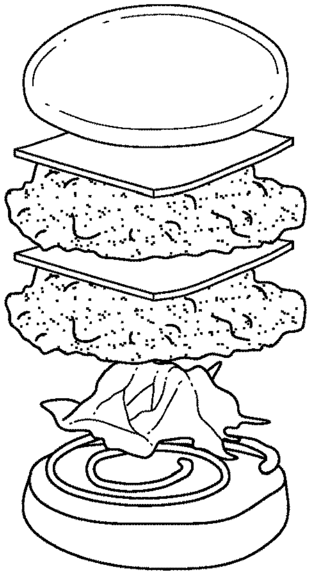

FIG. 20B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries

California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.23B

FIG. 21A

Cont. From FIG.23A

Child Build List for California Steakburger

| Ingredients | Plain | Split | Weight |
|---|---|---|---|
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
|---|---|---|---|---|---|
| Bun Top | | | | | |
| Swiss Cheese | | | | | |
| Steakburger Patty | | | | | |
| Swiss Cheese | | | | | |
| Steakburger Patty | | | | | |
| Lettuce | | | | | |
| Ketchup | | | | | |
| Bun Bottom | | | | | |

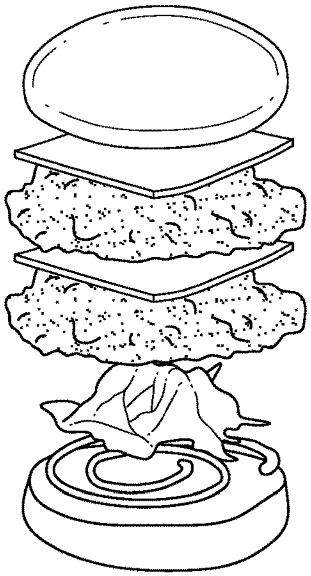

FIG. 21B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries Sandwich #2
Stk
Lg Fries California Steakburger Master Build List

| Ingredients | Substitution Group | Attach to | Weight | Grill | Fry |
|---|---|---|---|---|---|
| Bun Top | A | | | | |
| Lettuce Square | A | | | | |
| Rye Bread | A | | | | |
| Green Chile | | | | | |
| Saurkraut | | | | | |
| Relish | | | | | |
| Pickle | | | | | |
| Onion Slice | B | | | | |
| Crispy Onions | B | | | | |
| Onion | B | | | | |
| Diced Onion | B | | | | |
| Grilled Onion | B | | | X | |
| Grilled Jalapenos | | | | X | |
| Bacon | | | | | |
| Chili | | | | | |
| Blue Cheese Crumbles | C | Steakburger Patty | | | |
| Cheese Sauce | C | Steakburger Patty | | | |
| American Cheese | C | Steakburger Patty | | | |
| Monterrey Cheddar | C | Steakburger Patty | | | |
| Swiss Cheese | C | Steakburger Patty | | | |
| Pepperjack Cheese | C | Steakburger Patty | | | |
| Steakburger Patty | | | | X | |
| Tomato | | | | | |
| Lettuce | | | | | |
| Thousand Island | D | | | | |
| Ketchup | D | | | | |
| Mustard | D | | | | |
| Mayo | D | | | | |
| Fry Sauce | D | | | | |
| Spicy Fry Sauce | D | | | | |
| French Onion Sauce | D | | | | |
| Creamy Buffalo Sauce | D | | | | |
| BBQ Sauce | E | | | | |
| Bun Bottom | E | | | | |
| Lettuce Square | E | | | | |
| Rye Bread | E | | | | |

Cont. On FIG.24B

FIG. 22A

Cont. From FIG.24A

Child Build List for California Steakburger

| Ingredients | Plain | Split | Weight |
|---|---|---|---|
| Bun Top | X | Top | |
| Onion Slice | | Top | |
| American Cheese | X | Bottom | |
| Steakburger Patty | X | Bottom | |
| Tomato | | Bottom | |
| Lettuce | | Bottom | |
| Thousand Island | X | Bottom | |
| Bun Bottom | X | Bottom | |

Digital Order

Order Item #1

| Ingredients | Extra | Light | On the side | Well Done | No Seasoning |
|---|---|---|---|---|---|
| Bun Top | | | | | |
| Swiss Cheese | | | | | |
| Steakburger Patty | | | | X | |
| Swiss Cheese | | | | | |
| Steakburger Patty | | | | X | |
| Lettuce | | | | | |
| Ketchup | | | | | |
| Bun Bottom | | | | | |

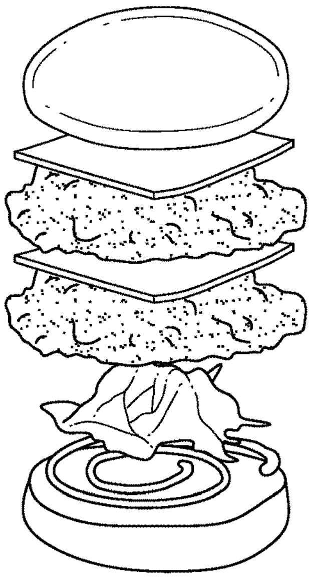

FIG. 22B

Order Number: 126

Station: Perfect Printer Test

Date: 1/19/2023 7:38:20 PM

Register: Register 1
Server: IT Test

Carryout

Sandwich #1
Cal
Only Lettuce
Sub Ketchup
Extra Patty
Sub Swiss
Well Done
Med Fries

Sandwich #2
Stk
Lg Fries

Medium Fries Master Build List

| Ingredients | Substitution Group | Attach to | Weight | Grill | Fry |
|---|---|---|---|---|---|
| Diced Onion | A | | | | |
| Cheese Sauce | A | | | | |
| Chili | A | | | | |
| Medium Fries | | | | | |

Medium Fries Child Build List

| Ingredients | Plain | Split | Weight |
|---|---|---|---|
| Medium Fries | | | |

Digital Order

Order Sub Item #1

| Ingredients | Extra | Light | On the side | Well Done | No Seasoning |
|---|---|---|---|---|---|
| Medium Fries | | | | | |

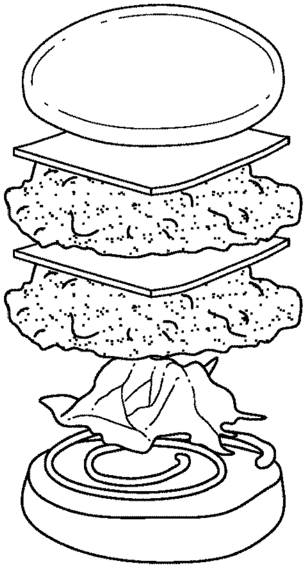

FIG. 23

California Steakburger Master Build List

Cont. From FIG.26A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.26C

FIG. 24B

Cont. From FIG.26B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| Onion Slice | | | | | |
| American Cheese | | | | | |
| Steakburger Patty | | | | | |
| Tomato | | | | | |
| Lettuce | | | | | |
| Thousand Island | | | | | |
| Bun Bottom | | | | | |

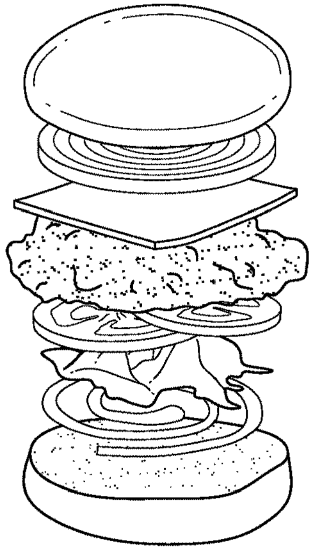

FIG. 24C

California Steakburger Master Build List

Cont. From FIG.27A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.27C

FIG. 25B

Cont. From FIG.27B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| Onion Slice | | | | | |
| American Cheese | | | | | |
| Steakburger Patty | | | | | |
| Tomato | | | | | |
| Lettuce | | | | | |
| ~~Thousand Island~~ | | | | | |
| Bun Bottom | | | | | |

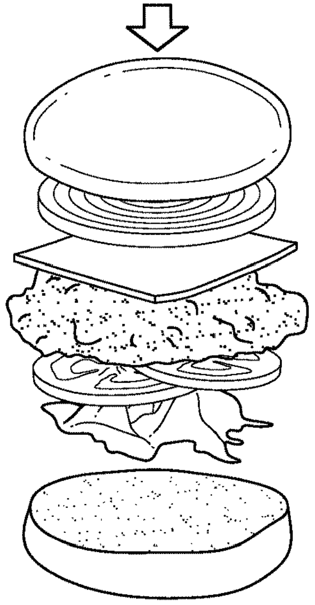

FIG. 25C

California Steakburger Master Build List

Cont. From FIG.28A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.28C

FIG. 26B

Cont. From FIG.28B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| French Onion Sauce | | | | | |
| Onion Slice | | | | | |
| American Cheese | | | | | |
| Steakburger Patty | | | | | |
| Tomato | | | | | |
| Lettuce | | | | | |
| French Onion Sauce | | | | | |
| Bun Bottom | | | | | |

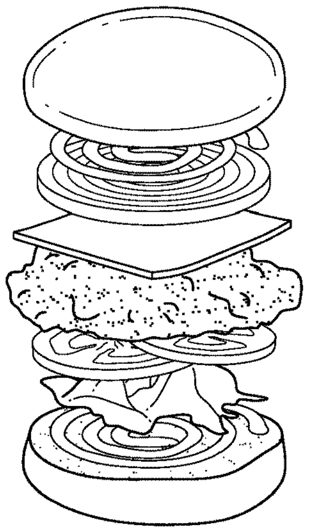

FIG. 26C

California Steakburger Master Build List

Cont. From FIG.29A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.29C

FIG. 27B

Cont. From FIG.29B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| Pickle | | | | | |
| Onion Slice | | | | | |
| American Cheese | | | | | |
| Steakburger Patty | | | | | |
| Tomato | | | | | |
| Lettuce | | | | | |
| Thousand Island | | | | | |
| Bun Bottom | | | | | |

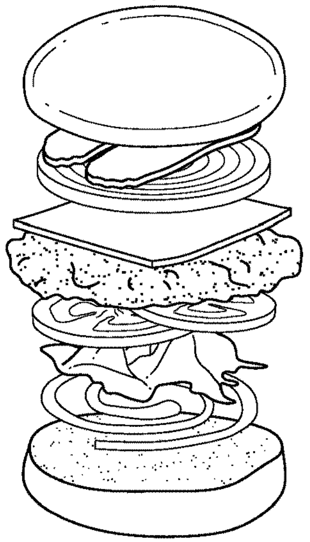

FIG. 27C

California Steakburger Master Build List

Cont. From FIG.30A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.30C

FIG. 28B

Cont. From FIG.30B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| Pickle | | | | | |
| American Cheese | | | | | |
| Steakburger Patty | | | | | |
| Thousand Island | | | | | |
| Bun Bottom | | | | | |

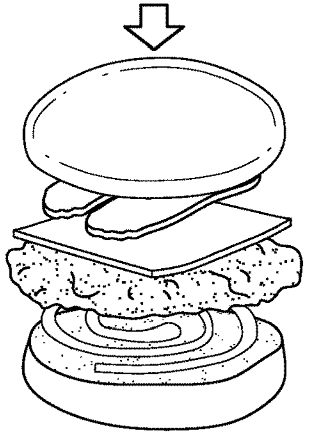

FIG. 28C

California Steakburger Master Build List

Cont. From FIG.31A

| Ingredients | Quantity | Extra | Light | Substitution Group | Plain | Split |
|---|---|---|---|---|---|---|
| Bun Top | 1 | n/a | n/a | A | X | Top |
| Lettuce Square | 1 | n/a | n/a | A | | Top |
| Rye Bread | 1 | n/a | n/a | A | | Top |
| French Onion Sauce | 1 ring | 2 rings | .5 rings | D | | Top |
| Creamy Buffalo Sauce | 3 rings | 6 rings | 1 ring | D | | Top |
| Green Chile | 1 oz | 2 oz | .5 oz | | | Top |
| Relish | 1 oz | 2 oz | .5 oz | | | Top |
| Pickle | 2 slices | 4 in # pattern | 1 Pickle | | | Top |
| Onion Slice | 1 slice | 2 slices | 3 rings | B | | Top |
| Crispy Onions | 2 oz | 4 oz | 1 oz | B | | Top |
| Onion | 3 rings | Onion Slice | 1 ring | B | | Top |
| Diced Onion | 1 oz | 2 oz | .5 oz | B | | Top |
| Grilled Jalapenos | 5 slices | 10 slices | 3 slices | | | Top |
| Sauerkraut | 1 oz | 2 oz | .5 oz | | | Bottom |
| Grilled Onion | 1 oz | 2 oz | .5 oz | B | | Bottom |
| Bacon | 2 slices | 4 slices | 1 slice | | | Bottom |
| Chili | 1 ladel | 2 ladels | .5 ladel | | | Bottom |
| Blue Cheese Crumbles | 2 oz | 4 oz | 1 oz | C | | Bottom |
| Cheese Sauce | 1 oz | 4 oz | .5 oz | C | | Bottom |
| American Cheese | 1 2 3 slice | 2 4 6 slices | .5 1 2 | C | X | Bottom |
| Monterrey Cheddar | 1 oz | 2 oz | .5 oz | C | | Bottom |
| Swiss Cheese | 1 2 3 slice | 2 4 6 slices | .5 1 2 | C | | Bottom |
| Pepperjack Cheese | 1 2 3 slice | 2 4 6 slices | .5 1 2 | C | | Bottom |
| Steakburger Patty | 1 2 3 | n/a | n/a | | X | Bottom |
| Tomato | 2 slices | 4 slices | 1 slice | | | Bottom |
| Lettuce | | Double | half | | | Bottom |
| Thousand Island | 2 rings | 4 rings | 1 ring | D | X | Bottom |
| Ketchup | 2 rings | 4 rings | 1 ring | D | | Bottom |
| Mustard | 3 rings | 6 rings | 2 rings | D | | Bottom |
| Mayo | 2 rings | 4 rings | 1 ring | D | | Bottom |
| Fry Sauce | 3 rings | 6 rings | 2 rings | D | | Bottom |
| Spicy Fry Sauce | 3 rings | 6 rings | 2 rings | D | | Bottom |
| French Onion Sauce | 1 ring | 2 rings | .5 rings | D | | Bottom |
| Creamy Buffalo Sauce | 3 rings | 6 rings | 1 ring | D | | Bottom |
| BBQ Sauce | 3 rings | 6 rings | 2 rings | D | | Bottom |
| Bun Bottom | 1 | n/a | n/a | | X | Bottom |
| Lettuce Square | 1 | n/a | n/a | Bun Bottom | | Bottom |
| Rye Bread | 1 | n/a | n/a | Bun Bottom | | Bottom |

Cont. On FIG.31C

FIG. 29B

Cont. From FIG.31B

California Steakburger Child Build List

| Ingredients | Quantity | Extra | Light | Substitution Group | Plain | Split |
|---|---|---|---|---|---|---|
| Bun Top | 1 | | | | X | Top |
| Onion Slice | 1 slice | Add 1 | 3 rings | | | Top |
| American Cheese | 1 slice | Add 1 | .5 slices | | X | Bottom |
| Steakburger Patty | 1 | Add 1 | n/a | | X | Bottom |
| Tomato | 2 slices | 4 slices | 1 slice | | | Bottom |
| Lettuce | 1 | 2 | .5 | | | Bottom |
| Thousand Island | 2 rings | 4 rings | 1 ring | | X | Bottom |
| Bun Bottom | 1 | | | | X | Bottom |

Digital Order

Order Item #1

| Ingredients | Extra | Light | On the side | Well Done | No Seasoning |
|---|---|---|---|---|---|
| Bun Top | | | | | |
| Pickle | | | | | |
| Bacon | | | | | |
| American Cheese | | | | | |
| Steakburger Patty | | | | | |
| Thousand Island | | | | | |
| Bun Bottom | | | | | |

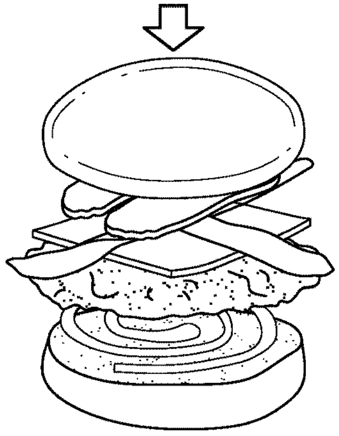

FIG. 29C

COMMERCIAL KITCHEN GRILL STATION COMPUTING DEVICE AND METHOD

CROSS-REFERENCE TO RELATED APPLICATIONS

This application is a continuation of International Application No. PCT/US24/14683, filed 2024 Feb. 6. This application claims the benefit of U.S. Provisional Application No. 63/443,695, filed 2023 Feb. 6, incorporated herein by reference.

TECHNICAL FIELD

This specification relates to management systems for commercial kitchens. More particularly, the present specification relates to electronic order processing and workstation workflow management.

BACKGROUND

The days are long gone when most restaurants took orders on paper order tickets which were then passed to the kitchen crew, who hung them above a workstation for reference. The old paper system has long been replaced with electronic Point of Sale (POS) systems in which customer orders are entered and transmitted to Kitchen Display System (KDS) displays positioned above kitchen workstations. FIG. 1 shows a typical KDS display 100. However, the typical KDS does little more than just display order tickets on an electronic display. It is still up to the kitchen staff to figure out the tasks and work flow to fulfill the orders.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

FIGS. 17A-17B show a digital order with an arrow pointing to a first order item name (Cal).

FIGS. 18A-18B show a digital order with an arrow pointing to a modifier (Only) and an ingredient (Lettuce).

FIGS. 19A-19B show a digital order with an arrow pointing to a modifier (Sub) and an ingredient (Ketchup).

FIGS. 20A-20B show the digital order with an arrow pointing to a modifier (Extra) and an ingredient (Patty).

FIGS. 21A-21B show a digital order with an arrow pointing to a modifier (Sub) and an ingredient (Swiss).

FIGS. 22A-22B show a digital order with an arrow pointing to a modifier (Well Done).

FIG. 23 shows a digital order with an arrow pointing to a second order item name (Med Fries).

FIGS. 24A-24C show a digital order with an arrow pointing to a modifier (Sub) and an ingredient (French Onion Sauce).

FIGS. 25A-25C show an ingredient (Thousand Island) removed from the digital order item.

FIGS. 26A-26C show two instances of an ingredient (French Onion Sauce) added to the digital order item.

FIGS. 27A-27C show a digital order with an arrow pointing to a modifier (Sub) and an ingredient (Pickle).

FIGS. 28A-28C show the digital order with an arrow pointing to a modifier (Only) and an ingredient (Pickle).

FIGS. 29A-29C show a digital order with an arrow pointing to a modifier (Only) and an ingredient (Bacon).

DETAILED DESCRIPTION

In describing the one or more representative embodiments of the inventive subject matter, use of directional terms such as "upper," "lower," "above," "below", "in front of," "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. Any embodiment described as "comprising" includes the case of "consisting only of." The scope of the inventive subject matter should not be limited by the particular embodiments herein described but should be defined only by the appended claims and equivalents thereof.

Kitchen Workstations

Commercial kitchens are typically organized into workstations. Typically, there are one or more grill stations where food is cooked, one or more build stations where order items are assembled, and one or more pack stations where order items are packed. The arrangement varies but typically the build stations are located next to the grill station.

Figure 1:
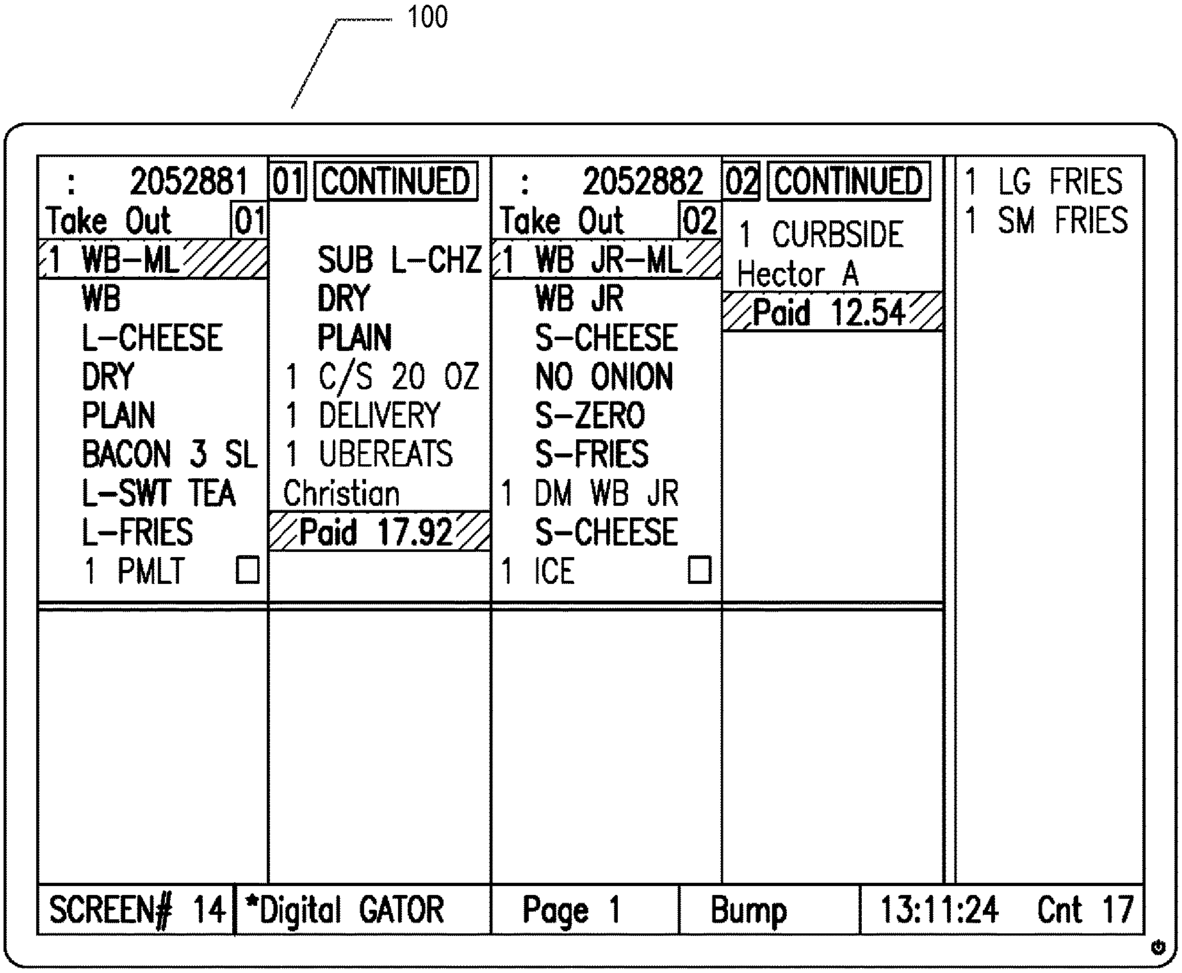
FIG. 1 shows a typical KDS display.
Figure 2:
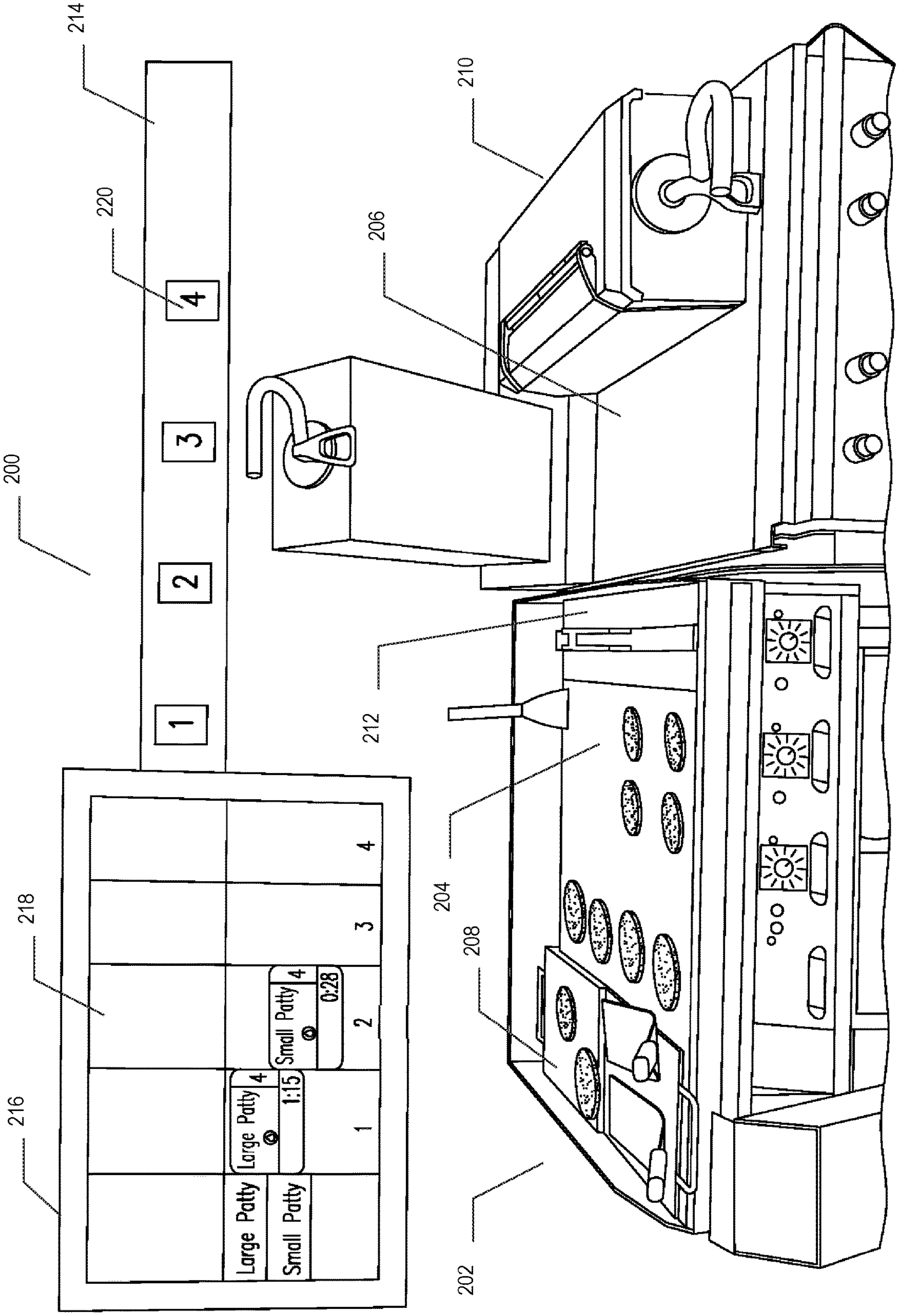
FIG. 2 shows a commercial kitchen grill station with a grill station computing device.

FIG. 2 shows an exemplary embodiment of a grill station 200 in a commercial kitchen. The grill station 200 centers on a commercial grill 202. In the exemplary embodiment, the commercial grill 202 has a flat section 204 in the center, a clamshell section 206 on the right, and a transfer section 208 on the left. Each of these sections has a flat griddle surface that is heated by one or more heat sources, typically electrical or gas. However, in other embodiments, one or more of the sections may have grates over open flame instead of the flat griddle surface. The clamshell section 206 has an upper griddle plate 210 that is hinged at the back of the grill 202 so that it can be raised into a loading/unloading position and lowered into a grilling position. The upper griddle plate 210 has its own heat source, typically electrical elements. Part of the flat section 204 is occupied by a press tool 212, which is used to weigh down and help cook certain items, similar to the upper griddle plate 210 on the clamshell section 206. It is typically kept on part of the flat section 204 to keep it hot. This means that nothing else can be cooked on this part of the flat section 204 as the press tool 212 occupies the section when not pressing food items.

The workstation 200 has vent hood 214 over the commercial grill 202. On the vent hood 214 is mounted a first embodiment grill station computing device 216. The first embodiment grill station computing device 216 is shown with a user interface on its display that has four numbered lanes 218 that correspond to four lanes on the grill 202. The lanes on the grill 202 may be defined by markings on the surface of the grill 202, but in this first embodiment, the lanes are defined by numbers applied to the vent hood 214 over the designated lanes.

Kitchen Workflow Management Architecture

Figure 3:
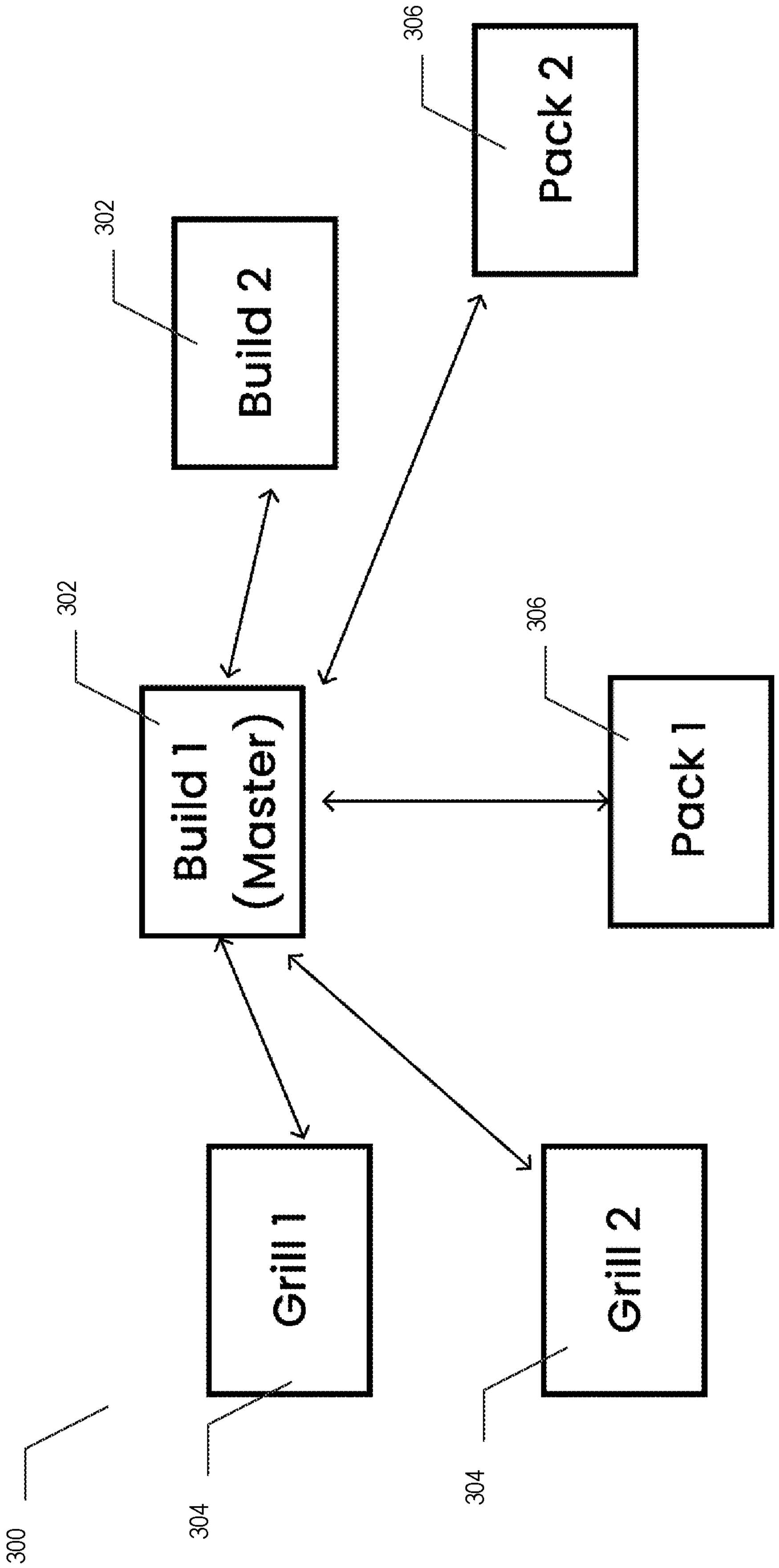
FIG. 3 is a schematic of a first embodiment Kitchen Order Processing and Workstation Management System.

FIG. 3 is a schematic of a first embodiment Kitchen Order Processing and Workstation Management System 300. The first embodiment system 300 is built around one or more other station computing devices. The first embodiment system 300 includes one or more build station computing devices 302, one or more grill station computing devices 304, and one or more pack station computing devices 306. In the first embodiment system 300, one of the build station computing devices 302 functions as a master device that controls the other station computing devices in the first embodiment system 300. Station computing devices of similar types may be configured to focus on a particular set of tasks. For example, one grill station computing devices may be configured to only deal with breakfast items while another grill station computing device may be configured to deal with lunch and dinner sandwiches. Station computing devices of similar types may be configured to load balance to maximize production efficiency.

Figure 4:
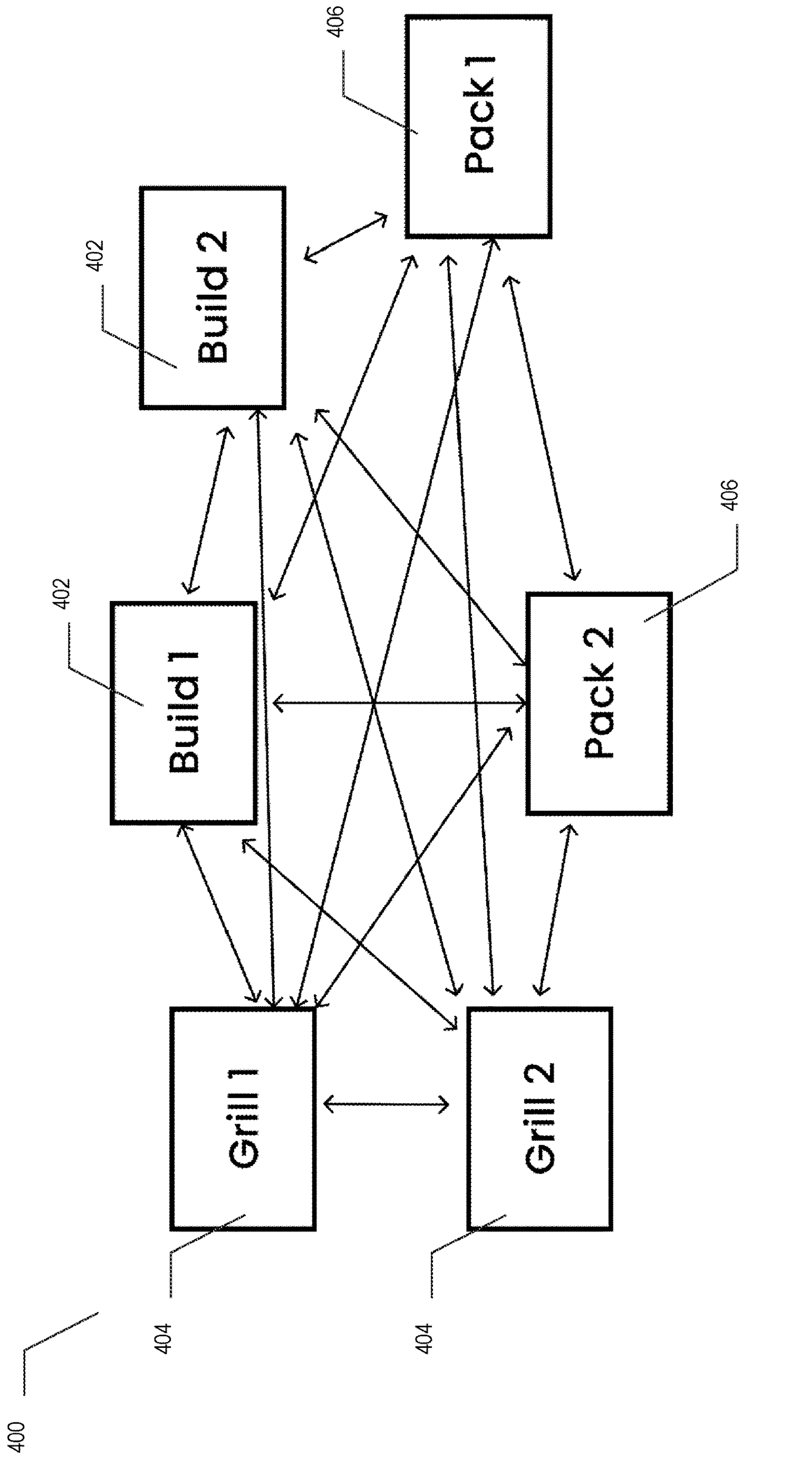
FIG. 4 is a schematic of a second embodiment Kitchen Order Processing and Workstation Management System.

FIG. 4 is a schematic of a second embodiment Kitchen Order Processing and Workstation Management System 400. Similar to the first embodiment system 300, the second embodiment system 400 is built around one or more other station computing devices. The second embodiment system 400 includes one or more build station computing devices 402, one or more grill station computing devices 404, and one or more pack station computing devices 406. However, in the second embodiment system 400, none of the other station computing devices acts as a master device, controlling the other station computing devices. Rather, in the second embodiment system 400, one computing device is designated to receive digital order tickets and processes them, forwarding copies to the other station computing devices. Each station computing device uses local criteria to determine what tasks that station needs to perform to fulfill the order. Each station informs the other in the second embodiment system 400 which tasks it is doing and keeps the other stations informed of relevant status of these tasks. In some alternative embodiments, the other station computing devices are capable of being used in either the mesh mode of the second embodiment system 400 or in the master-slave mode of the first embodiment system 300.

Figure 5:
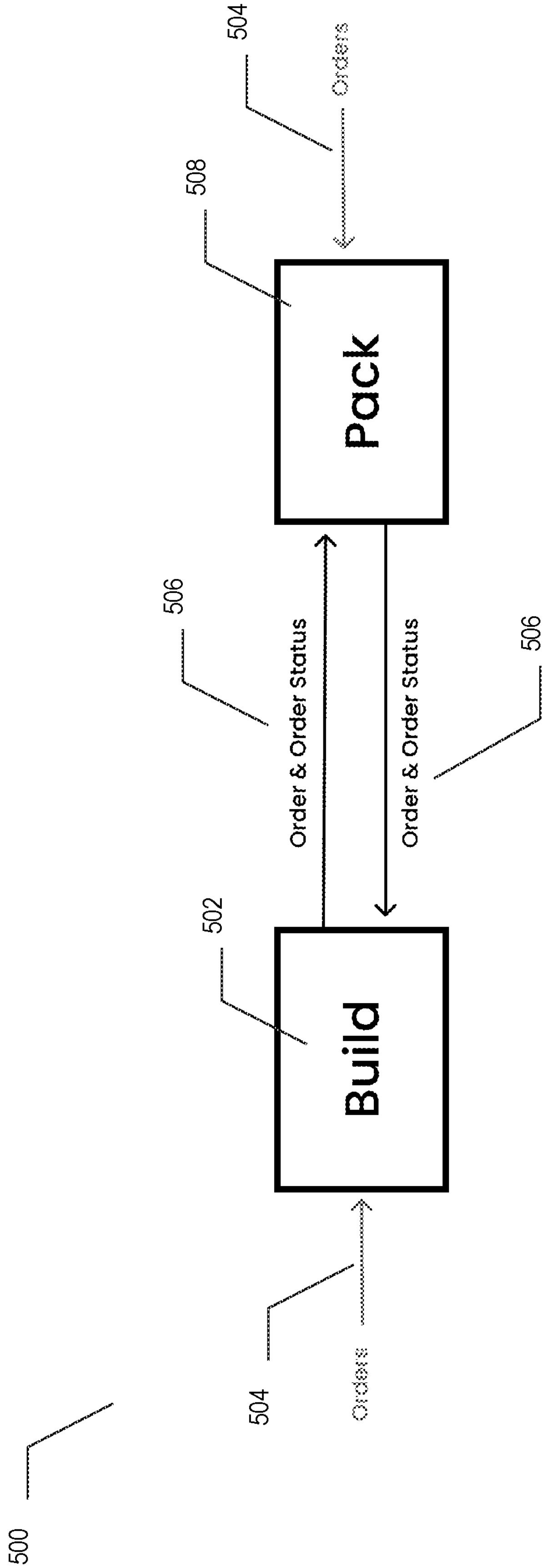
FIG. 5 shows information flow of orders and status in the second embodiment system.

FIG. 5 shows information flow 500 of orders and status in the second embodiment system 400. Orders 504 may be received into a build station computing device 502 and processed locally. Copies of the orders and order status 506 are forwarded to a pack station computing device 508. At the same time, orders 504 may be received into the pack station computing device 508 and processed locally. Copies of the orders and order status 506 are forwarded to the build station computing device 502.

Figure 6:
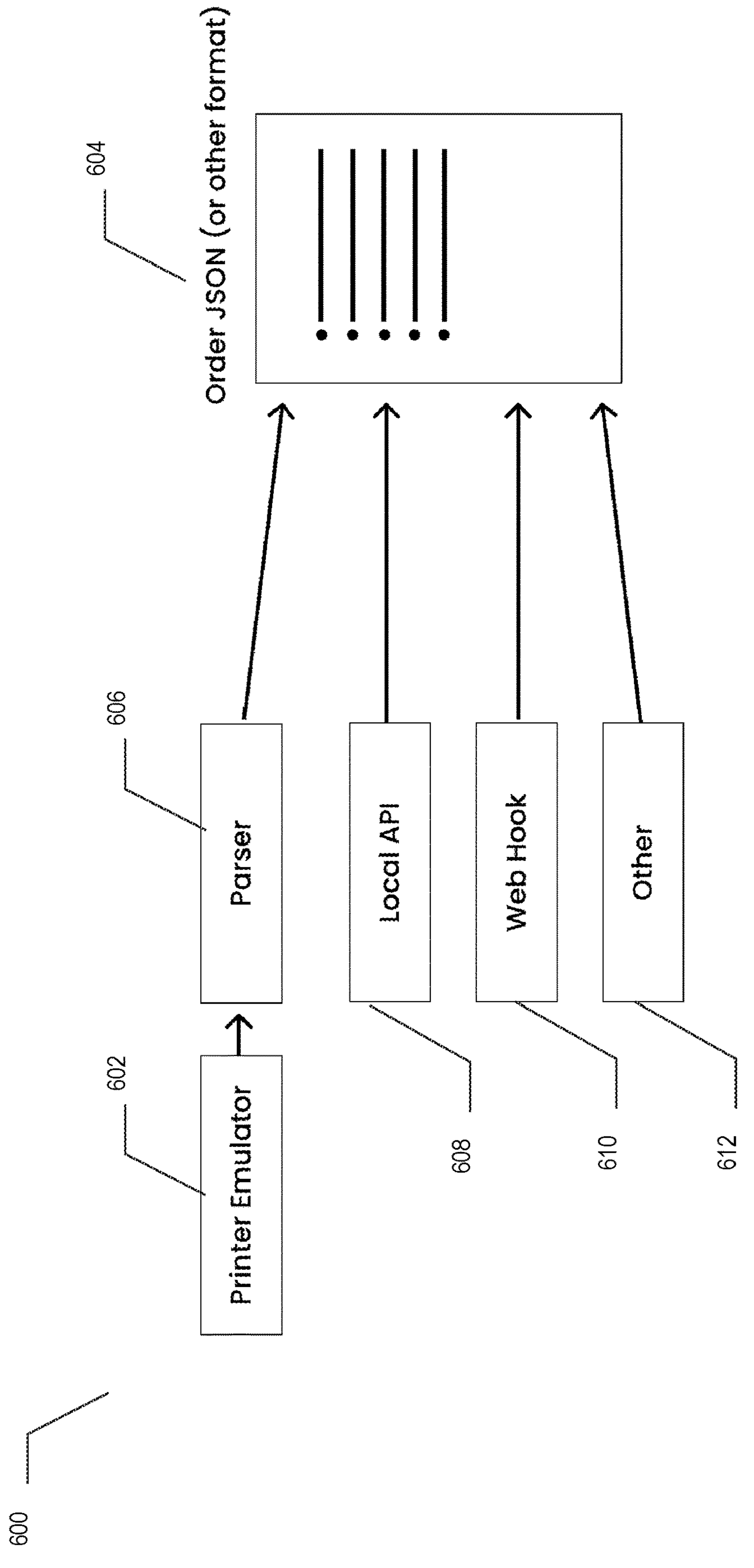
FIG. 6 shows a digital order ticket generating system

FIG. 6 shows a digital order ticket generating system 600. A printer emulator 602 receives an order from a point of sale (POS) system and puts out a preliminary order ticket. The printer emulator 602 is a standard piece of restaurant equipment and not part of any embodiment of the Kitchen Order Processing and Workstation Management System. A parser 606 translates the preliminary order ticket into a digital order ticket 604 in a format that can be used by the Kitchen Order Processing and Workstation Management System. The parser 606 may be incorporated into the station computing devices or be a stand-alone device. In the first embodiment 300 and second embodiment 400, the format for the digital order ticket 604 is JSON (JavaScript Object Notation), but in other embodiments, other formats may be used. Digital order tickets 604 in proper format may be generated by a local API 608, a web hook 610, or some other convenient mechanism.

Kitchen Workstation Computing Device

Figure 7:
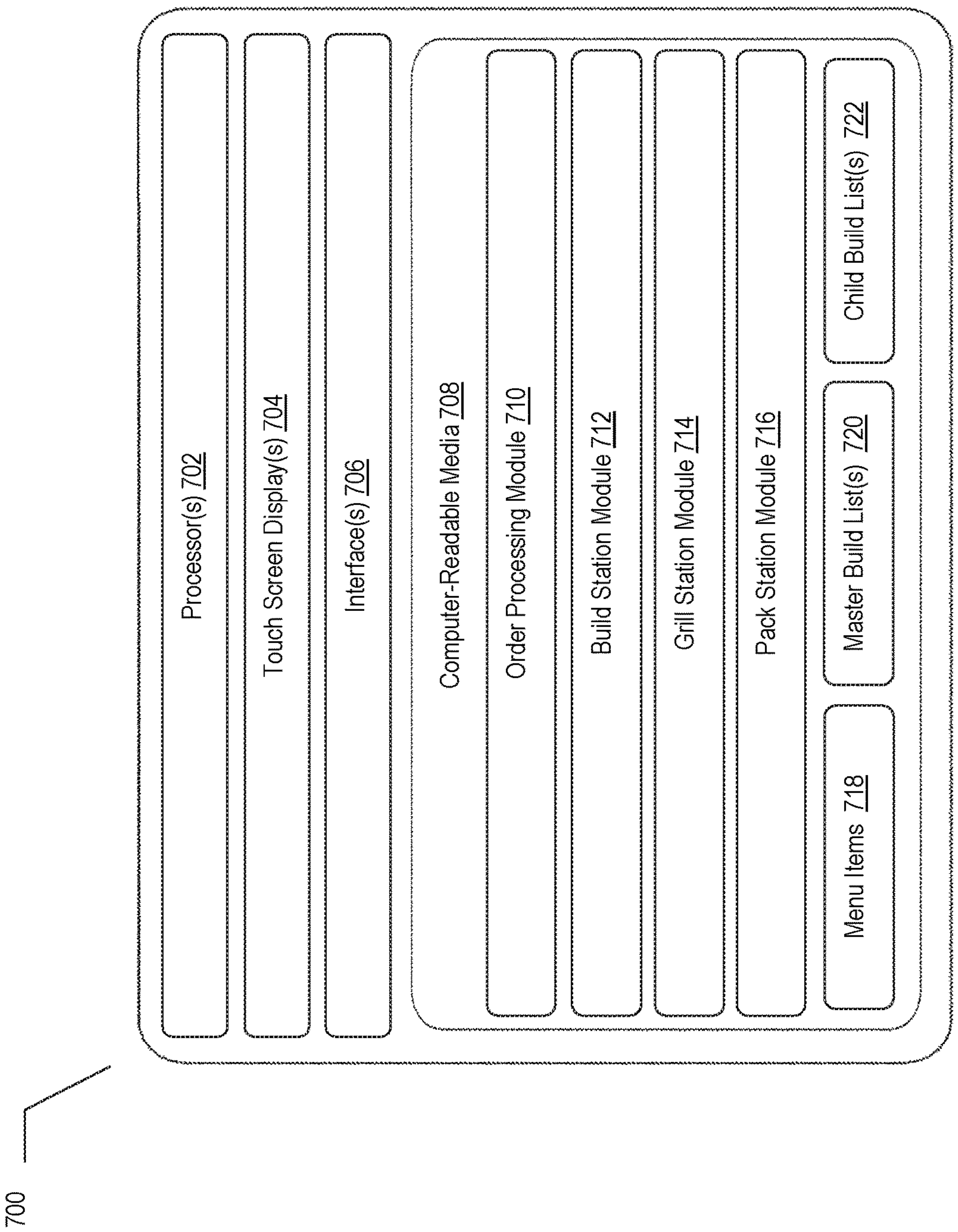
FIG. 7 illustrates example components of the kitchen workstation computing devices described herein.

FIG. 7 illustrates example components of the kitchen workstation computing devices 700 described herein. As illustrated, each kitchen workstation computing devices 700 may include one or more processors 702, one or more or more interfaces 706 for communicating with other devices, and one or more touch screen displays 704 for presenting visual information and for receiving user input. In addition, each kitchen workstation computing devices 700 includes computer-readable media 708. The computer-readable media 708 includes an instance of an order processing module 710, which enables some of the order processing techniques described herein. Each kitchen workstation computing device 700 has stored in its computer-readable media 708, one or more of the following: a build station module 712, a grill station module 714, and a pack station module 716. The computer-readable media 708 includes a data base of menu items 718, a data base of master build lists 720, and a data base of child build lists 722. The data base of menu items 718 comprises the names of all the items the kitchen is set up to prepare. The data base of child build lists 722 comprises one more child build lists. Each child build list is associated with one of the item names in the data base of menu items 718 and comprises information about the basic ingredients and instructions necessary for making a standard build of a particular menu item. The data base of master build lists 720 comprises one or more master build lists. Each master build list is associated with one of the item names in the data base of menu items 718 and associated with one of the child build lists. Each master build list comprises information about additional ingredients and instructions necessary for making non-standard build of a particular menu item. That is, it has information for making substitutions and additions to the standard build of the menu item.

The kitchen workstation computing devices 700 typically comprise tablet computing devices, but in alternative embodiments may be any type of computing device, such as mobile phones, laptop computers, desktop computers, server computers, and specialized computers. Some or all of the components described may additionally or alternatively reside in a remote service and/or at other locations.

Order Processing Module

The methods of the order processing module 710 are described below in association with the flow charts shown in FIGS. 42-48. The order processing module 710 accesses several data bases including the menu items 718, the Master Build Lists 720 and the Child Build Lists 722. FIGS. 17-30 illustrate how these databases are used in the methods shown in the flow charts in FIGS. 42-48.

Figure 24A:
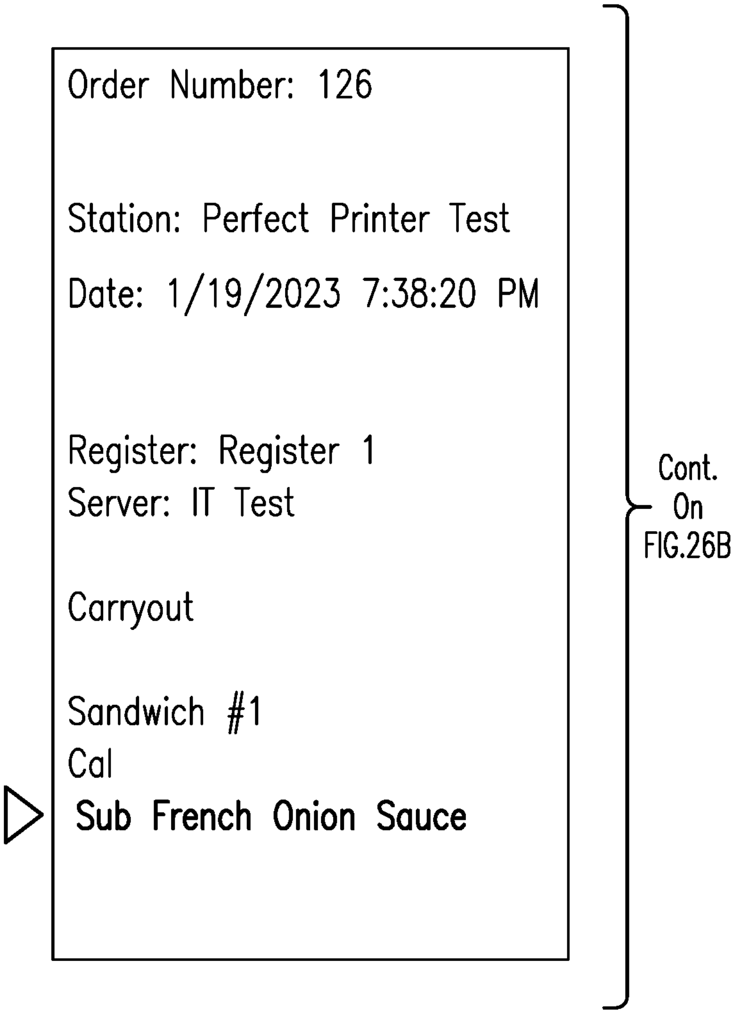
Figure 25A:
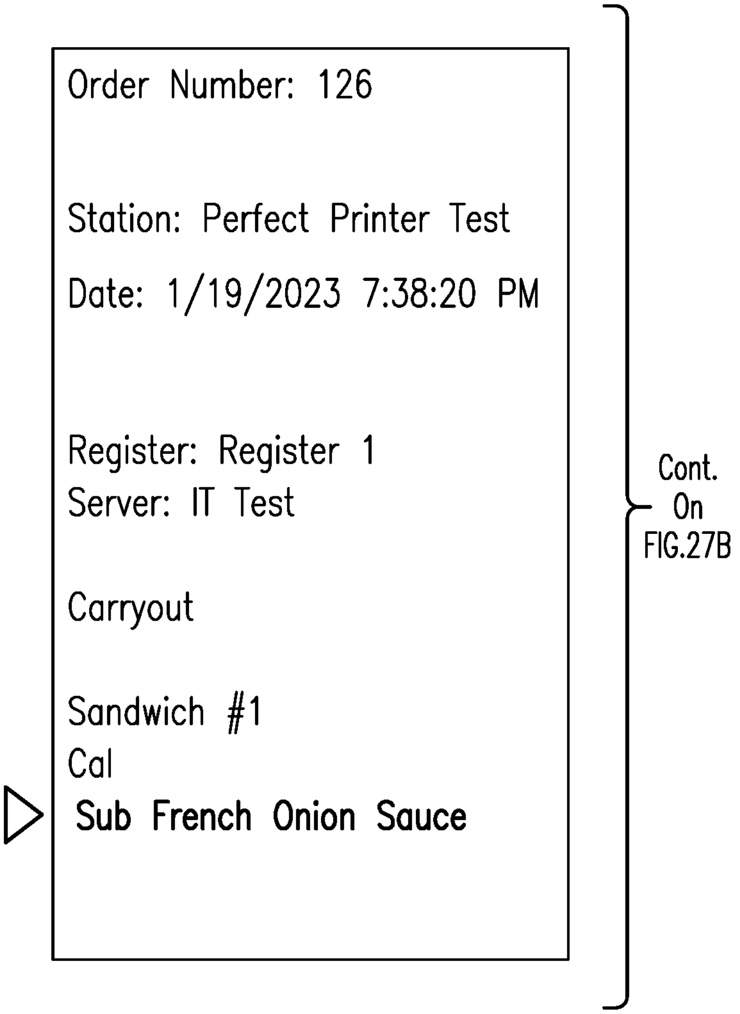
Figure 26A:
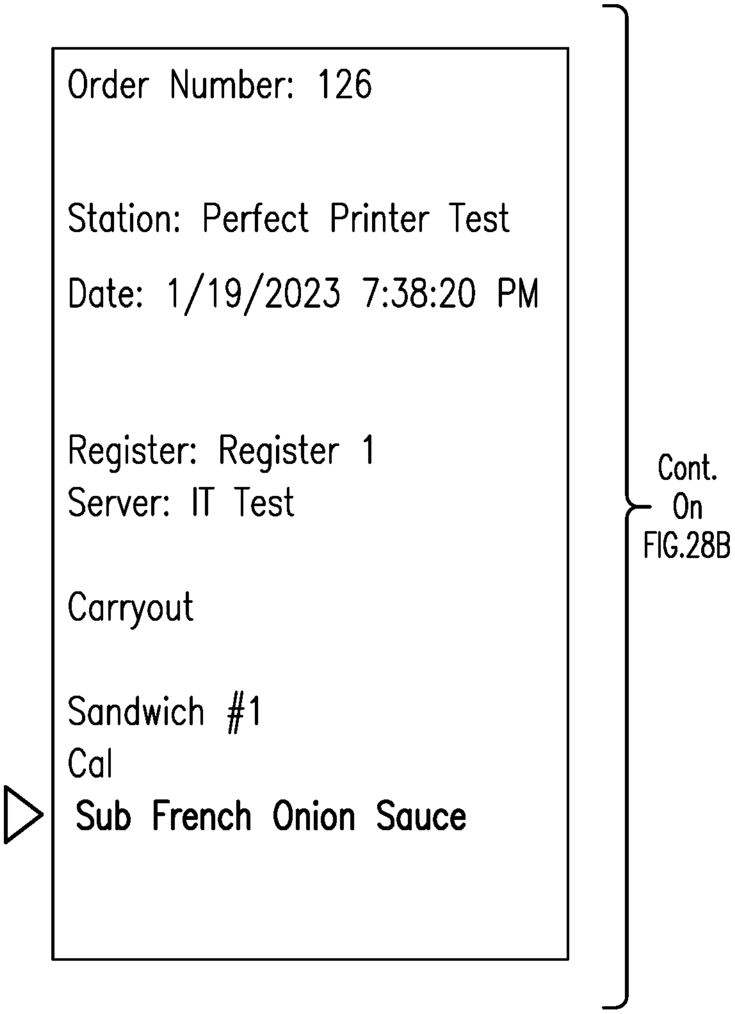
Figure 27A:
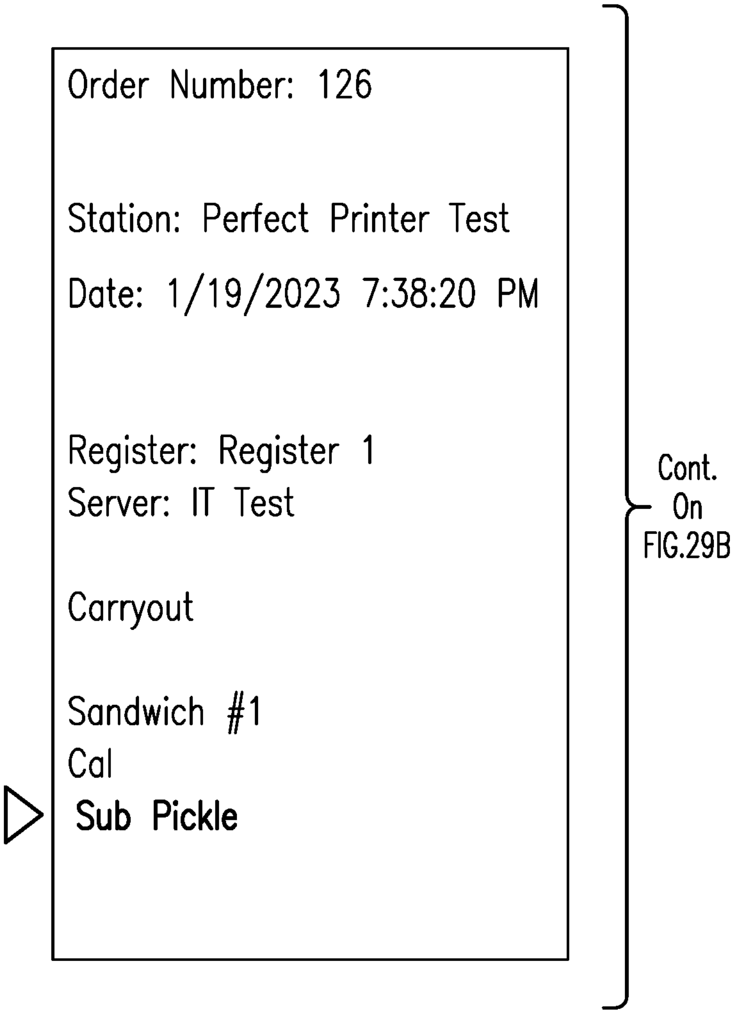
Figure 28A:
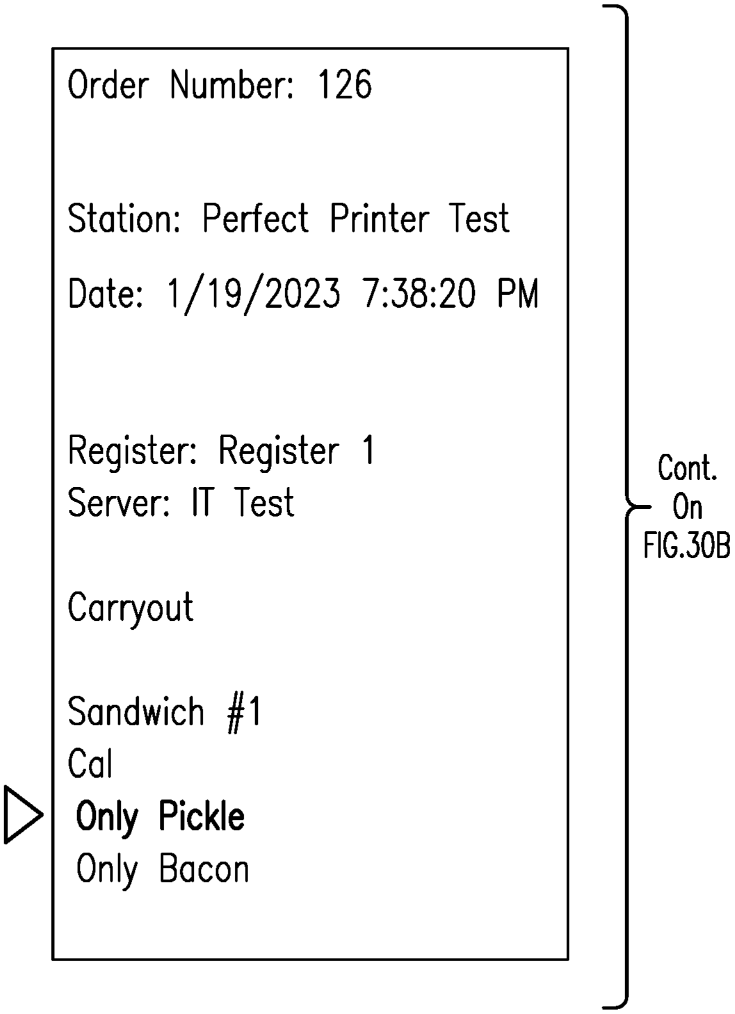
Figure 29A:
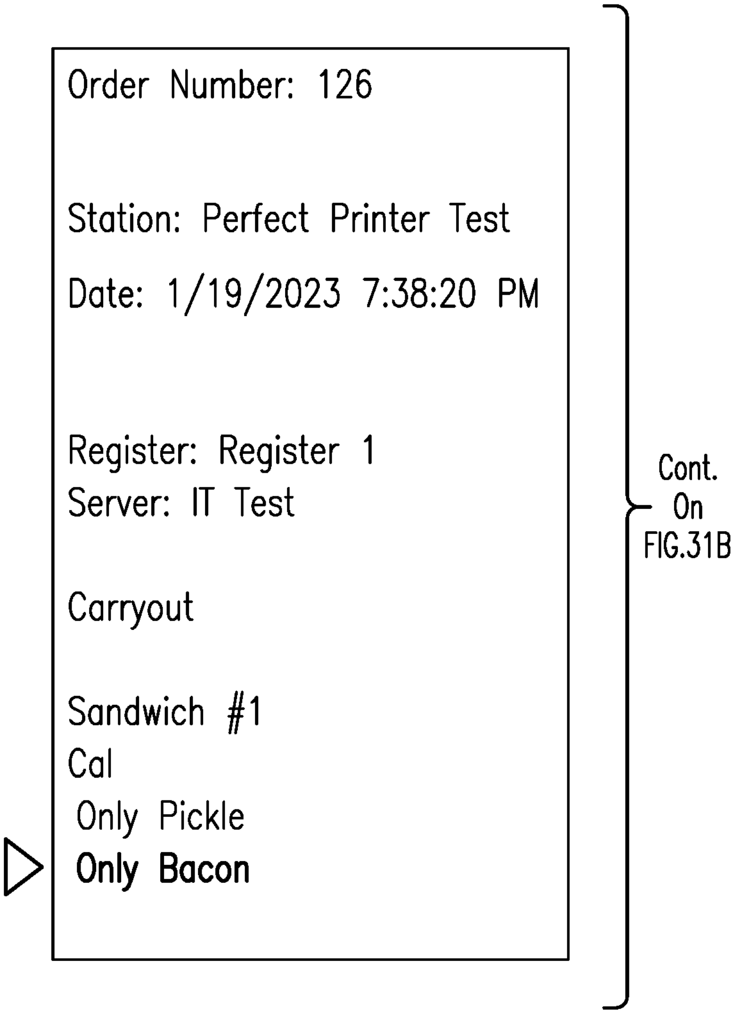
Figure 30:
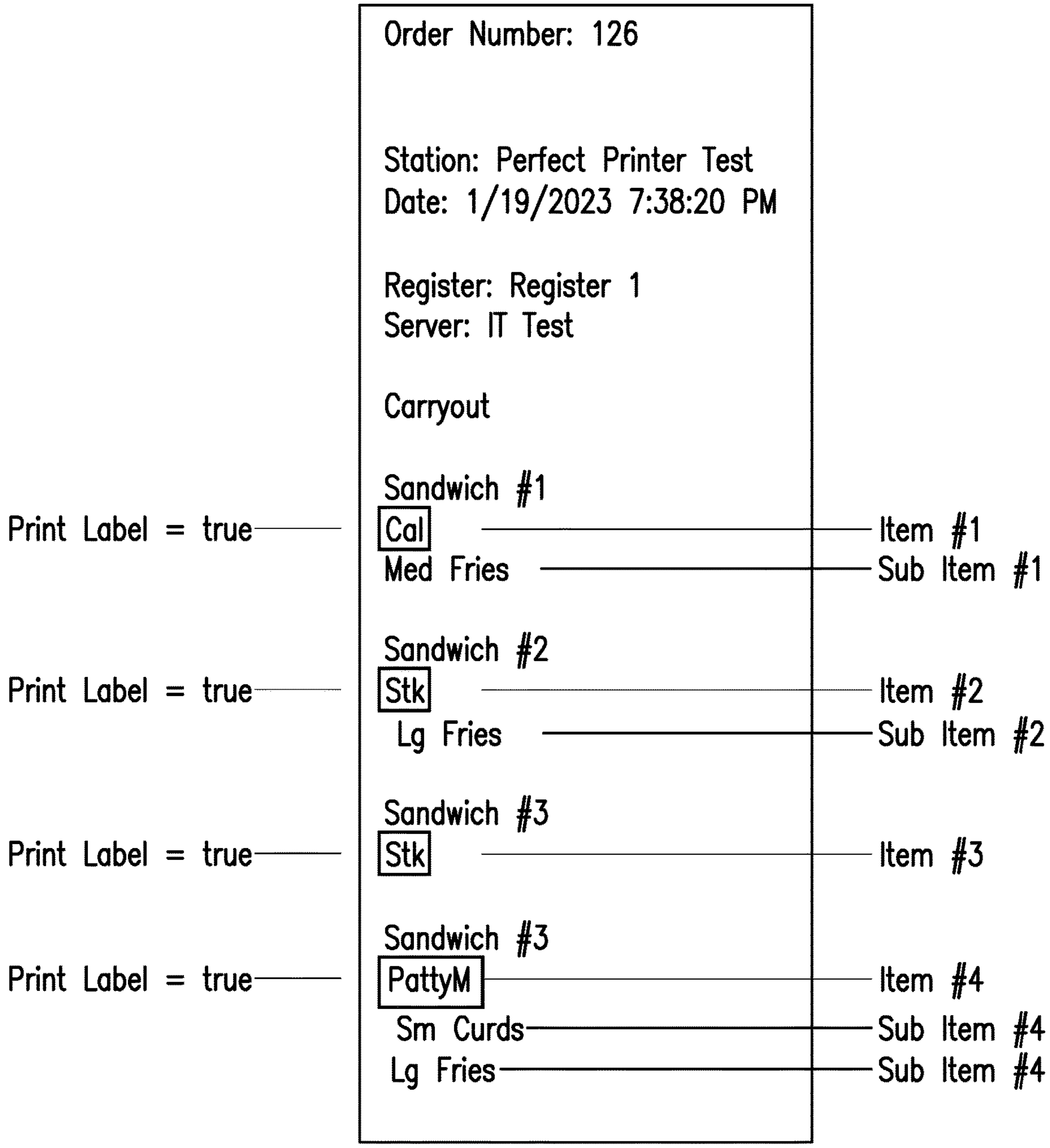
FIG. 30 shows a digital order with flags (PrintLabel) attached to order item names.

FIG. 17 shows a digital order with an arrow pointing to a first order item name ("Cal"). Also shown is an associated master build list ("California Steakburger"), an associated child build list ("California Steakburger"), and an associated digital order item ("#1"). FIG. 18 shows a digital order with an arrow pointing to a modifier ("Only") and an ingredient ("Lettuce"). FIG. 19 shows a digital order with an arrow pointing to a modifier ("Sub") and an ingredient ("Ketchup"). FIG. 20 shows a digital order with an arrow pointing to a modifier ("Extra") and an ingredient ("Patty"). FIG. 21 shows a digital order with an arrow pointing to a modifier ("Sub") and an ingredient ("Swiss"). FIG. 22 shows a digital order with an arrow pointing to a modifier ("Well Done"). FIG. 23 shows a digital order with an arrow pointing to a second order item name ("Med Fries"). FIG. 24 shows a digital order with an arrow pointing to a modifier ("Sub") and an ingredient ("French Onion Sauce"). FIG. 25 shows an ingredient ("Thousand Island") removed from the digital order item. FIG. 26 shows two instances of an ingredient ("French Onion Sauce") added to the digital order item. FIG. 27 shows a digital order with an arrow pointing to a modifier ("Sub") and an ingredient ("Pickle"). FIG. 28 shows a digital order with an arrow pointing to a modifier ("Only") and an ingredient ("Pickle"). FIG. 29 shows a digital order with an arrow pointing to a modifier ("Only") and an ingredient ("Bacon"). FIG. 30 shows a digital order with flags ("PrintLabel") attached to order item names.

Figure 42A:
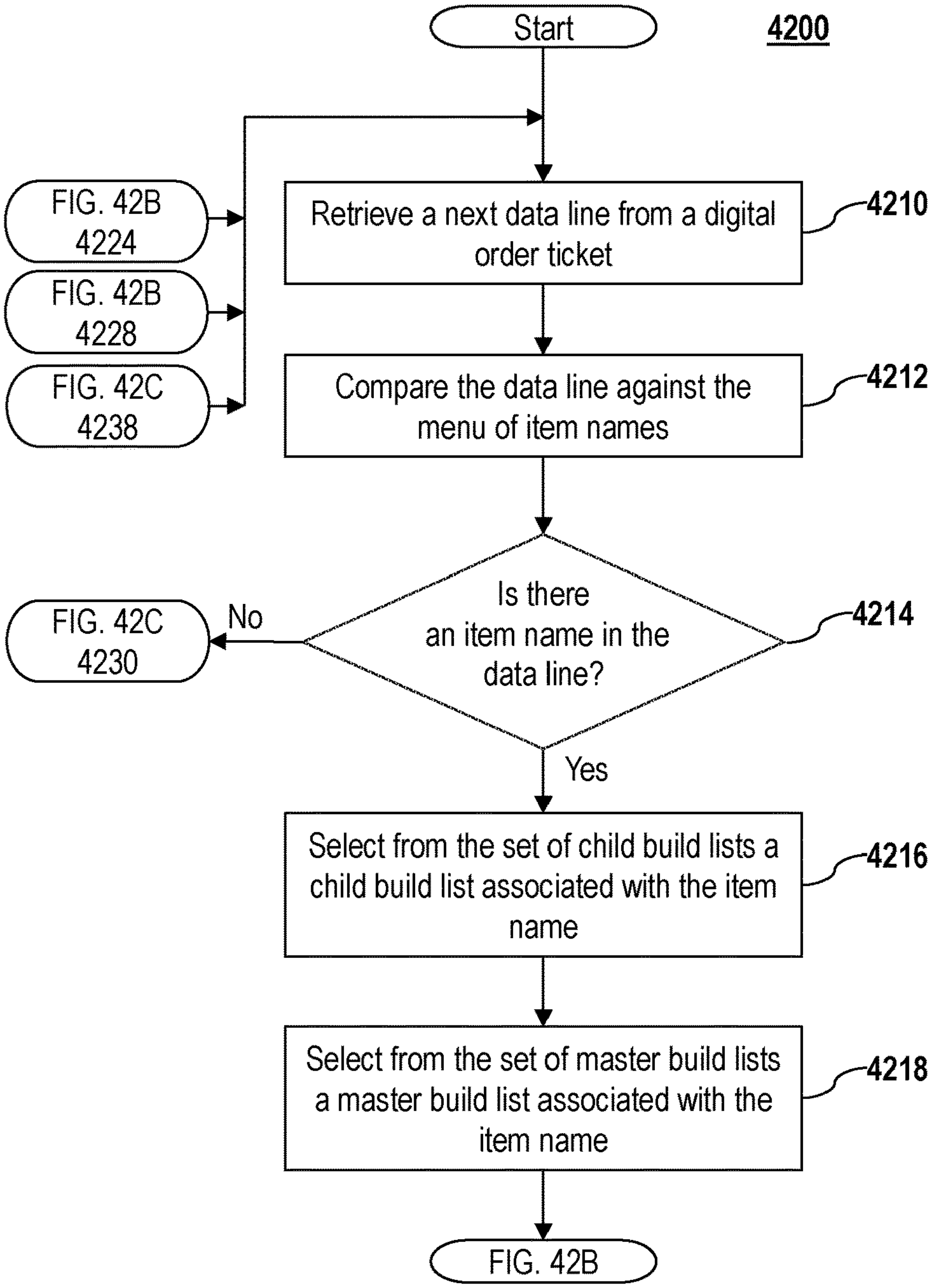
FIGS. 42A-42C show a flow chart for an order processing method.
Figure 42B:
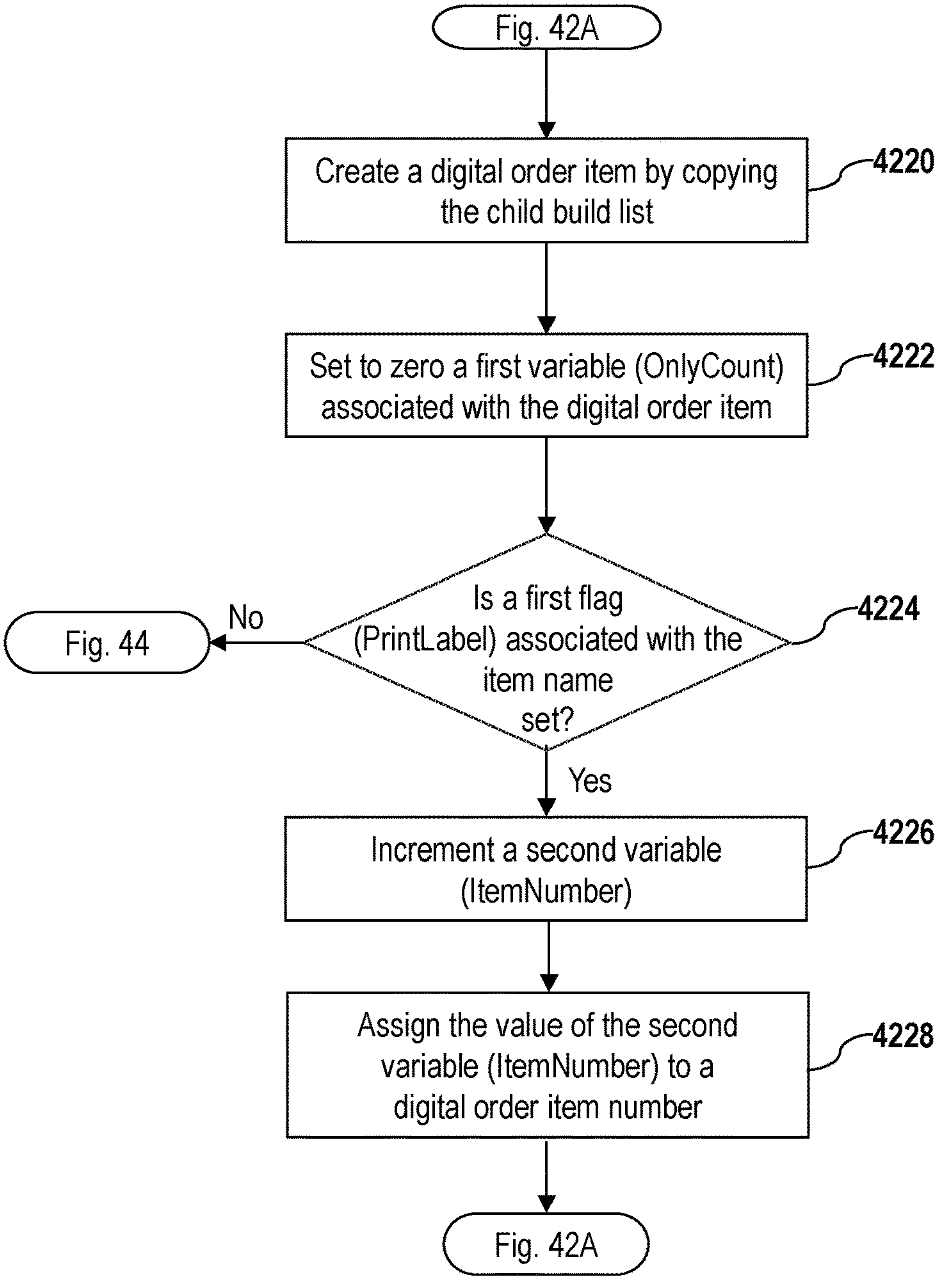
Figure 42C:
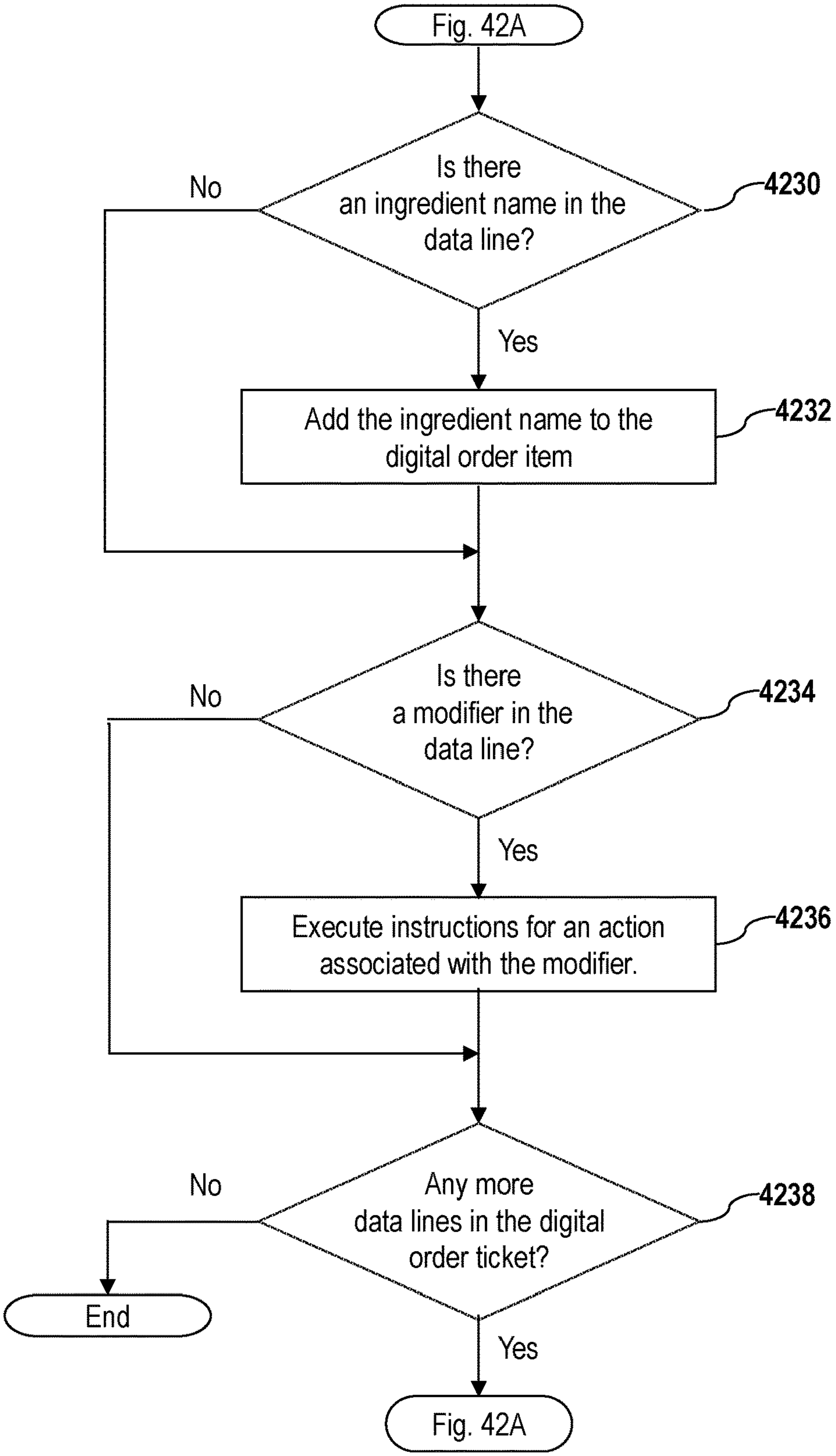

FIGS. 42A-42C show a flow chart for an order processing method 4200. This method is part of the order processing module 710 discussed above regarding the kitchen workstation computing device 700 shown in FIG. 7. The order processing method 4200 is used by a kitchen workstation computing device 700 to process a digital order ticket to determine what menu items need to be prepared.

Starting at the top of FIG. 42A the order processing method 4200 starts with performing step 4210 to retrieve a next data line from a digital order ticket (if there are no more data lines in the digital order ticket, then method 4200 terminates). Step 4212 compares the data line against the menu of item names (in the data base of menu items 718). Step 4214 determines if there is an item name in the data line. If NO, there is no item name in the data line, then the method 4200 skips ahead to step 4230, were the data line will be searched for an ingredient name and/or a modifier. If YES, there is an item name in the data line, then the method 4200 proceeds to step 4216. Step 4216 selects from the set of child build lists a child build list associated with the item name. Step 4218 selects from the set of master build lists a master build list associated with the item name.

Method 4200 continues at the top of FIG. 42B with step 4220, which creates a digital order item by copying the child build list. All the ingredients and instructions in the child build list are copied from the child build list into the digital order item. Step 4222 sets to zero a first variable (OnlyCount) associated with the digital order item. Step 4224 determines if a first flag (PrintLabel) associated with the item name is set. In the exemplary embodiment, the first variable is labeled "OnlyCount" and the first flag is labeled "PrintLabel" but in other embodiments, other terms may be used for the labels. If NO, the method 4200 goes to the beginning of the method 4400 on FIG. 44. If YES, the first flag (PrintLabel) associated with the item name is set, then the method 4200 proceeds on with step 4226, which increments a second variable (ItemNumber). Step 4228 assigns the value of the second variable (ItemNumber) to a digital order item number. Method 4200 then loops back to the beginning of the method 4200 on FIG. 42A and retrieves the next line of data from the digital order ticket in step 4210.

Method 4200 continues at the top of FIG. 42C with step 4230, which determines if there is an ingredient name in the data line. If NO, there is no ingredient name in the data line, then method 4200 skips ahead to step 4234. If YES, there is an ingredient name in the data line, then the method proceeds to step 4232, which adds an ingredient name to the digital order item. Step 4234 determines if there is a modifier in the data line. If NO, there is no modifier in the data line, then the method 4200 skips ahead to step 4238. If YES, there is a modifier in the data line, then the method proceeds to step 4236, which executes instructions for an action associated with the modifier. Step 4238 determines if there are any more data lines in the digital order ticket. If YES, there are more data lines in the digital order ticket, the method 4200 loops back to the beginning of the method 4200 on FIG. 42A and retrieves the next line of data from the digital order ticket in step 4210. If NO, there are no more data lines in the digital order ticket, the method 4200 ends.

Figure 43:
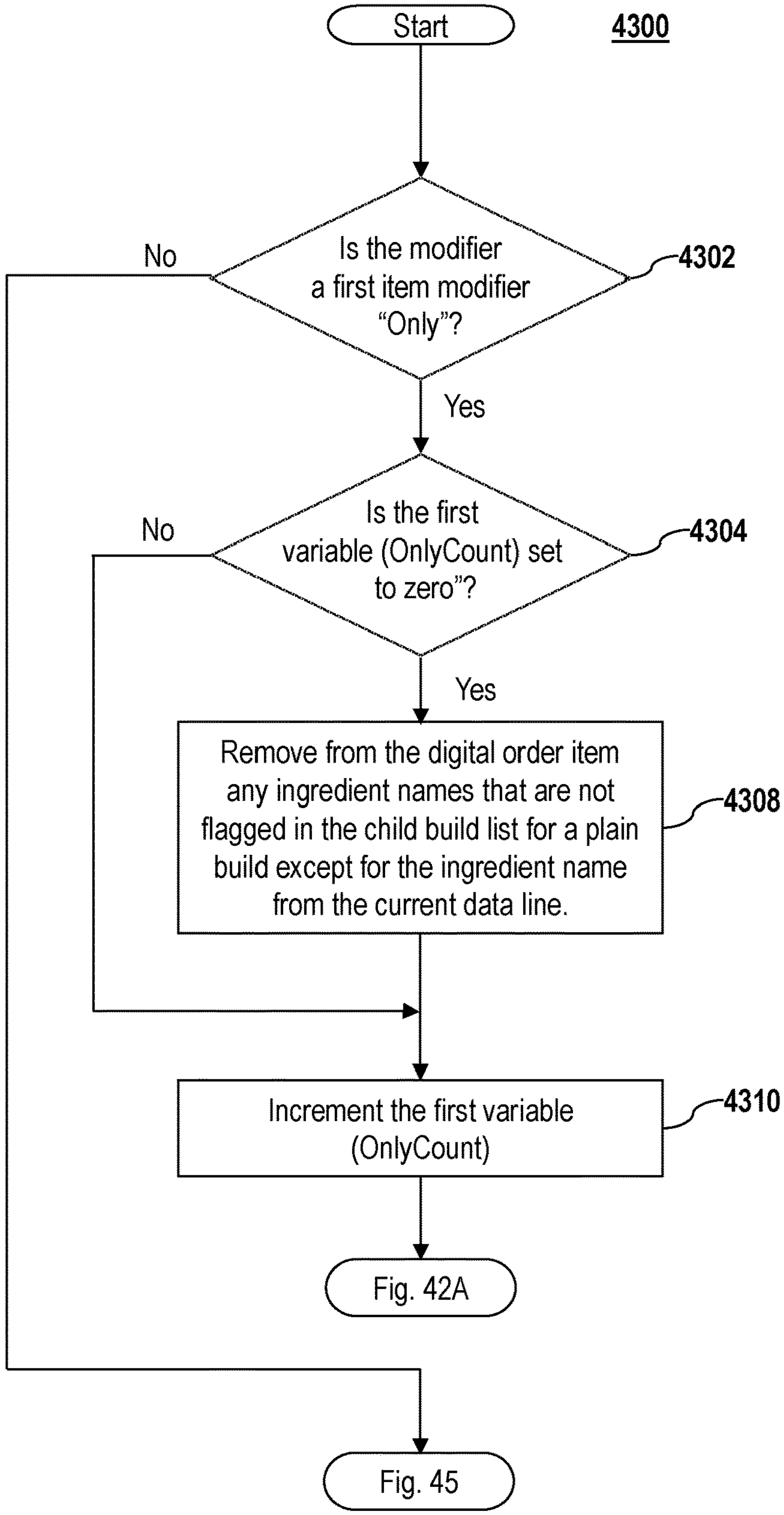
FIG. 43 shows a flow chart for method 4300, a more detailed method for step 4236 of method 4200 (executing instructions for an action associated with the modifier).

FIG. 43 shows a flow chart for method 4300, a more detailed method for step 4236 of method 4200 (executing instructions for an action associated with the modifier). Step 4302 determines if the modifier found in the current data line is a first item modifier. In the exemplary embodiment the first item modifier is "Only" but in other embodiments a different term can be used to trigger the actions of method 4300. If NO, then method 4300 terminates and proceeds to method 4500 (shown in FIG. 45). If YES, then method 4300 proceeds to step 4304, which determines if the first variable (OnlyCount) is set to zero. In the exemplary embodiment the first variable is labeled "OnlyCount" but in other embodiments a different label can be used. If NO, method 4300 skips ahead to step 4310. If YES, method 4300 proceeds to step 4308, which removes from the digital order item any ingredient names that are not flagged in the child build list (the one associated with the item name from the first data line) for a plain build except for the ingredient name from the current data line. Proceeding next to step 4310, which increments the first variable (OnlyCount). This will prevent step 4308 from being executed more than once for a single digital order item. Next, method 4300 loops back to the start of method 4200 to process the next data line.

Figure 44:
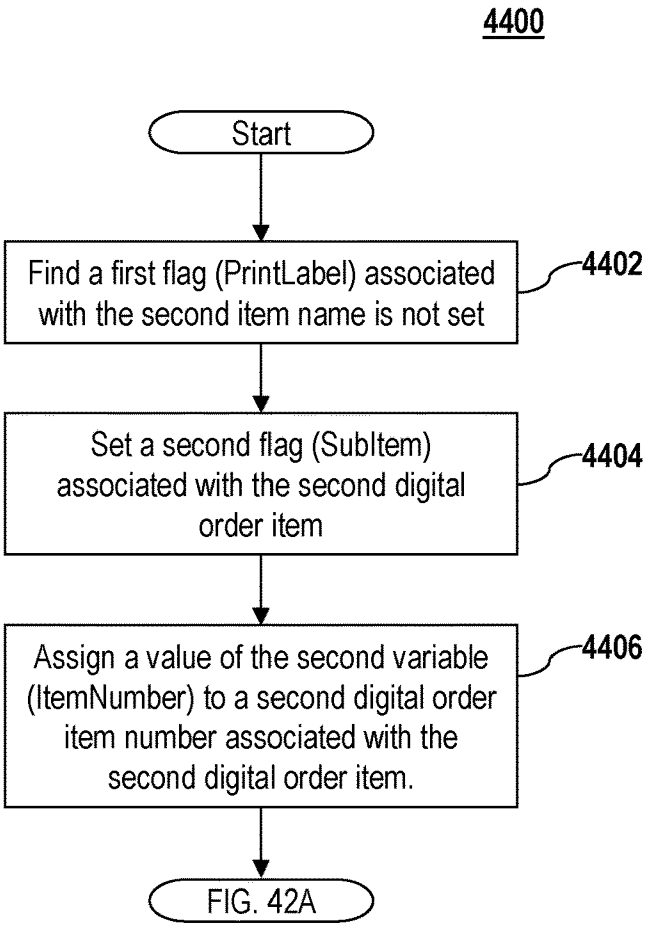
FIG. 44 shows a flow chart for method 4400, a continuation of method 4200, handling cases of subitems.

FIG. 44 shows a flow chart for method 4400, a continuation of method 4200, method 4400 handling cases of subitems. Method 4400 starts with step 4402, which finds a first flag (PrintLabel) associated with the second item name is not set. Step 4402 is just a reiteration of step 4224. Proceeding next to step 4404, which sets a second flag (SubItem) associated with the second digital order item. In the exemplary embodiment the second flag is labeled "SubItem" but in other embodiments a different label can be used. Step 4406 assigns a value of the second variable (ItemNumber) to a second digital order item number associated with the second digital order item. Method 4500 then terminates and returns to the start of method 4200.

Figure 45:
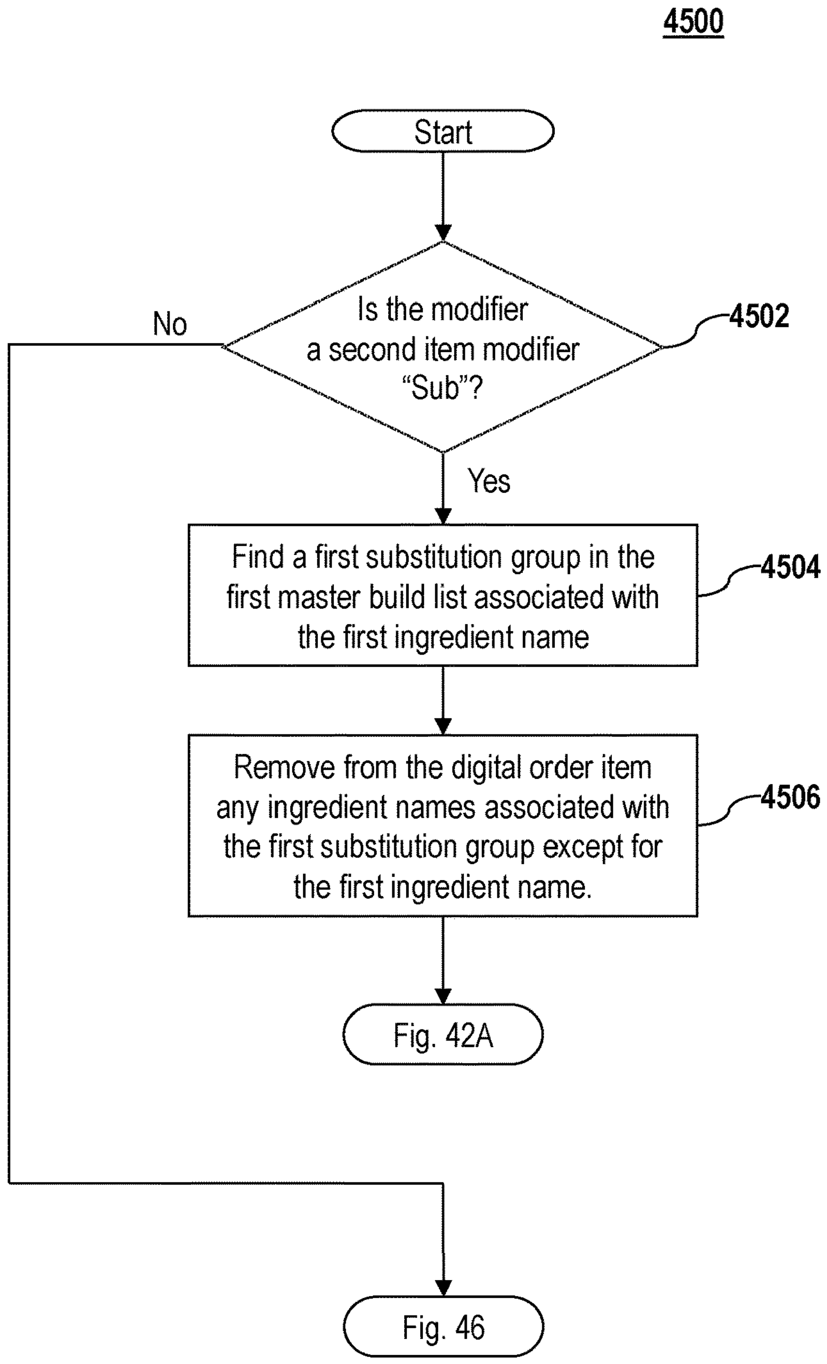
FIG. 45 shows a flow chart for method 4500, a continuation of method 4300, which together comprise a more detailed method for step 4236 of method 4200 (executing instructions for an action associated with the modifier).

FIG. 45 shows a flow chart for method 4500, a continuation of method 4300, which together comprise a more detailed method for step 4236 of method 4200 (executing instructions for an action associated with the modifier). Method 4500 starts with step 4502 which determines if the modifier found in the current data line is a second item modifier "Sub." In the exemplary embodiment the second item modifier is "Sub" but in other embodiments a different term can be used to trigger the actions of method 4500. If NO, then method 4500 terminates and proceeds to method 4600 (shown in FIG. 46). If YES, then method 4500 proceeds to step 4504, which finds a first substitution group in the first master build list associated with the first ingredient name (if there is none, then method 4500 terminates and returns to the start of method 4200). Proceeding next to step 4506, which removes from the digital order item any ingredient names associated with the first substitution group except for the first ingredient name. Method 4500 then terminates and returns to the start of method 4200.

Figure 46:
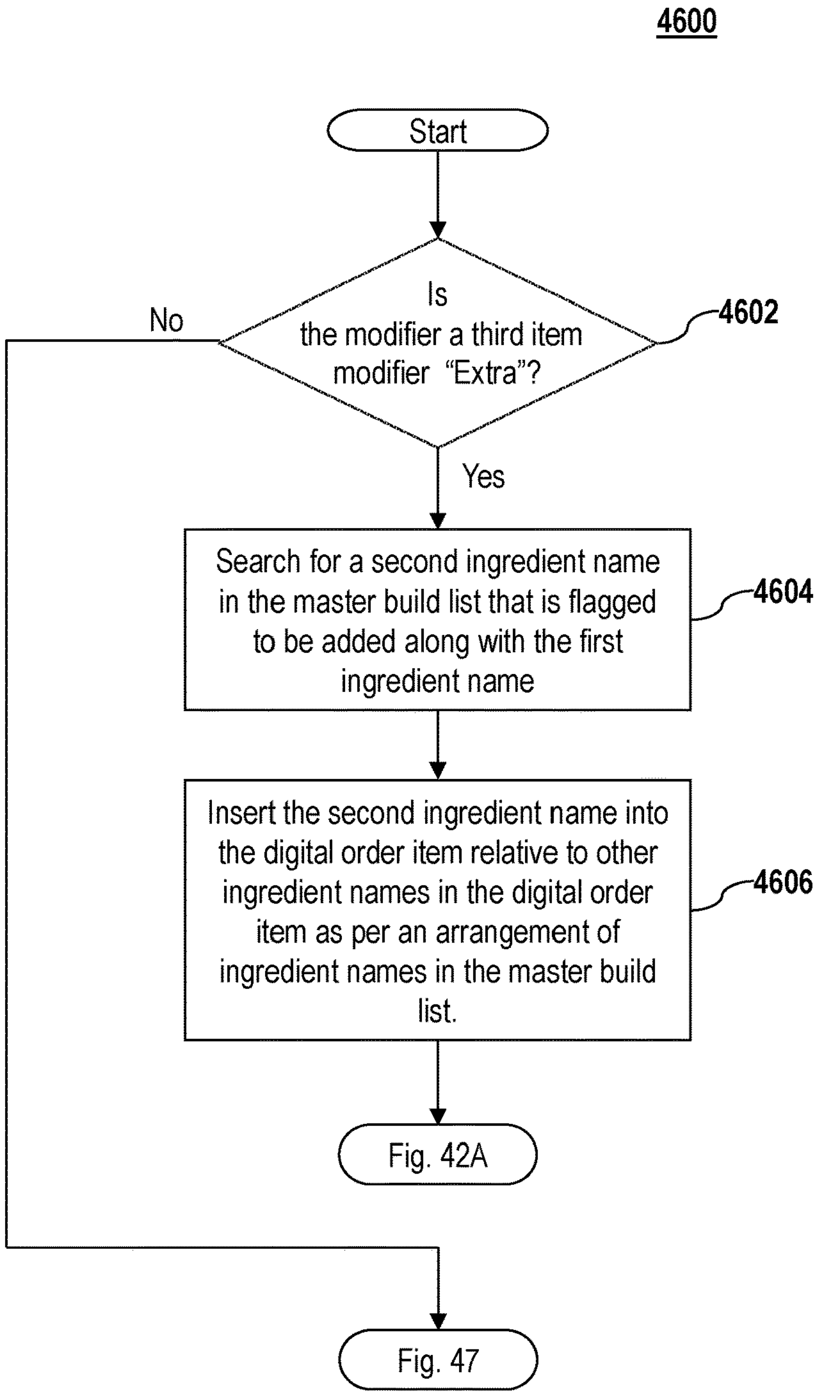
FIG. 46 shows a flow chart for method 4600, a continuation of methods 4300 and 4500, which together comprise a more detailed method for step 4236 of method 4200 (executing instructions for an action associated with the modifier).

FIG. 46 shows a flow chart for method 4600, a continuation of methods 4300 and 4500, which together comprise a more detailed method for step 4236 of method 4200 (executing instructions for an action associated with the modifier). Method 4600 starts with step 4602 which determines if the modifier found in the current data line is a third item modifier "Extra." In the exemplary embodiment the third item modifier is "Extra" but in other embodiments a different term can be used to trigger the actions of method 4600. If NO, then method 4600 terminates and proceeds to method 4700 (shown in FIG. 47). If YES, then method 4600 proceeds to step 4604, which searches for a second ingredient name in the master build list that is flagged to be added along with the first ingredient name (if there is none, then method 4600 terminates and returns to the start of method 4200). Proceeding next to step 4606, which inserts the second ingredient name into the digital order item relative to other ingredient names in the digital order item as per an arrangement of ingredient names in the master build list. Method 4600 then terminates and returns to the start of method 4200.

Figure 47:
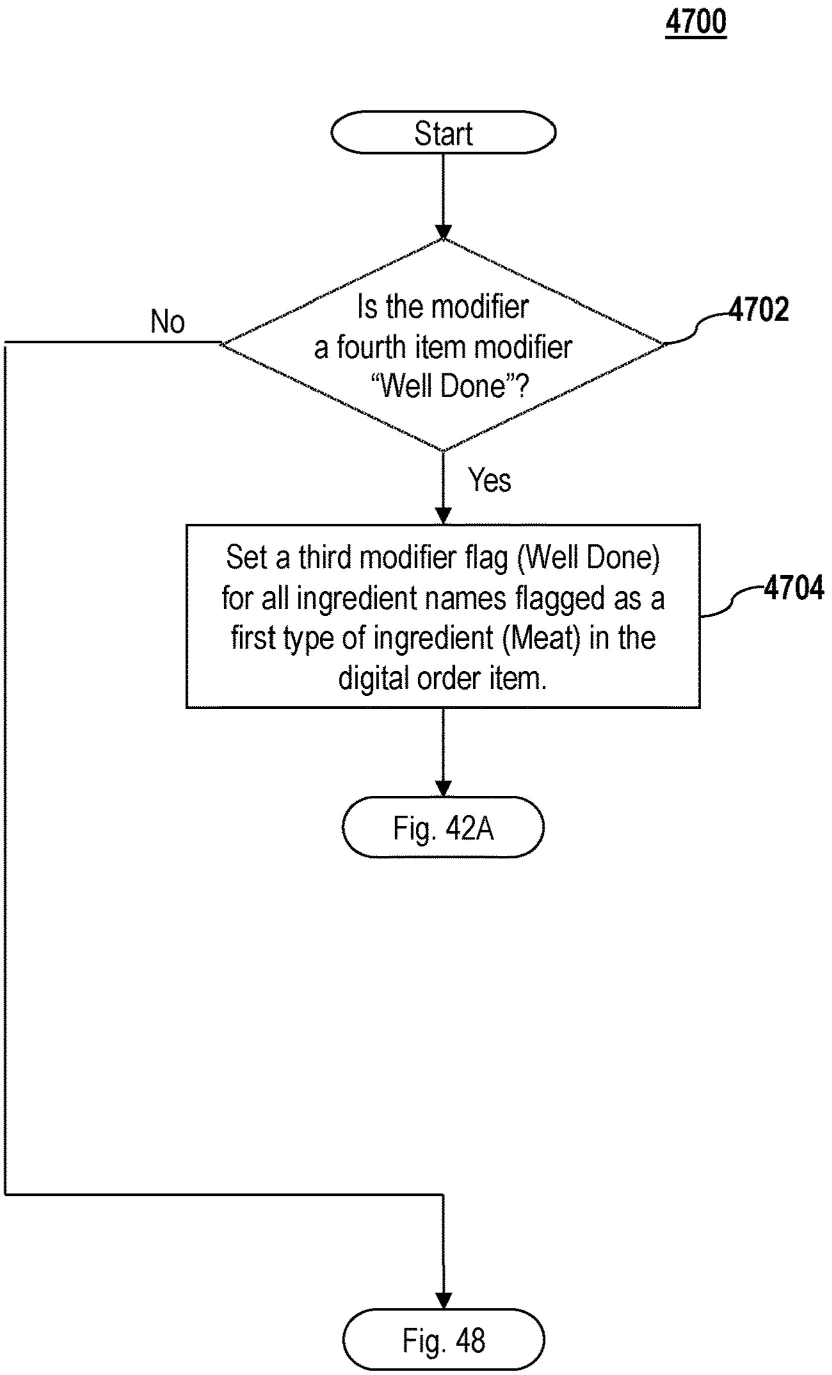
FIG. 47 shows a flow chart for method 4700, a continuation of methods 4300, 4500, and 4600, which together comprise a more detailed method for step 4236 of method 4200 (executing instructions for an action associated with the modifier).

FIG. 47 shows a flow chart for method 4700, a continuation of methods 4300, 4500, and 4600, which together comprise a more detailed method for step 4236 of method 4200 (executing instructions for an action associated with the modifier). Method 4700 starts with step 4702 which determines if the modifier found in the current data line is a fourth item modifier "Well Done." In the exemplary embodiment the fourth item modifier is "Well Done" but in other embodiments a different term can be used to trigger the actions of method 4700. If NO, then method 4700 terminates and proceeds to method 4800 (shown in FIG. 48). If YES, then method 4700 proceeds to step 4704, which sets a third modifier flag (Well Done) for all ingredient names flagged as a first type of ingredient (e.g. Meat) in the digital order item. Method 4700 then terminates and returns to the start of method 4200.

Figure 48:
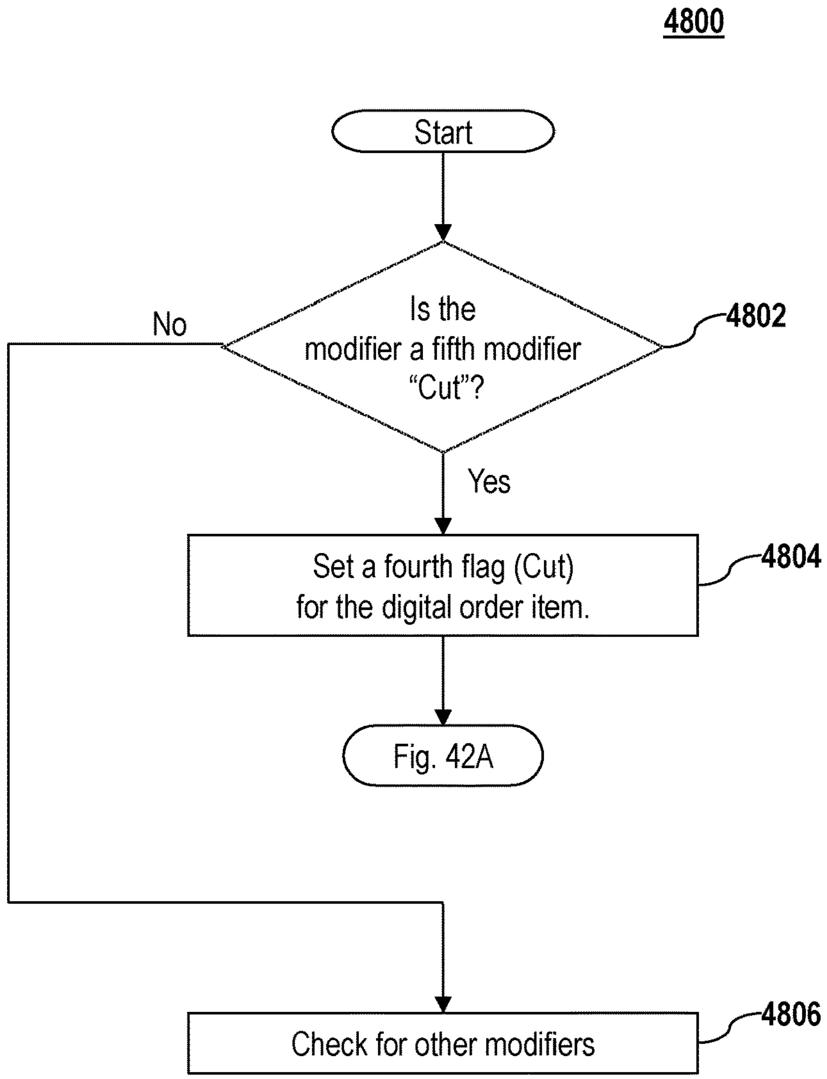
FIG. 48 shows a flow chart for method 4800, a continuation of methods 4300, 4500, 4600, and 4700, which together comprise a more detailed method for step 4236 of method 4200 (executing instructions for an action associated with the modifier).

FIG. 48 shows a flow chart for method 4800, a continuation of methods 4300, 4500, 4600, and 4700, which together comprise a more detailed method for step 4236 of method 4200 (executing instructions for an action associated with the modifier). Method 4800 starts with step 4802 which determines if the modifier found in the current data line is a fifth item modifier "Cut." In the exemplary embodiment the fifth item modifier is "Cut" but in other embodiments a different term can be used to trigger the actions of method 4800. If NO, then method 4800 terminates and proceeds to other methods to check for other modifiers, but if there are no further methods, then method 4800 returns to the start of method 4200. If YES, then method 4800 proceeds to step 4804, which sets a fourth modifier flag (Cut) for the digital order item. Method 4800 then terminates and returns to the start of method 4200.

Grill Station Module

Figure 31:
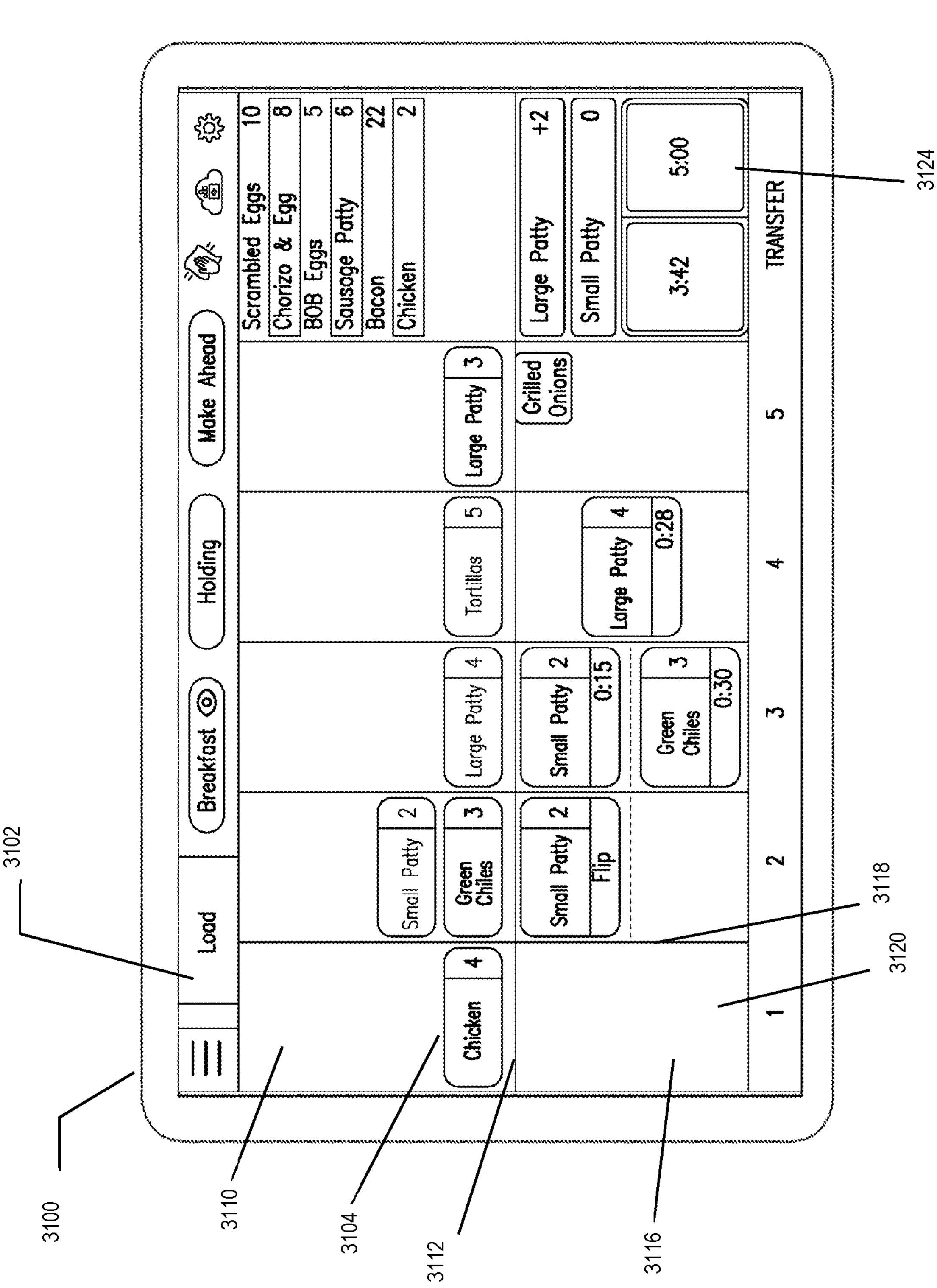
FIG. 31 shows a grill station user interface with multiple grill lanes and grill ingredient icons.

FIG. 31 shows a grill station computing device 3100 displaying a grill station user interface 3102. Multiple grill lanes, including a first grill lane 3120 are presented within the grill station user interface 3102 with border lines 3118 between them. The first grill lane 3120 is divided into a queue grill lane 3110 and an active grill lane 3116, with a dividing line 3112 between them. Grill ingredient icons are presented in the lanes along with an ingredient name and quantity number. For example, a first grill ingredient icon 3104 (Chicken) is presented in the queue grill lane 3110 with a quantity number of 4. A transfer area icon 3124 represents a transfer area on the grill where items are placed to keep warm after cooking and before further processing.

Figure 32:
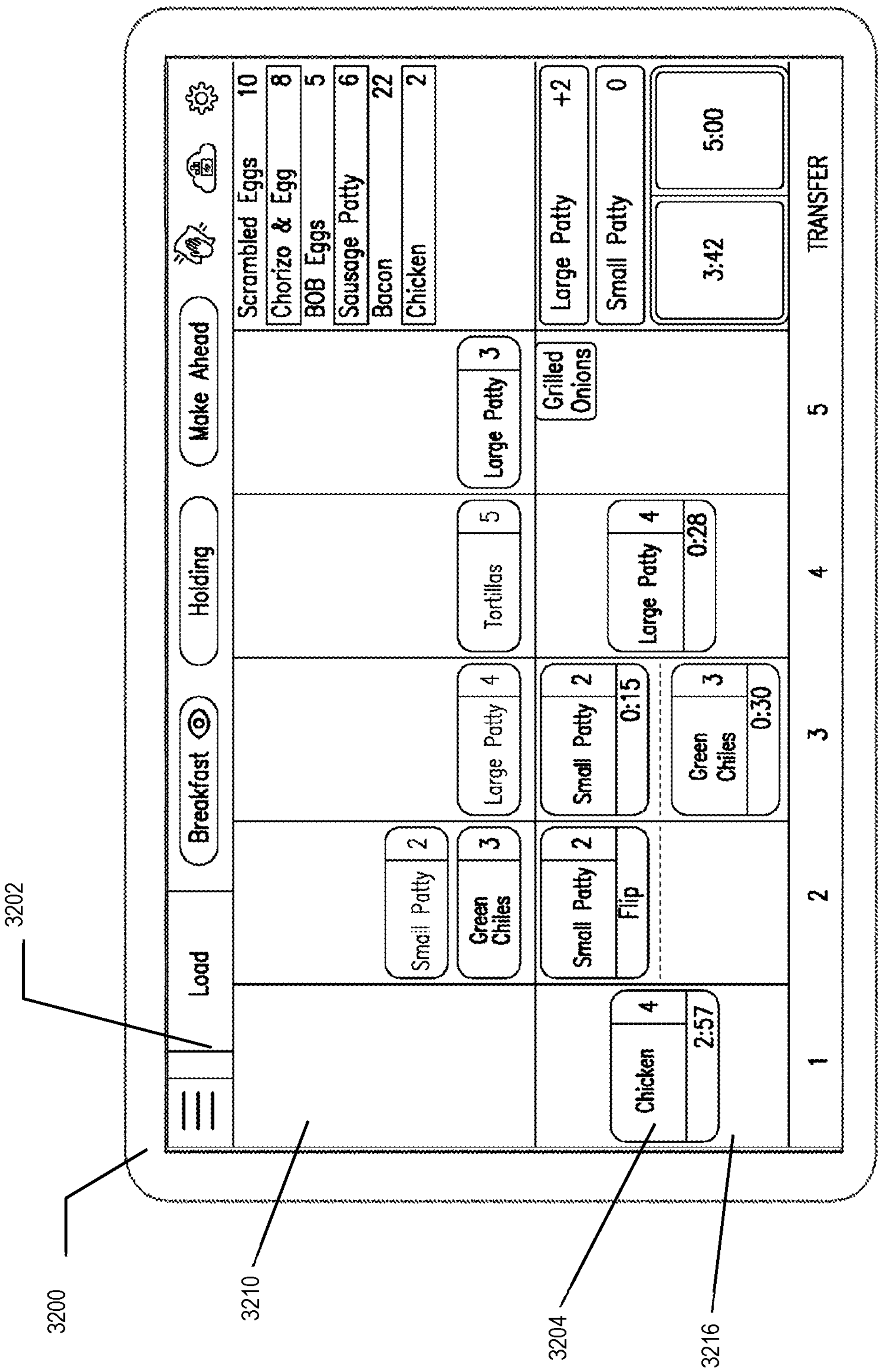
FIG. 32 shows the grill station user interface with a grill ingredient icon (Chicken) moving from a queue grill lane to an active grill lane (as seen in FIG. 31).

FIG. 32 shows a grill station computing device 3200 displaying a grill station user interface 3202 in which the grill ingredient icon 3204 ("Chicken") has moved from the queue grill lane 3210 (as seen in FIG. 31) to the active grill lane 3216. This occurs when the grill user has placed items on the active section of the grill (in the first lane) and tapped the grill ingredient icon 3204 to indicate cooking of these ingredients has commenced. A timer counts down from a pre-determined value and the real-time count is displayed with the grill ingredient icon 3204. Four pieces of chicken require the whole active grill lane 3216, so the grill ingredient icon 3204 is shown as taking up the entire lane.

Figure 33:
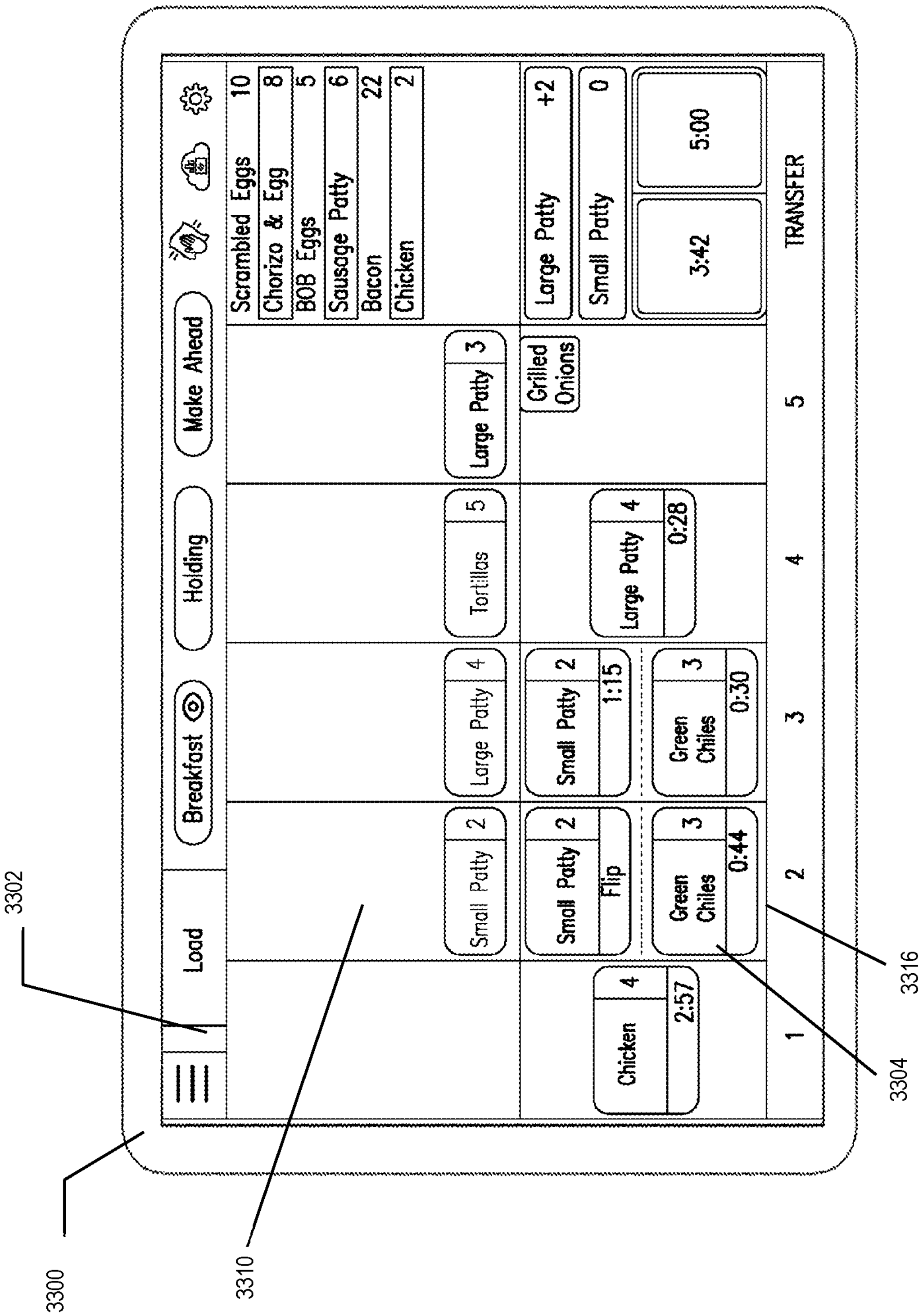
FIG. 33 shows the grill station user interface with a grill ingredient icon (Green Chiles) moving from a queue grill lane to an active grill lane (as seen in FIG. 32).

FIG. 33 shows a grill station computing device 3300 displaying a grill station user interface 3302 in which a grill ingredient icon 3304 ("Green Chiles") has moved from the queue grill lane 3310 (as seen in FIG. 32) to the active grill lane 3316. Three order items of Green Chilies don't take up much room so they only require half of the active grill lane 3316, and can share the lane with two small patties.

Figure 34:
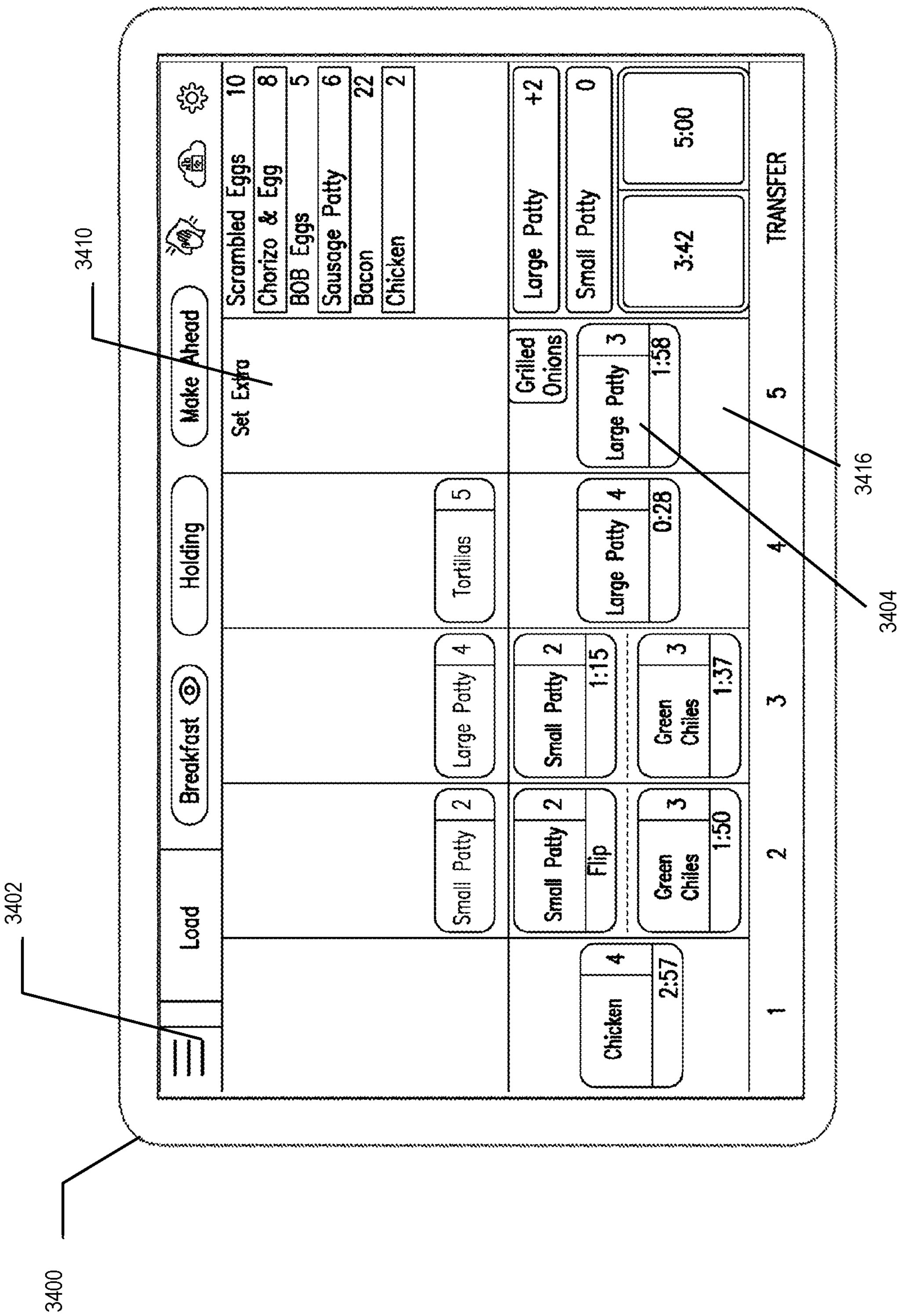
FIG. 34 shows the grill station user interface with a grill ingredient icon (Large Patty) moving from a queue grill lane to an active grill lane (as seen in FIG. 33).

FIG. 34 shows a grill station computing device 3400 displaying a grill station user interface 3402 in which the grill ingredient icon 3404 ("Large Patty") has moved from the queue grill lane 3410 (as seen in FIG. 33) to the active grill lane 3416. Three large patties require the whole active grill lane 3416, so the grill ingredient icon 3404 is shown as taking up the entire lane.

Figure 35:
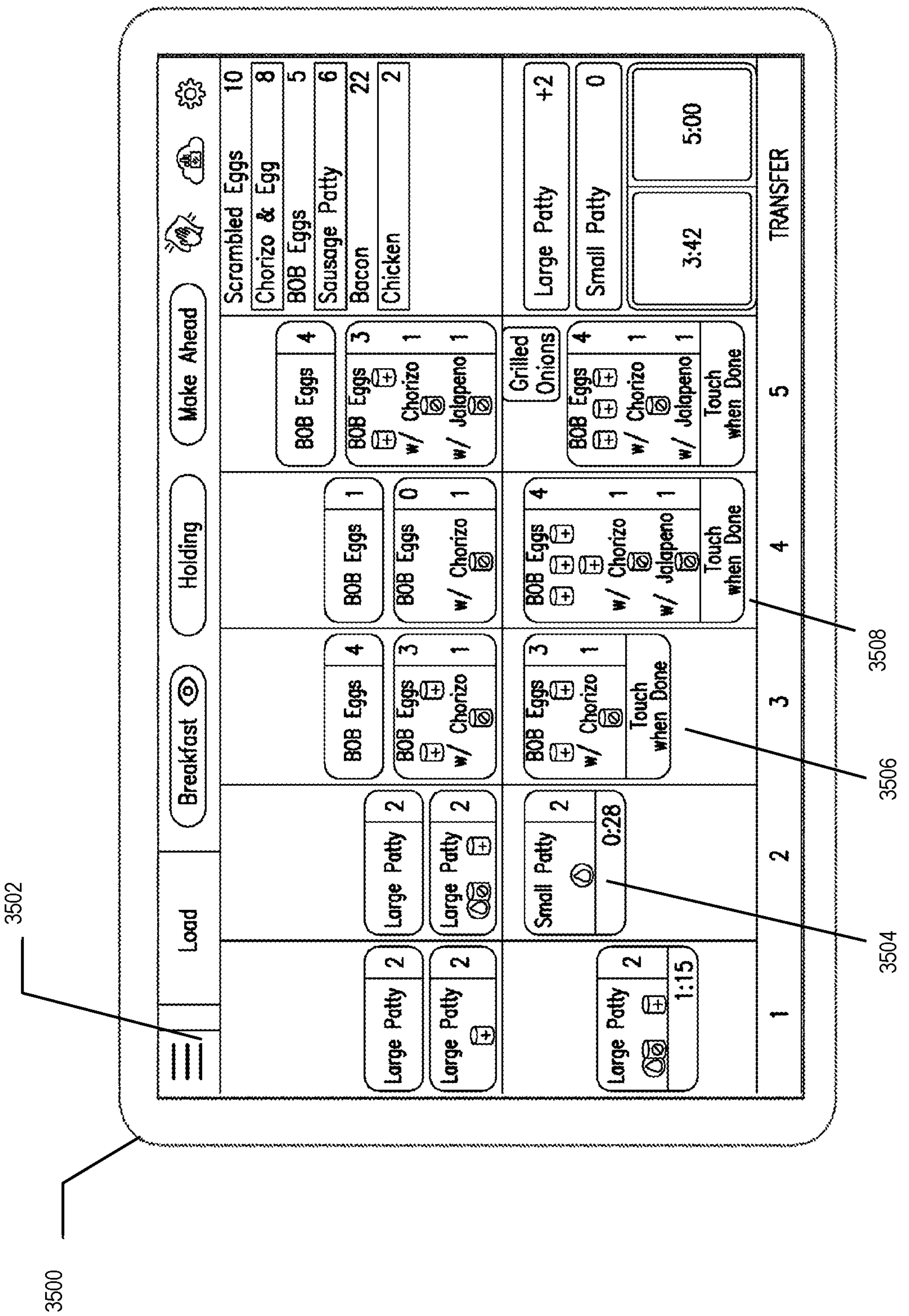
FIG. 35 shows a grill station user interface with multiple grill lanes and grill ingredient icons, the grill ingredient icons shown with modifier icons of various types.

FIG. 35 shows a grill station computing device 3500 displaying a grill station user interface 3502 in which the grill ingredient icons are shown with modifier icons of various types. Grill ingredient icon 3504 is for two small patties and it has a "Well Done" icon. Grill ingredient icon 3506 is for four BOB (Breakfast On a Bun) eggs and has one row of two "extra seasoning" icons and a quantity of three following. This indicates that 2 of the 3 BOB eggs get extra seasoning and one does not. A second row is presented with the a "no seasoning" icon and labeled "w/Chorizo" and a quantity of one following. This indicates that the one BOB egg gets chorizo and no seasoning. Grill ingredient icon 3506 is presented with a "Touch when Done" text box instead of a timer.

Grill ingredient icon 3508 is for Six BOB (Breakfast On a Bun) eggs and has one row of four "extra seasoning" icons and a quantity of four following. This indicates that all four of the BOB eggs get extra seasoning. A second row is presented with the a "no seasoning" icon and labeled "w/Chorizo" and a quantity of one following. This indicates that the one BOB egg gets chorizo and no seasoning. A second row is presented with the a "no seasoning" icon and labeled "w/Jalapeno" and a quantity of one following. This indicates that the one BOB egg gets jalapeno and no seasoning. Grill ingredient icon 3508 is presented with a "Touch when Done" text box instead of a timer.

Figure 36:
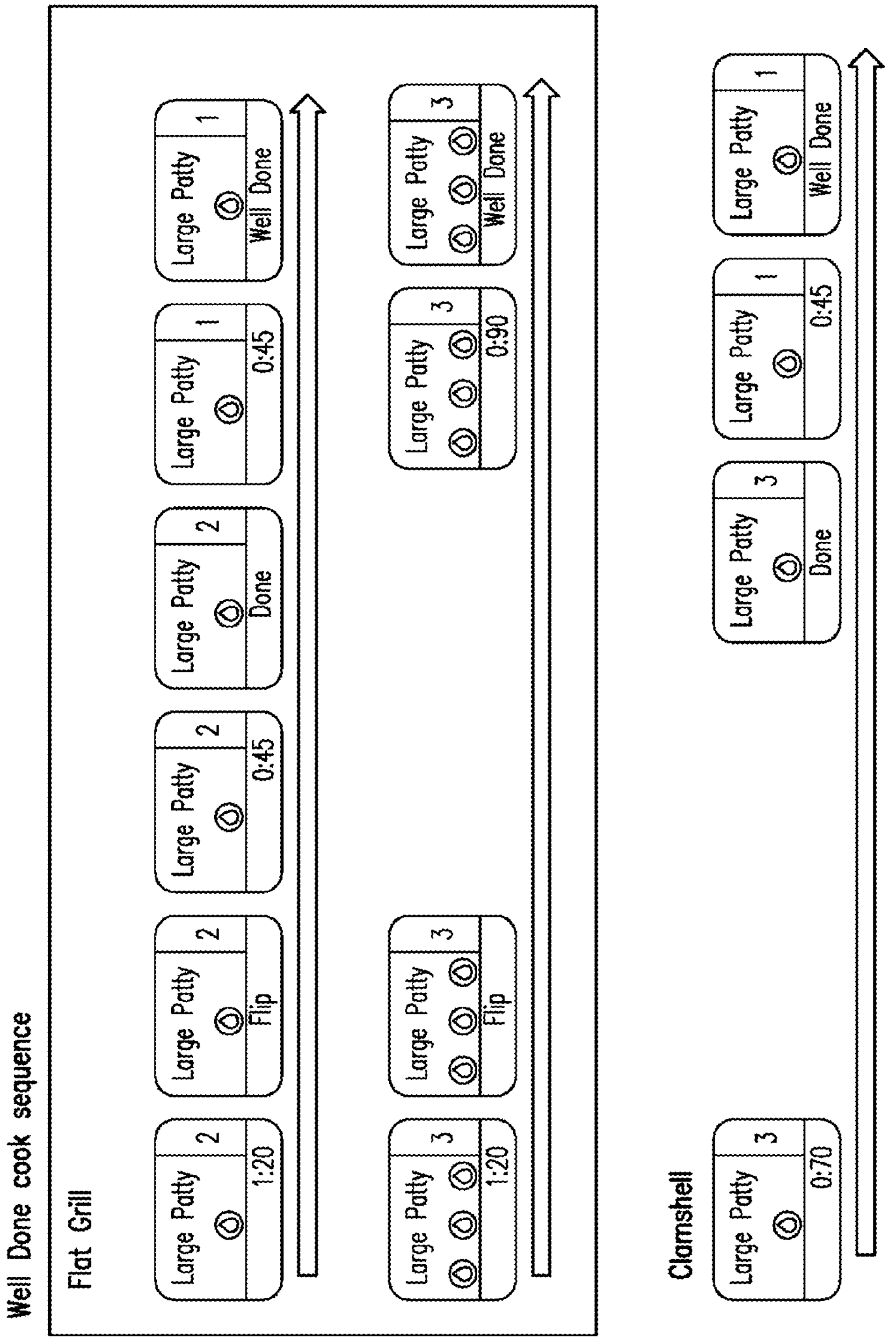
FIG. 36 shows several series of grill icons, each showing how the icon changes during a particular cook sequence.

FIG. 36 shows several series of grill icons, each showing how the icon changes during a particular cook sequence.

FIGS. 49A-49D show a flow chart for method 4900, a method for the grill station module 714. On FIG. 49A, method 4900 starts with step 4902, which presents on a display of the grill station computing device, a grill station user interface. Step 4904 presents a first grill lane within the grill station user interface, the first grill lane one of a plurality of grill lanes, each of the plurality of grill lanes divided into a queue grill lane and an active grill lane, the first grill lane divided between a first queue grill lane and a first active grill lane. Step 4906 determines a first number of instances of a first ingredient to be cooked for a first digital order item, the first ingredient associated with a first ingredient name. Step 4908 receives, from a build device, a first cook instruction to cook the first number of instances of the first ingredient for the first digital order item. The instructions received in step 4908 may be redundant to the determination made in step 4906 or may override it. Step 4910 determines a current status of each of the plurality of grill lanes. Step 4912 selects the first grill lane for grilling the first ingredient based on the current status of the plurality of grill lanes.

Figure 49A:
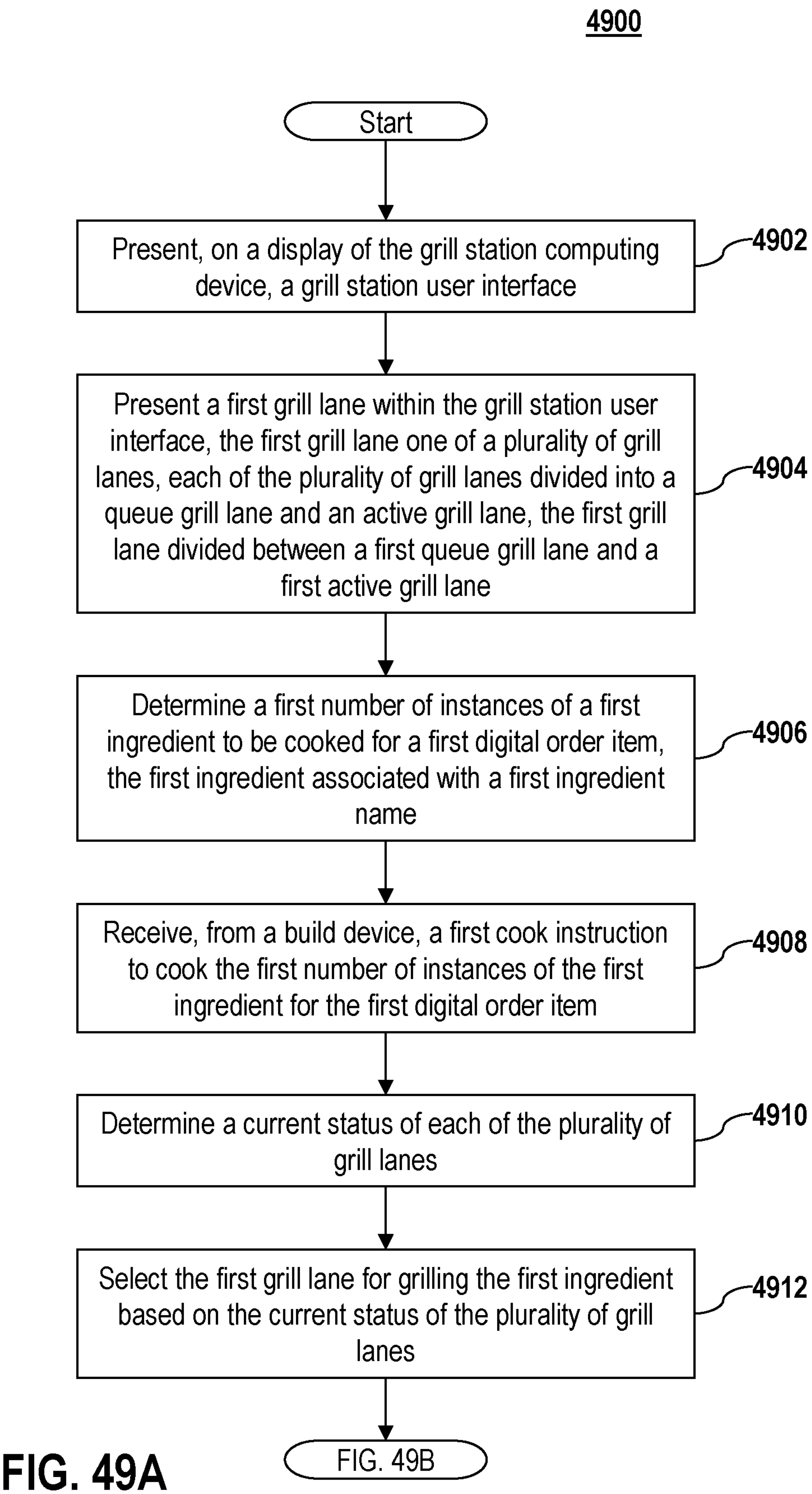
FIGS. 49A-49D show a flow chart for a method for the grill station module.
Figure 49B:
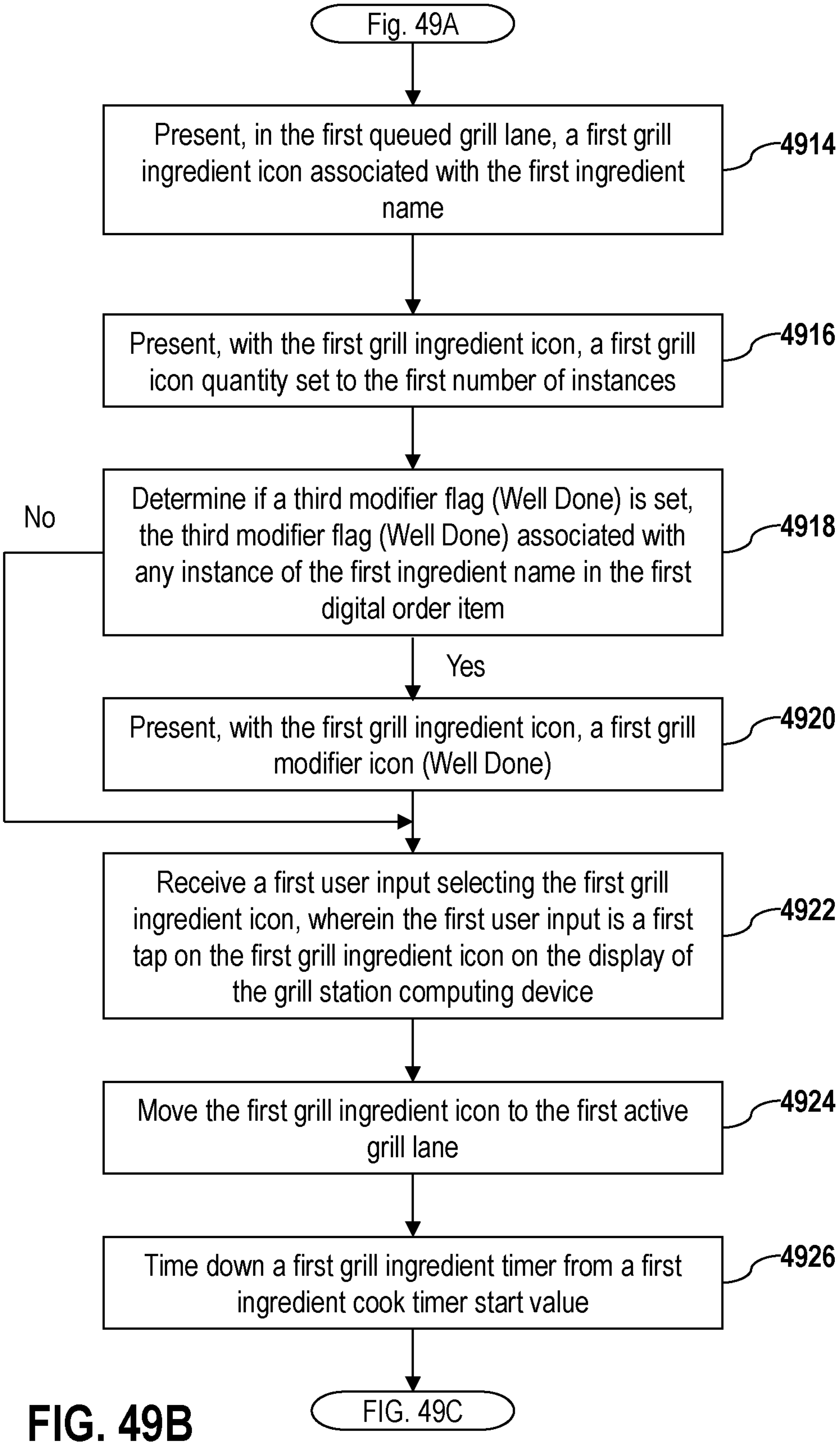

On FIG. 49B, step 4914 presents, in the first queued grill lane, a first grill ingredient icon associated with the first ingredient name. Step 4916 presents, with the first grill ingredient icon, a first grill icon quantity set to the first number of instances. Step 4918 determines if a third modifier flag (Well Done) is set, the third modifier flag (Well Done) associated with any instance of the first ingredient name in the first digital order item. If NO, then method 4900 skips to step 4922. If YES, then method 4900 proceeds to step 4920, which presents, with the first grill ingredient icon, a first grill modifier icon (Well Done). Step 4922 receives a first user input selecting the first grill ingredient icon, wherein the first user input is a first tap on the first grill ingredient icon on the display of the grill station computing device. Step 4924 moves the first grill ingredient icon to the first active grill lane. Step 4926 starts timing down a first grill ingredient timer from a first ingredient cook timer start value.

Figure 49C:
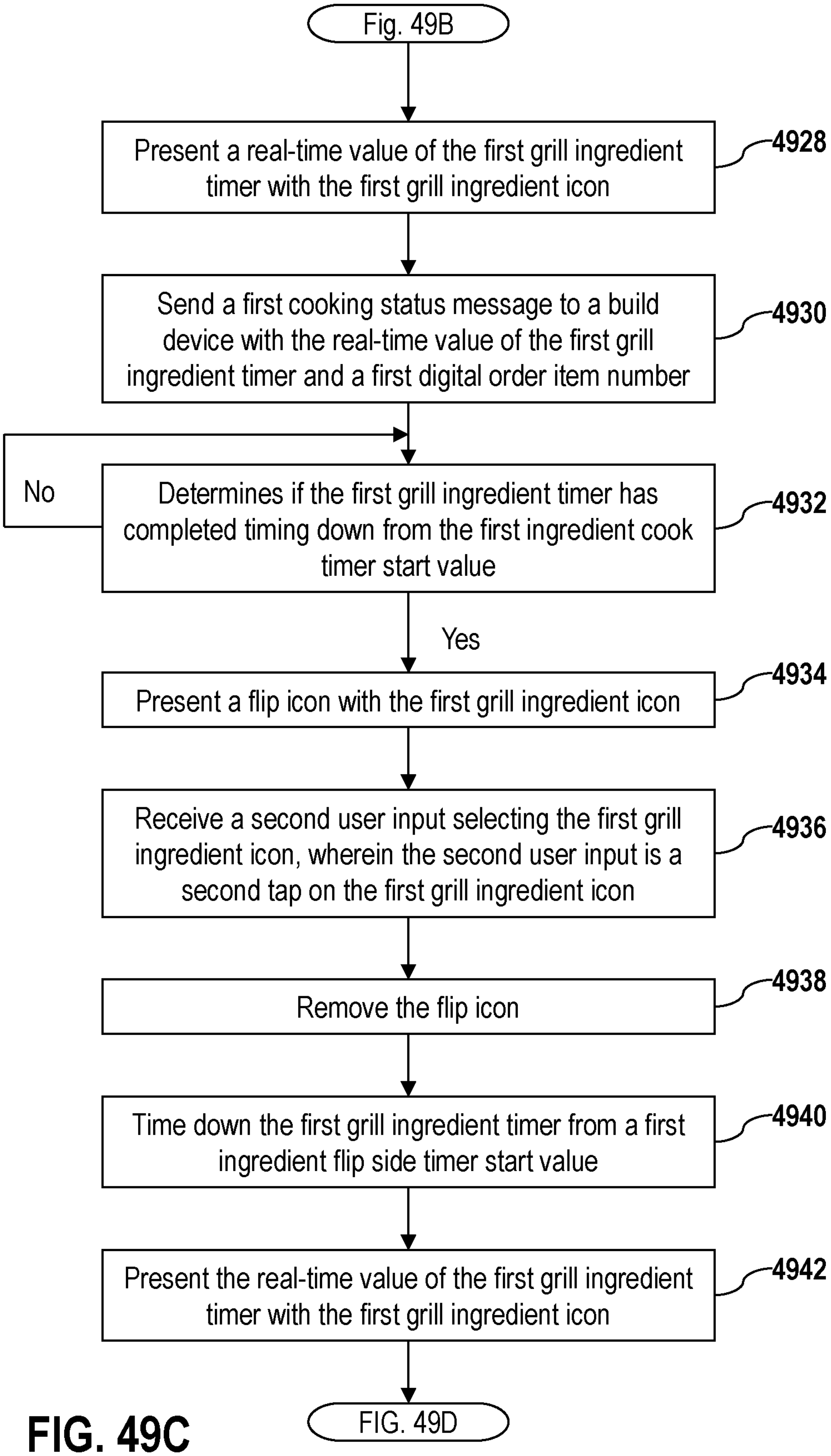

On FIG. 49C, step 4928 presents a real-time value of the first grill ingredient timer with the first grill ingredient icon. Step 4930 sends a first cooking status message to a build station computing device with the real-time value of the first grill ingredient timer and a first digital order item number. Step 4932 determines if the first grill ingredient timer has completed timing down from the first ingredient cook timer start value. If NO, then the method 4900 loops back on step 4932. If YES, then method 4900 proceeds to step 4934, which presents a flip icon with the first grill ingredient icon. Step 4936 receives a second user input selecting the first grill ingredient icon, wherein the second user input is a second tap on the first grill ingredient icon. Step 4938 removes the flip icon. Step 4940 starts timing down the first grill ingredient timer from a first ingredient flip side timer start value. Step 4942 presents the real-time value of the first grill ingredient timer with the first grill ingredient icon.

Figure 49D:
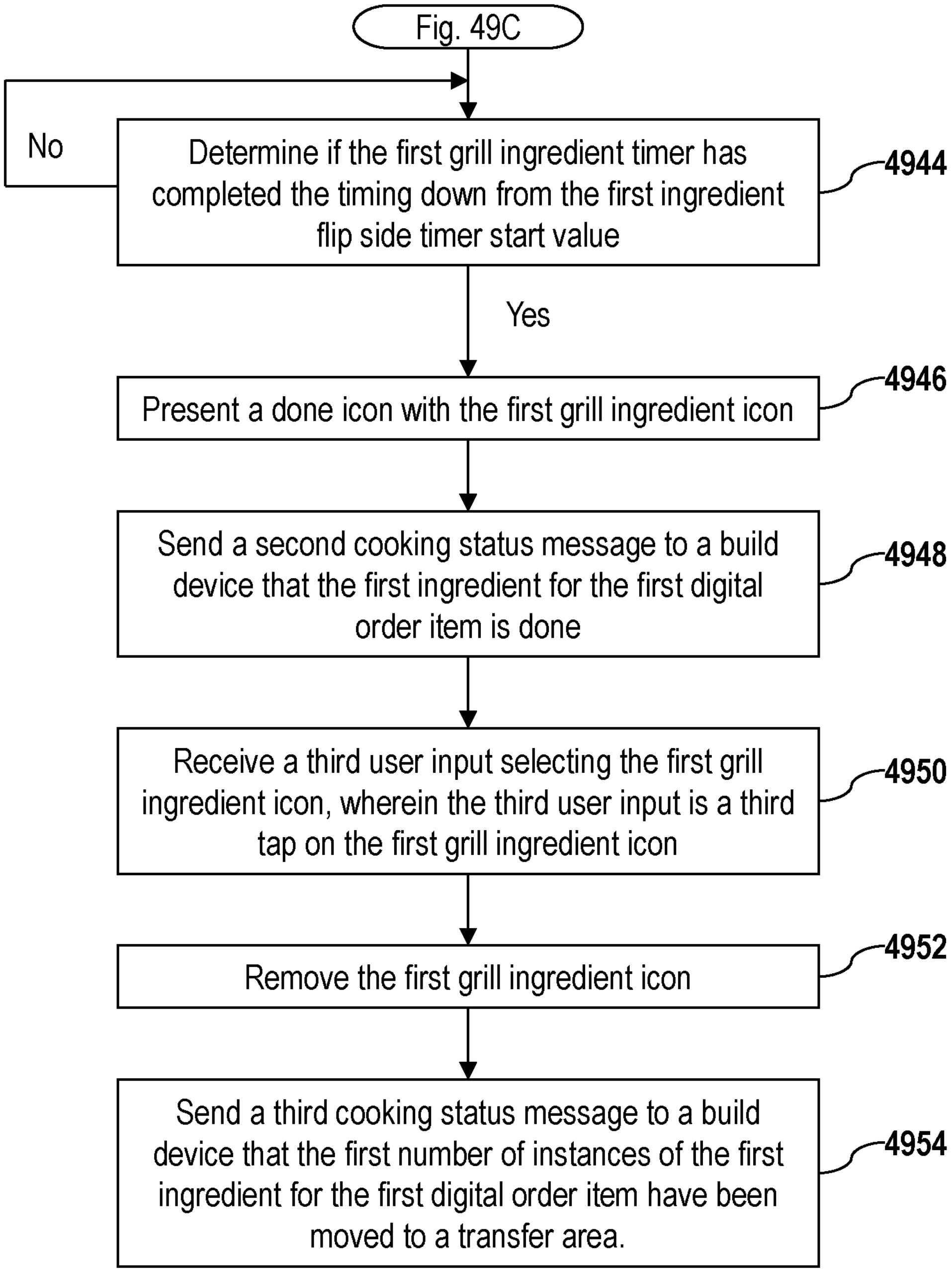

On FIG. 49D, step 4944 determines if the first grill ingredient timer has completed the timing down from the first ingredient flip side timer start value. If NO, then the method 4900 loops back on step 4944. If YES, then method 4900 proceeds to step 4946, which presents a done icon with the first grill ingredient icon. Step 4948 sends a second cooking status message to a build device that the first ingredient for the first digital order item is done. Step 4950 receives a third user input selecting the first grill ingredient icon, wherein the third user input is a third tap on the first grill ingredient icon. Step 4952 removes the first grill ingredient icon. Step 4954 sends a third cooking status message to a build device that the first number of instances of the first ingredient for the first digital order item have been moved to a transfer area.

Build Station Module

Figure 8:
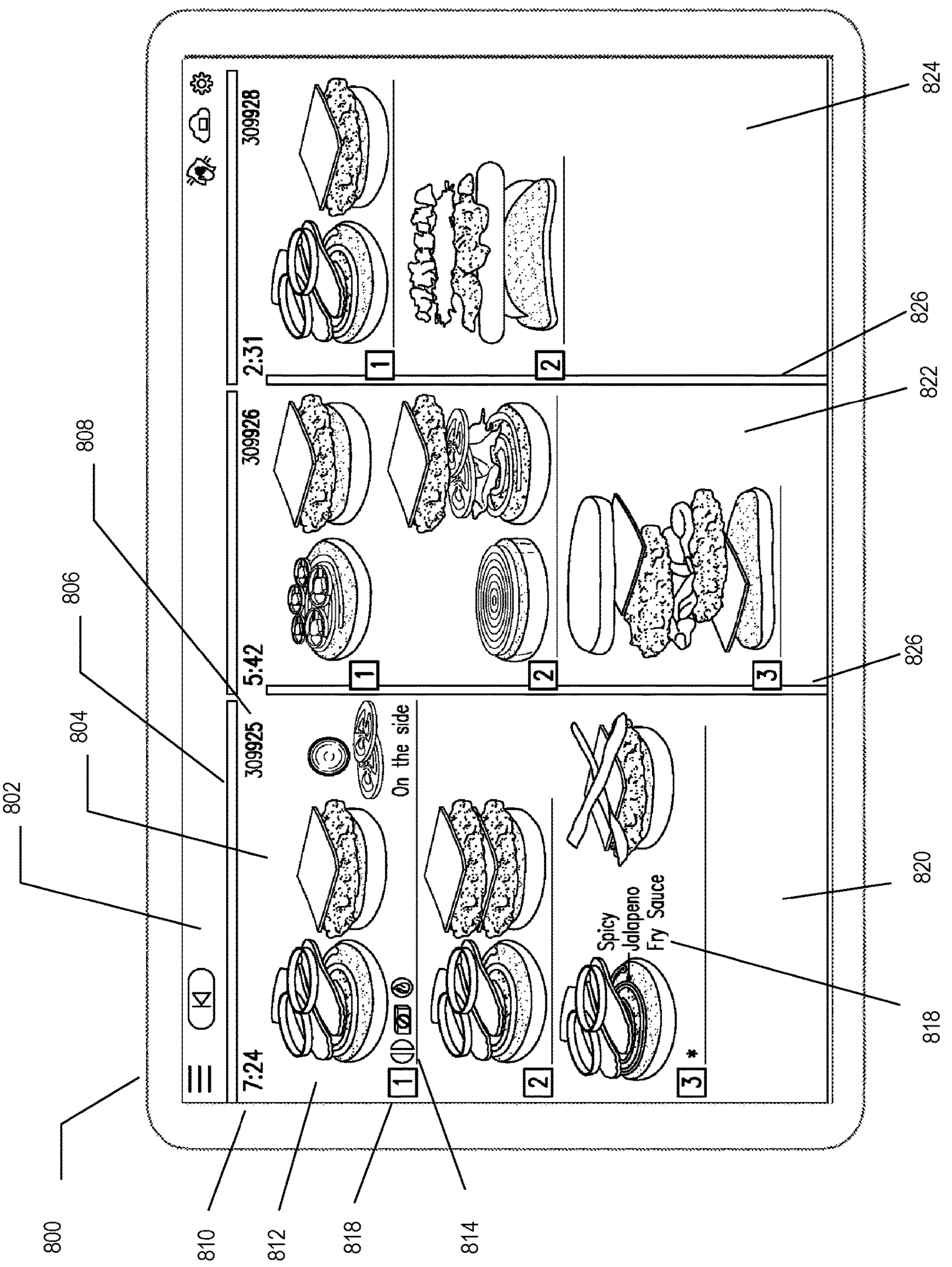
FIG. 8 shows a build station user interface with multiple order lanes and multiple items in each lane, each item displayed in multiple columns.

FIG. 8 shows a build station computing device 800 displaying a build station user interface 802 with multiple order lanes and graphical representations of multiple order items in each lane, each order item displayed in multiple columns. The build station user interface 802 is divided into a first build order lane 820, a second build order lane 822, and a third build order lane 824, each displaying a graphical representation of a digital order. The lanes are separated by graphical dividers 826. A first status bar 806 is presented over the graphical representation of a first order 804 along with a first order number 808, and an elapsed time 810 for the order. A graphical representation of a first order 804 is presented in the first build order lane 820, with graphical representations of three digital order items, including a first digital order item 812 (a burger) and a first digital order item number 818. Images representing the ingredients of first digital order item 812 are presented in three columns, with images of ingredients for a top portion of the burger on the left, images of ingredients for a bottom portion of the burger in the middle and images for "on the side" ingredients on the right. Modifier icons 814 are presented with the first digital order item 812, including a cut icon, a no butter icon, and a well done icon. A text callout 818 with an ingredient name (Spicy Jalapeno Fry Sauce) is presented next to a graphical representation of the ingredient named in the callout. In the exemplary embodiment, the build lanes are vertical, but in other embodiments, they may be horizontal.

Figure 9:
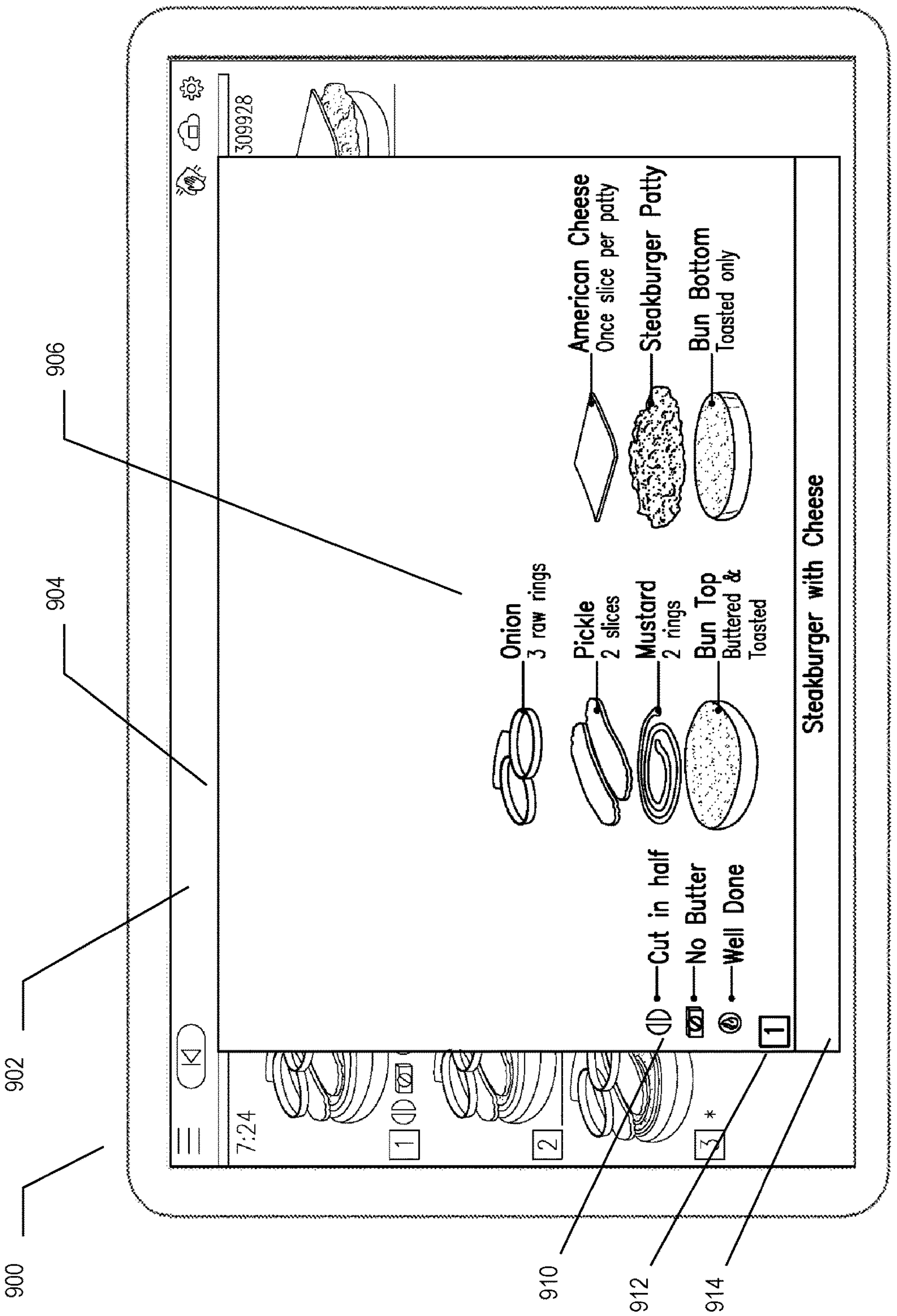
FIG. 9 shows a build station user interface with an expanded view of a single item in exploded view and in dual columns.

FIG. 9 shows a build station computing device 900 displaying a build station user interface 902 with an expanded view of a single item in exploded view and in dual columns. A user tapping on the display on a graphical representation of an order item will bring up a solo display 904 with that order item in an expanded (exploded) format. Images of the ingredients are presented in two columns with images of the ingredients for a top portion of the burger on the left, images of ingredients for a bottom portion of the burger on the right. Each ingredient image has a callout 906 naming the ingredient and giving quantities. The solo display 904 also presents modifier icons 910, a digital order item number 912 and a text box 914 with the name of the order item.

Figure 10:
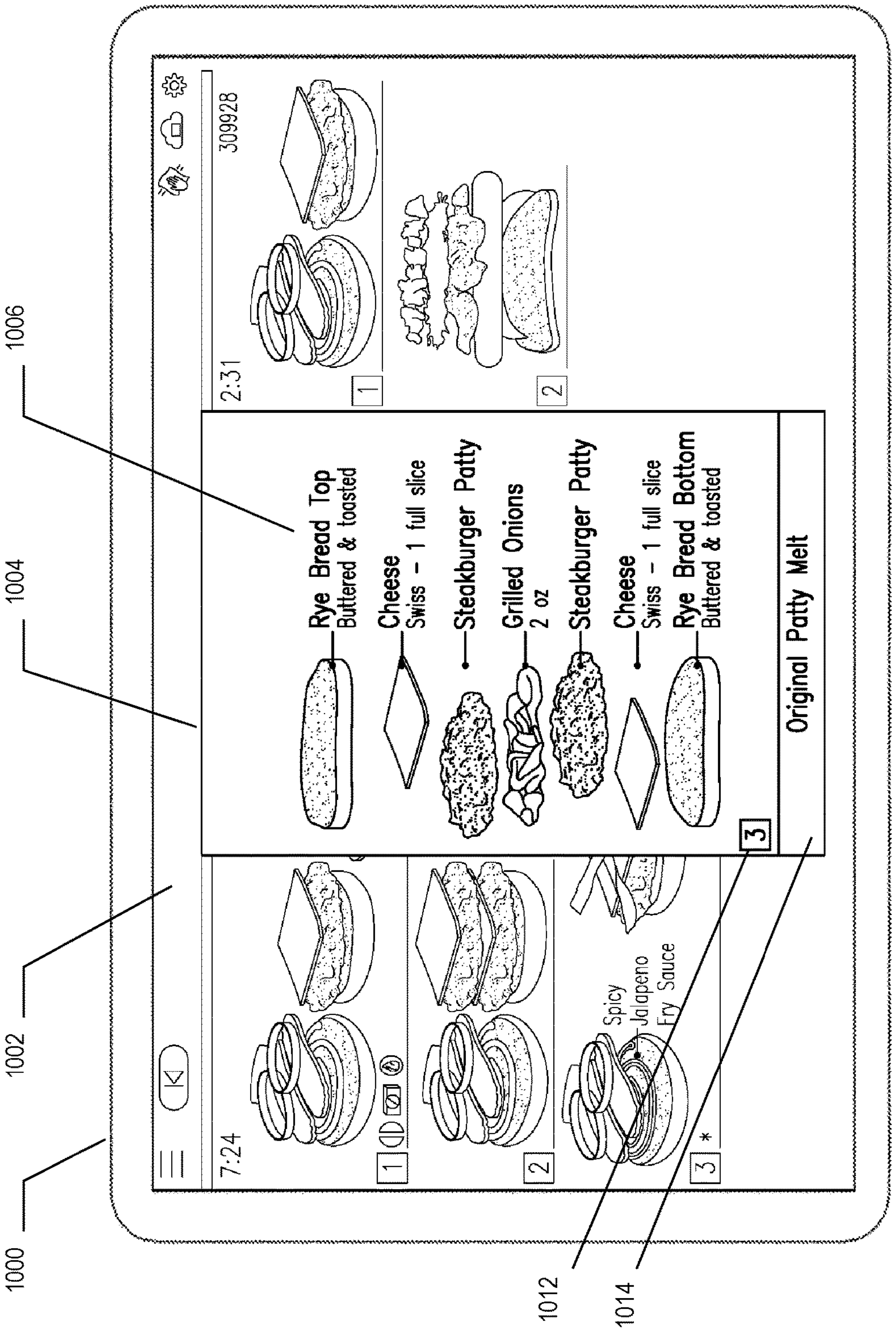
FIG. 10 shows a build station user interface with an expanded view of a single item in exploded view and in a single column.

FIG. 10 shows a build station computing device 1000 displaying a build station user interface 1002 with an expanded view of a single item in exploded view and in a single column. A user tapping on the display on a graphical representation of an order item presented in a single column will bring up a solo display 1004 with that order item in an expanded (exploded) format. The images of the ingredients are presented in a single column. Each ingredient image has a callout 1006 naming the ingredient and giving quantities. The solo display 1004 also presents a digital order item number 1012, and a text box 1014 with the name of the order item.

Figure 11:
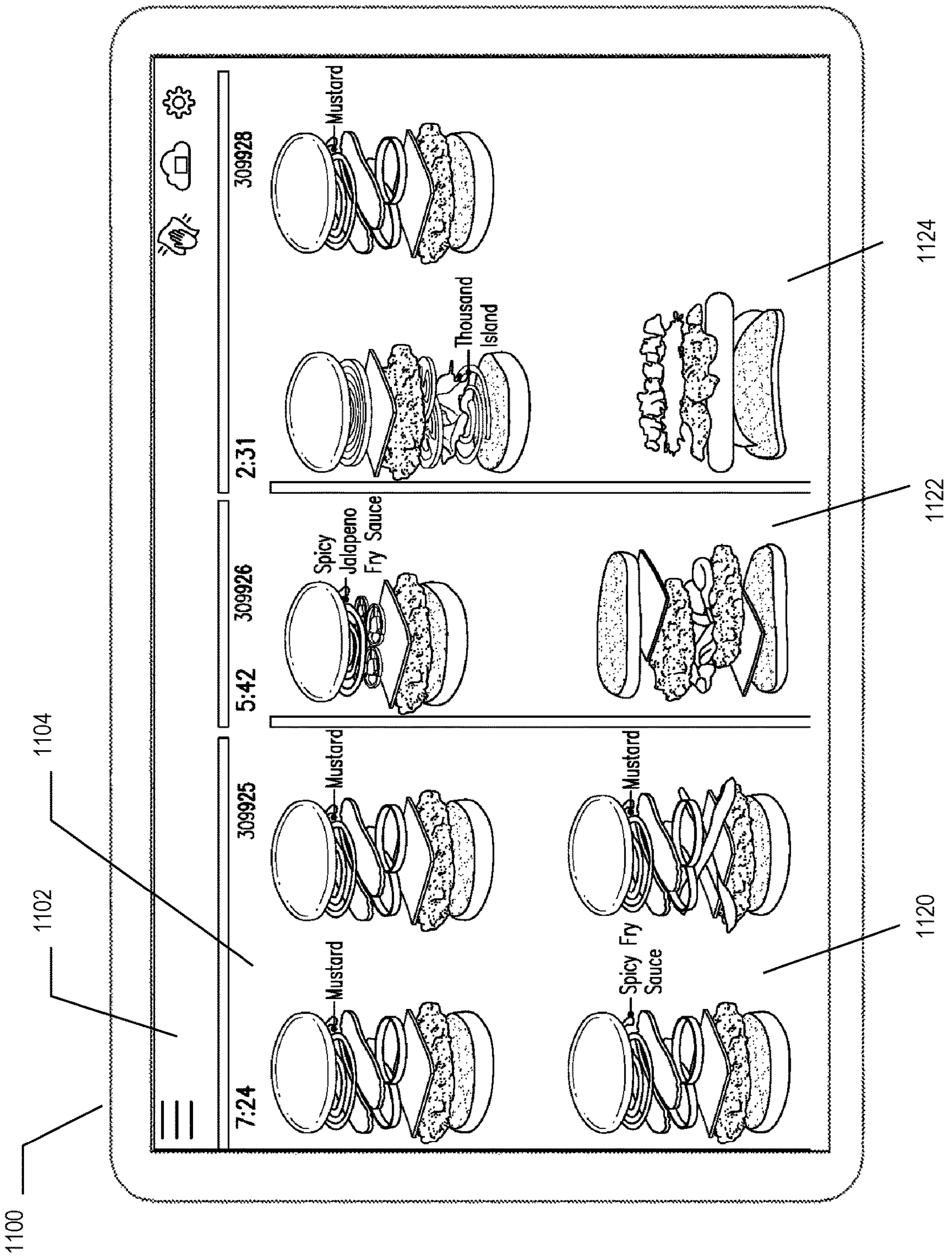
FIG. 11 shows a build station user interface with multiple order lanes and multiple items in each lane, each item displayed in single columns.

FIG. 11 shows a build station computing device 1100 displaying a build station user interface 1102 with multiple order lanes and multiple items in each lane, each item displayed in a single column. The build station user interface 1102 is divided into a first build order lane 1120, a second build order lane 1122, and a third build order lane 1124, each displaying a graphical representation of a digital order, including graphical representation of a first order 1104.

Figure 12:
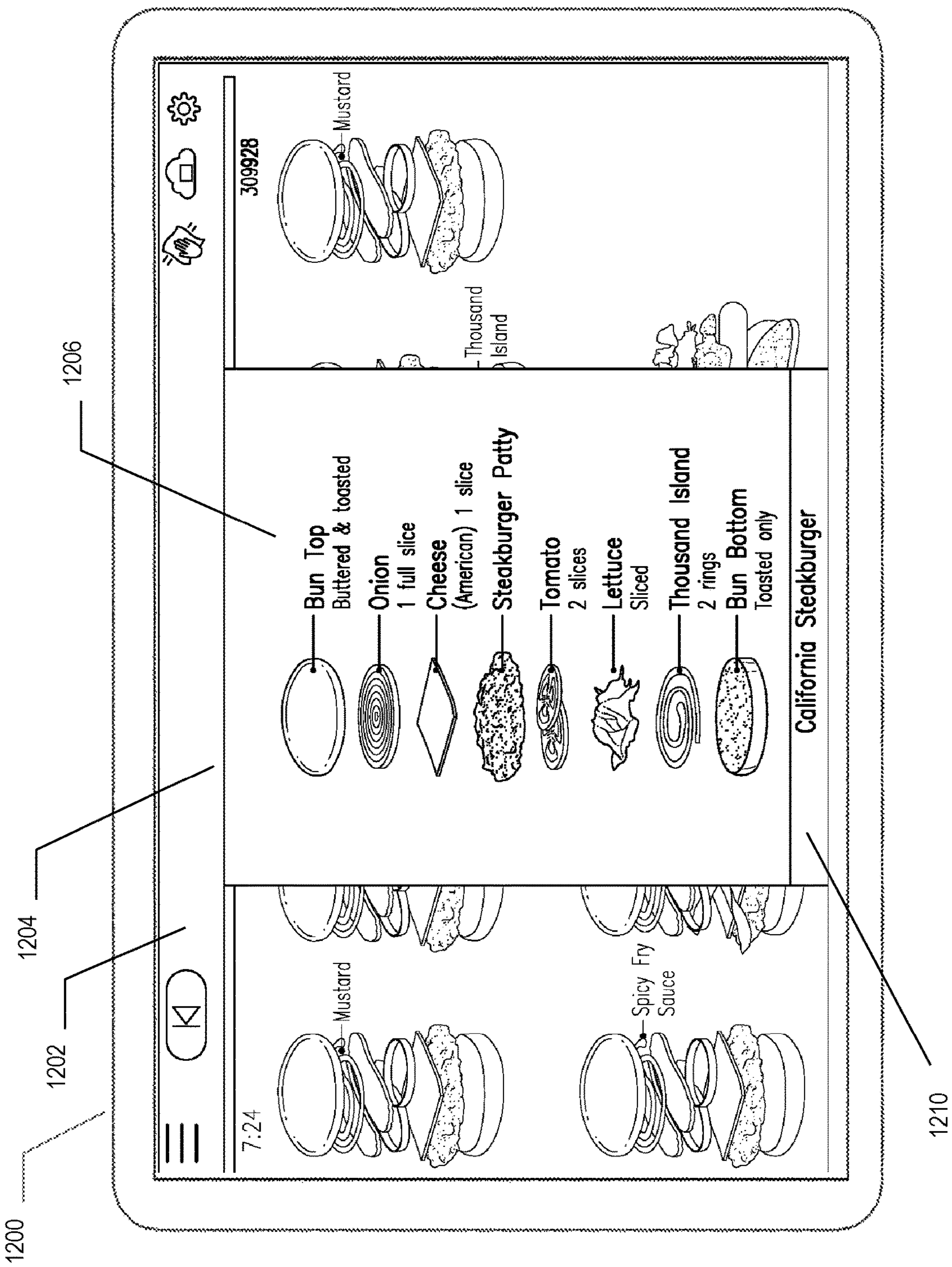
FIG. 12 shows a build station user interface with an expanded view of a single item in exploded view and in a single column.

FIG. 12 shows a build station computing device 1200 displaying a build station user interface 1202 with an expanded view of a single item in exploded view and in a single column. A user tapping on the display on a graphical representation of an order item presented in a single column will bring up a solo display 1204 with that order item in an expanded (exploded) format. The images of the ingredients are presented in a single column. Each ingredient image has a callout 1206 naming the ingredient and giving quantities. The solo display 1204 also presents a text box 1210 with the name of the order item.

Figure 13:
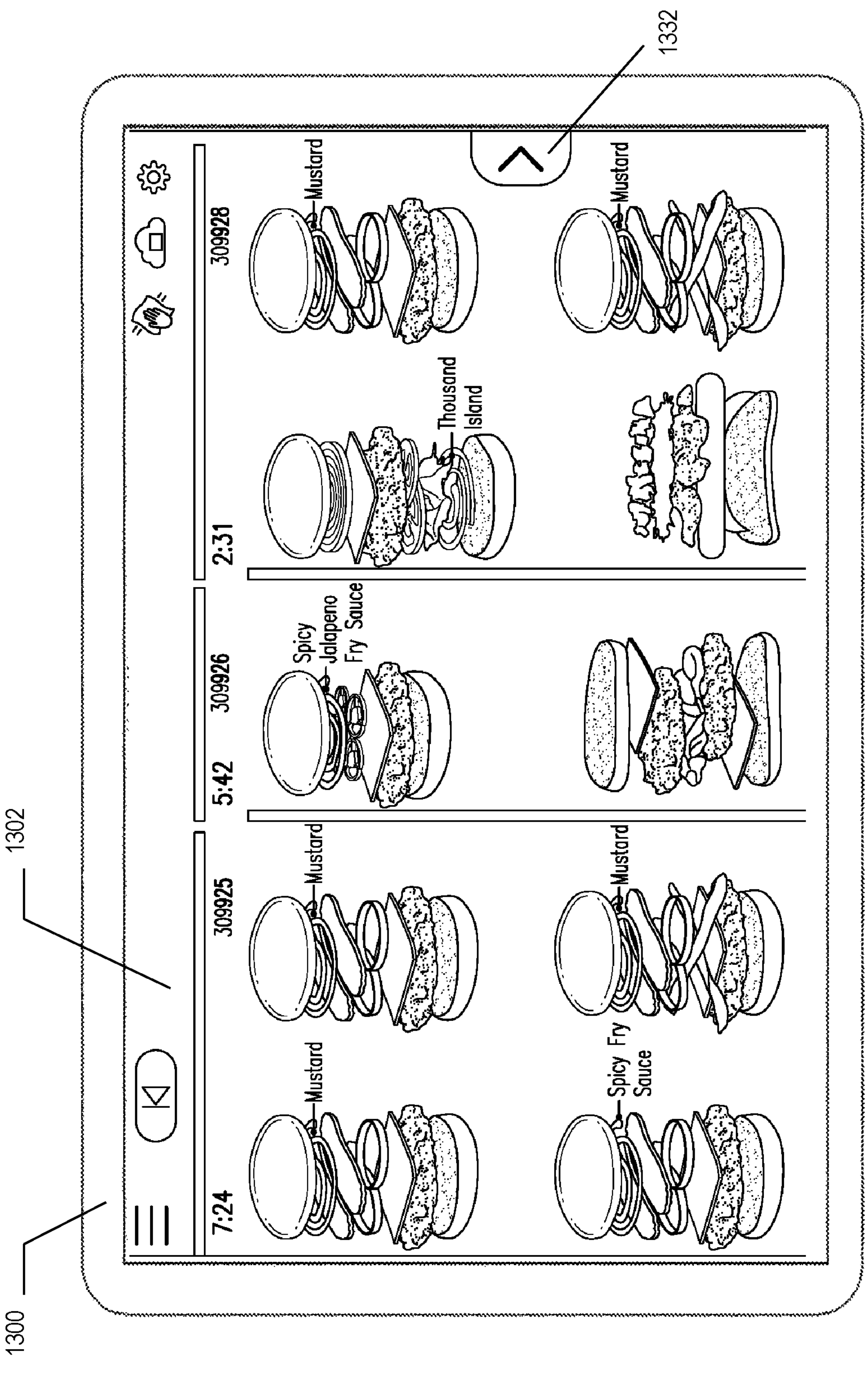
FIG. 13 shows the build station user interface of FIG. 11 with an arrow tab on the right side to indicate more orders not seen.

FIG. 13 shows a build station computing device 1300 displaying a build station user interface 1302 with an arrow tab 1332 on the right side to indicate more orders not seen. A user can swipe on the arrow tab to scroll to other orders not currently on screen. As orders enter and are presented on the right, orders presented to the left move leftward and are removed from the user interface 1302 if there is insufficient room.

Figure 14:
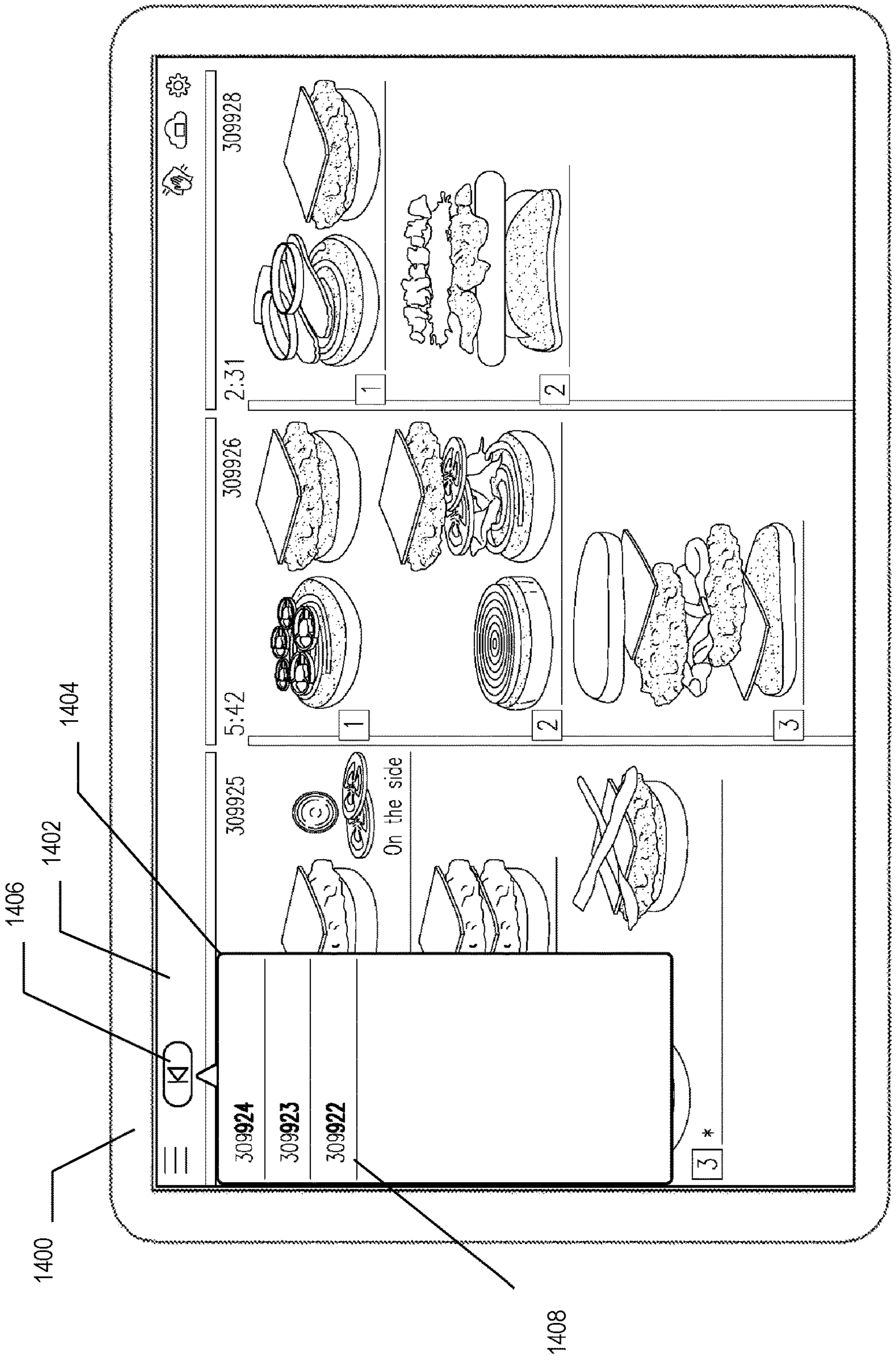
FIG. 14 shows the build station user interface of FIG. 8 with a pulldown menu for a user to call up other digital order numbers and have them displayed.

FIG. 14 shows a build station computing device 1400 displaying a build station user interface 1402 with a pull-down menu 1404 for a user to call up other digital order numbers 1408 and have them displayed. A user can touch a pulldown tab 1408 and select one of the order numbers 1408 with a touch.

Figure 15:
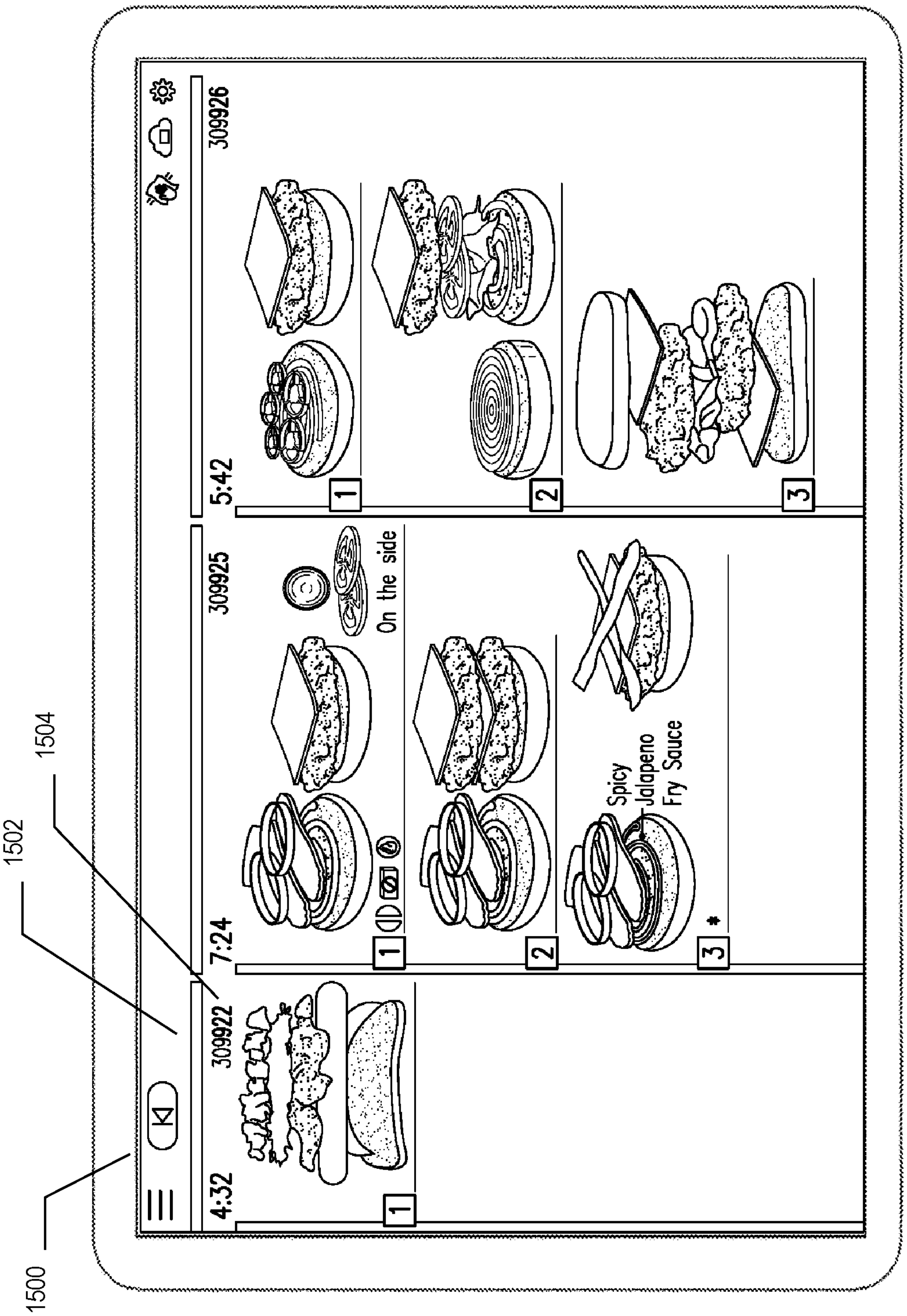
FIG. 15 shows the build station user interface of FIG. 14 after a digital order number has been called up and displayed.

FIG. 15 shows a build station computing device 1500 displaying a build station user interface 1502 after a digital order number 1504 has been called up and displayed. The newly called up order is presented in the left most build order lane and the other orders are pushed right. If there is not enough room, the rightmost order is removed.

Figure 16:
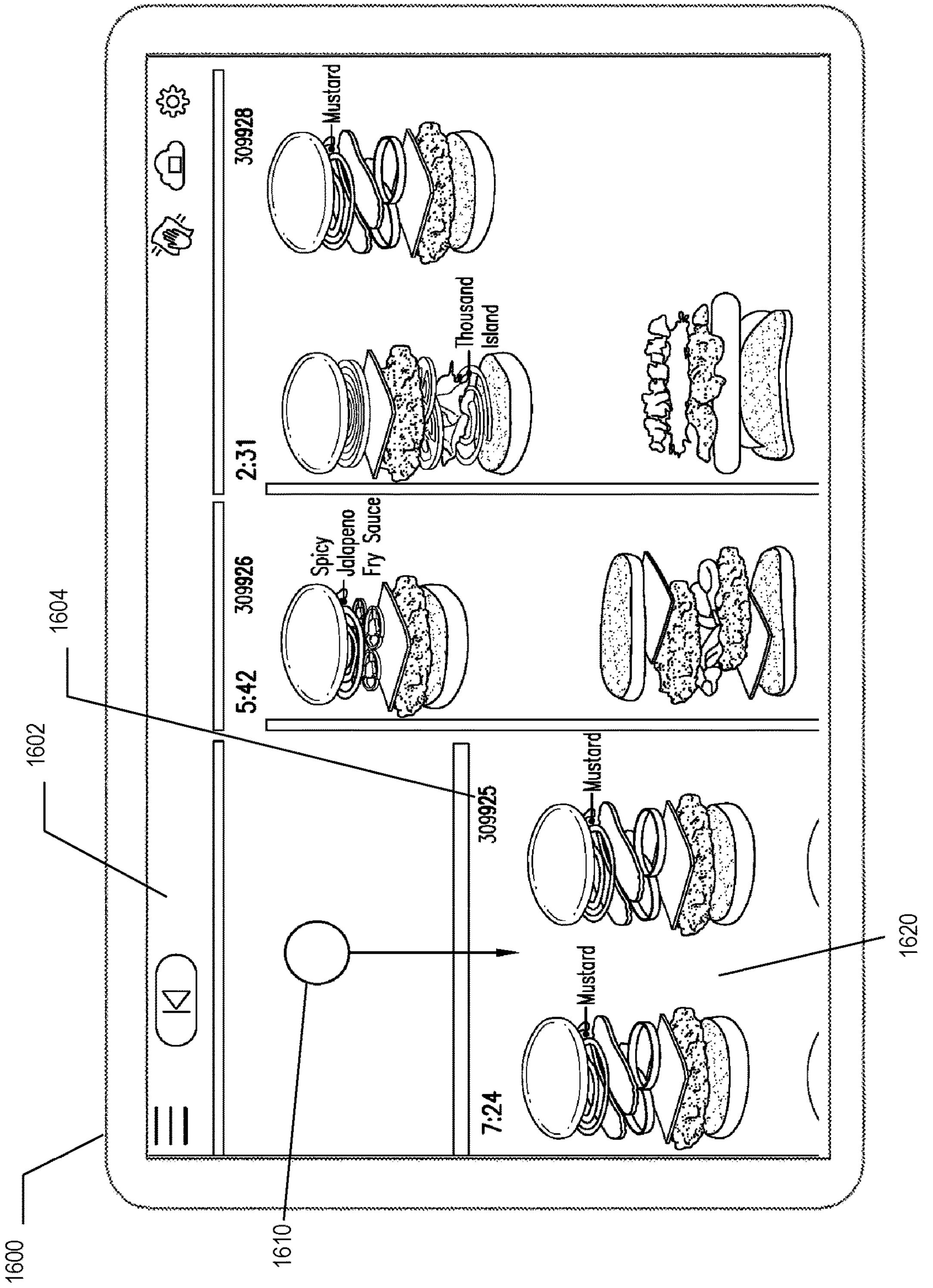
FIG. 16 shows the build station user interface of FIG. 8 with an order that has been built being removed from the user interface with a swipe by the user on the display.

FIG. 16 shows a build station computing device 1600 displaying a build station user interface 1602 with an order 1604 being removed from the user interface 1602 with a swipe by a user. When an order has been built, the user can dismiss the order by swiping 1610 downward within that orders build lane 1620. In embodiment with horizontal lanes, the swipe can be to the left or the right.

FIGS. 50A-50E show a flow chart for method 5000, a method for the build station module 712. On FIG. 50A, method 5000 starts with step 5002, which presents, on a display of the build station computing device, a build station user interface. Step 5004 presents a first build order lane within the build station user interface. Step 5006 presents, within the first build order lane, a graphical representation of a first digital order. Step 5008 presents, as part of presenting the graphical representation of the first digital order, a first digital order number. Step 5010 presents, as part of presenting the graphical representation of the first digital order, a first digital order elapsed time. Step 5012 presents, as part of presenting the graphical representation of the first digital order, a status bar. Step 5014 presents, as part of the graphical representation of the first digital order, a graphical representation of a first digital order item, the first digital order item associated with a first ingredient name, the first ingredient name representing a first ingredient.

Figure 50A:
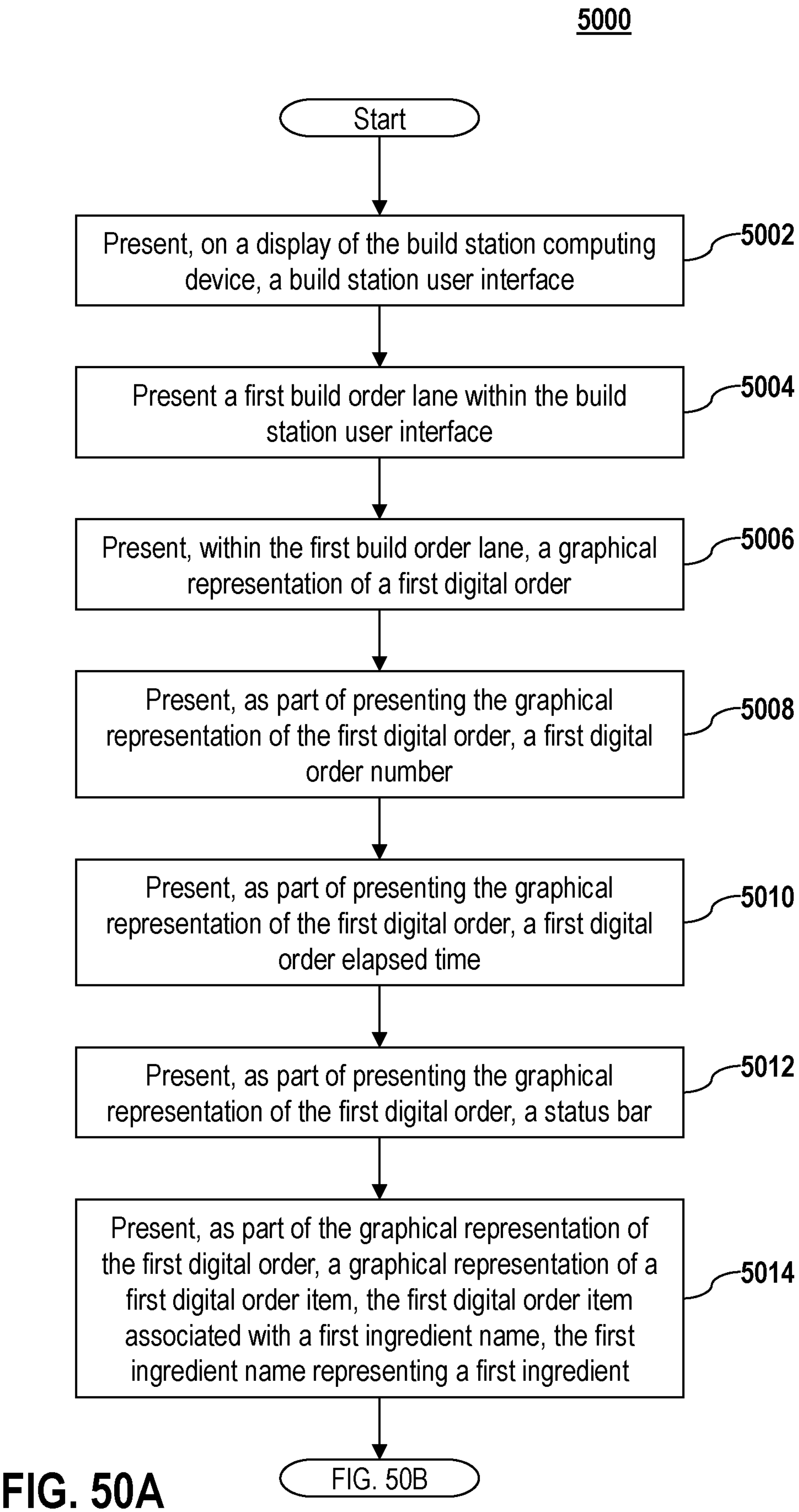
FIGS. 50A-50E show a flow chart for a method for the build station module.
Figure 50B:
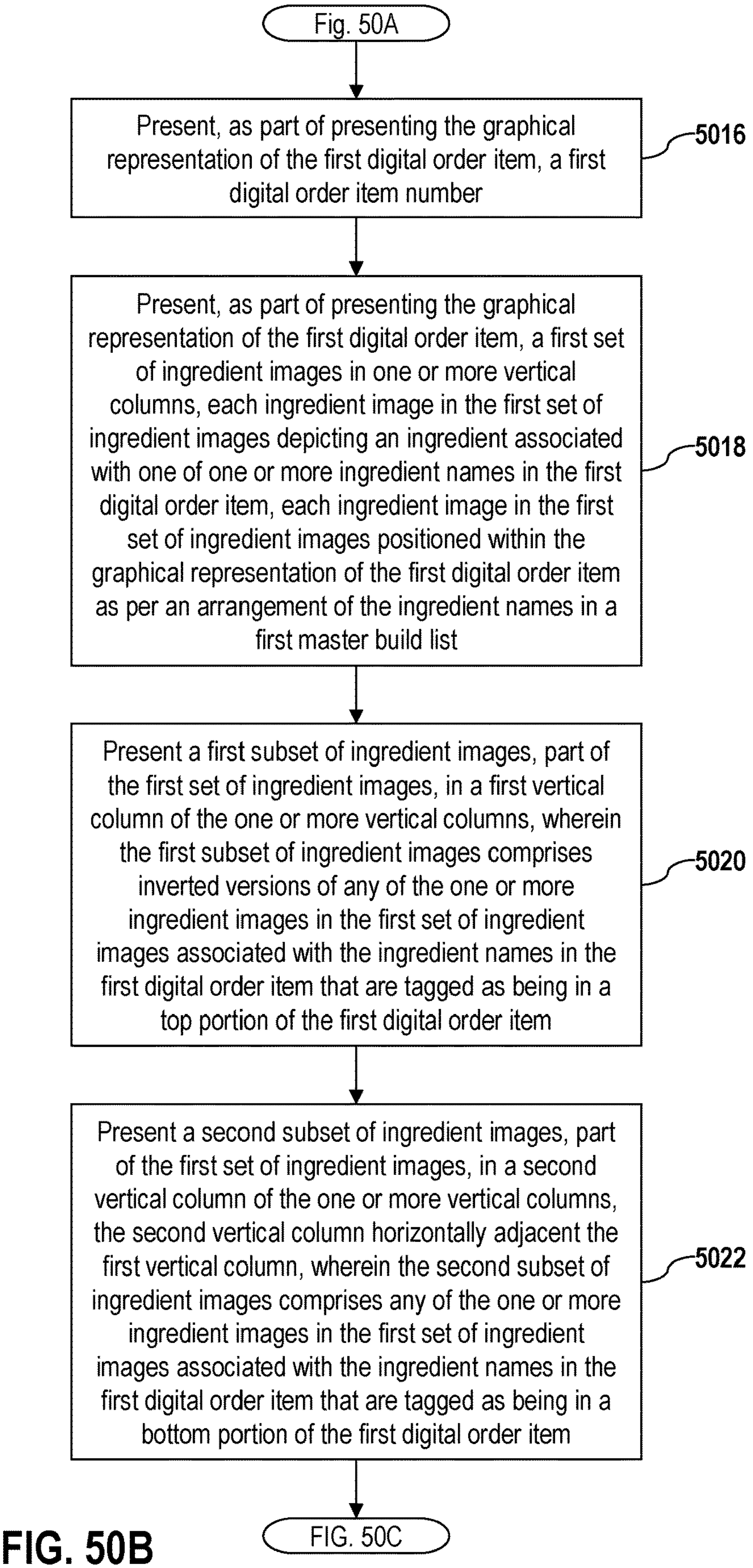

On FIG. 50B, method 5000 continues with step 5016, which presents, as part of presenting the graphical representation of the first digital order item, a first digital order item number. Step 5018 presents, as part of presenting the graphical representation of the first digital order item, a first set of ingredient images in one or more vertical columns. Each ingredient image in the first set of ingredient images depicts an ingredient associated with one of one or more ingredient names in the first digital order item. Each ingredient image in the first set of ingredient images is positioned within the graphical representation of the first digital order item as per an arrangement of the ingredient names in a first master build list. Step 5020 presents a first subset of ingredient images, part of the first set of ingredient images, in a first vertical column of the one or more vertical columns. The first subset of ingredient images comprises inverted versions of any of the one or more ingredient images in the first set of ingredient images associated with the ingredient names in the first digital order item that are tagged as being in a top portion of the first digital order item. Step 5022 presents a second subset of ingredient images, part of the first set of ingredient images, in a second vertical column of the one or more vertical columns. The second vertical column is horizontally adjacent the first vertical column. The second subset of ingredient images comprises any of the one or more ingredient images in the first set of ingredient images associated with the ingredient names in the first digital order item that are tagged as being in a bottom portion of the first digital order item.

Figure 50C:
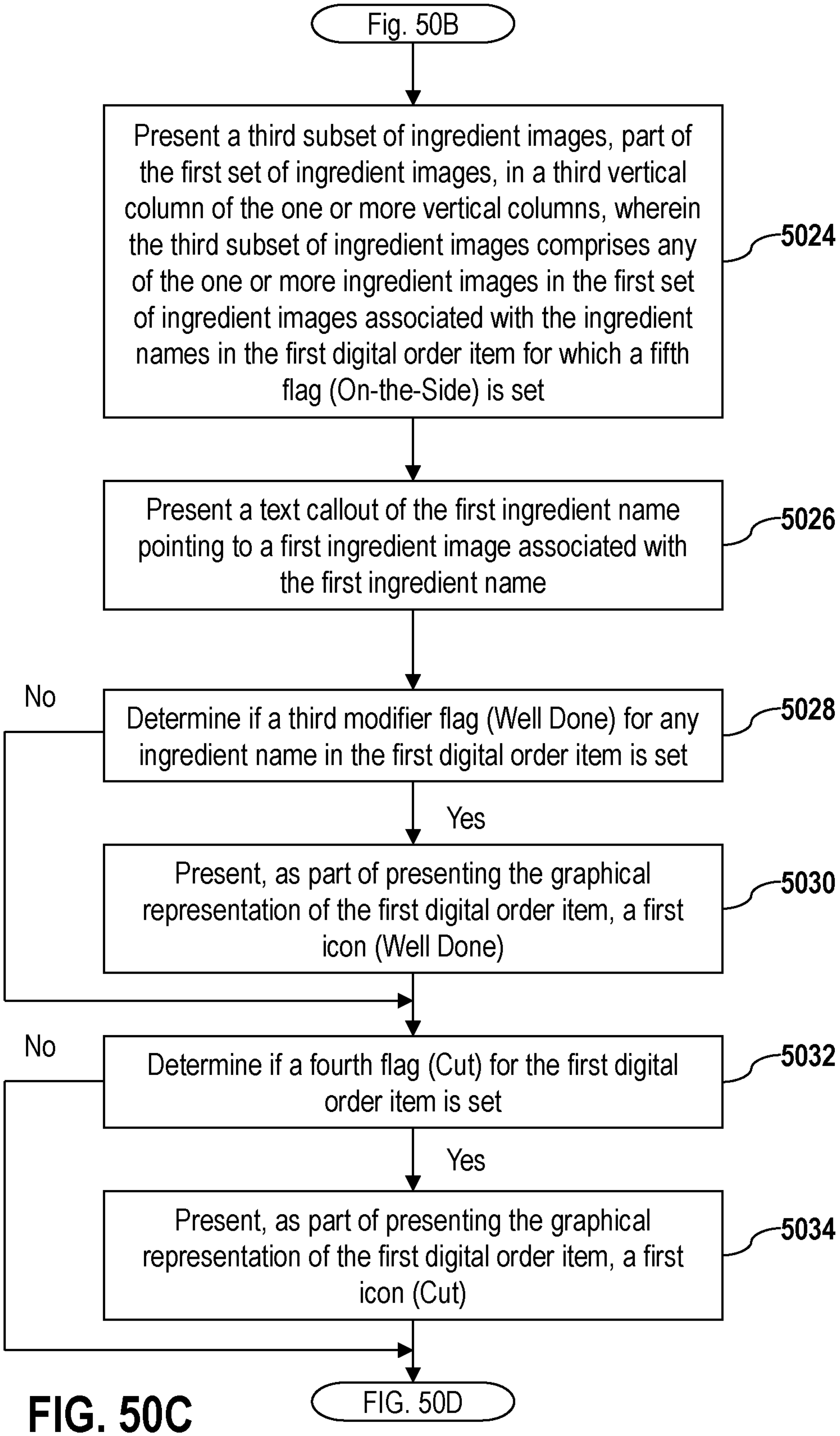
Figure 50D:
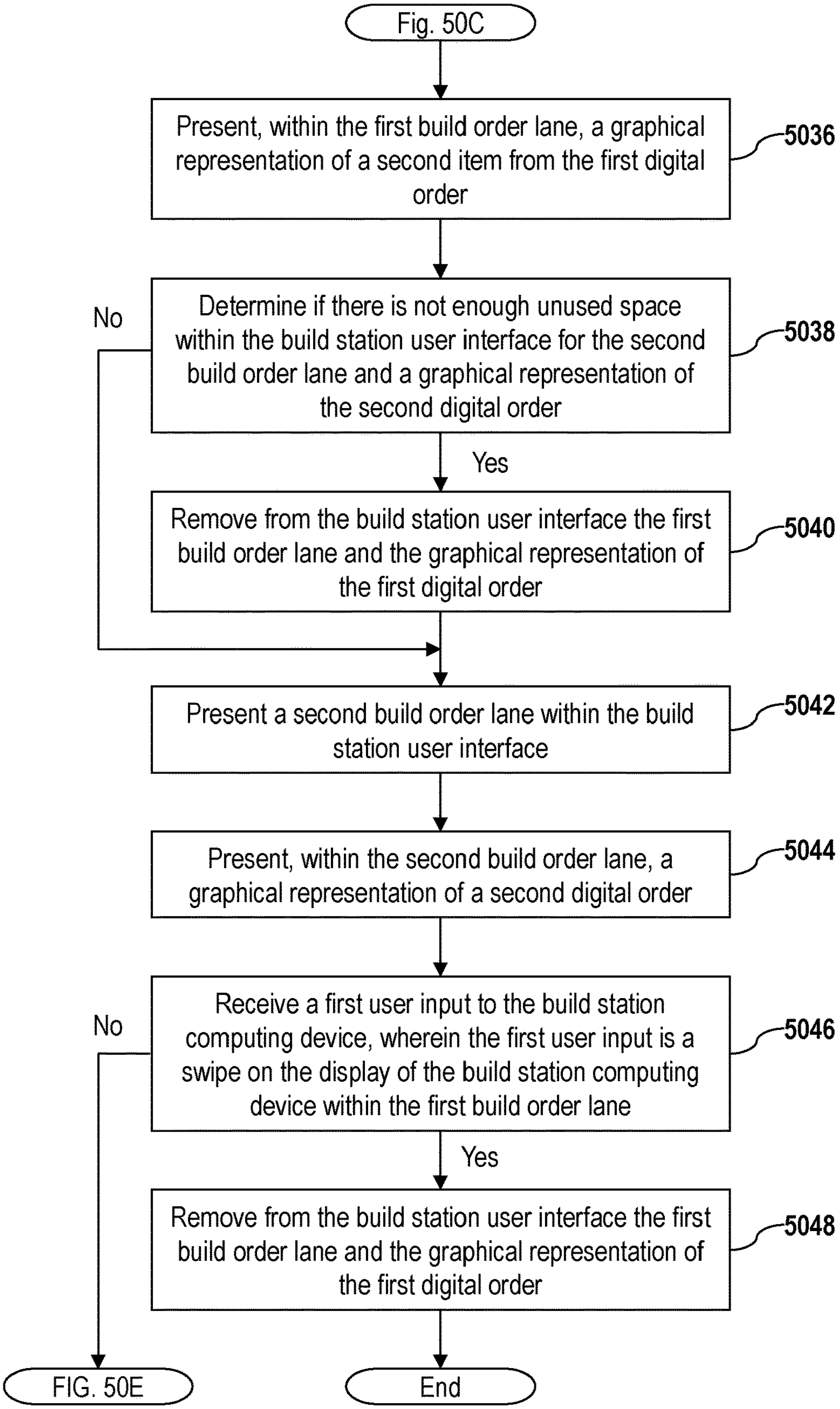

On FIG. 50C, method 5000 continues with step 5024, which presents a third subset of ingredient images in a third vertical column of the one or more vertical columns. The third subset of ingredient images is part of the first set of ingredient images, wherein the third subset of ingredient images comprises any of the one or more ingredient images in the first set of ingredient images associated with the ingredient names in the first digital order item for which a fifth flag (On-the-Side) is set. Step 5026 presents a text callout of the first ingredient name pointing to a first ingredient image associated with the first ingredient name. Step 5028 determines if a third modifier flag (Well Done) for any ingredient name in the first digital order item is set. If NO, then the method 5000 skips to step 5032. If YES, then method 5000 proceeds to step 5030, which presents, as part of presenting the graphical representation of the first digital order item, a first icon (Well Done). Step 5032 determines if a fourth flag (Cut) for the first digital order item is set. If NO, then the method 5000 skips to step 5036 (FIG. 50D). If YES, then method 5000 proceeds to step 5034, which presents, as part of presenting the graphical representation of the first digital order item, a first icon (Cut).

FIG. 50D shows method 5000 continuing with step 5036, which presents, within the first build order lane, a graphical representation of a second item from the first digital order. Step 5038 determines if there is not enough unused space within the build station user interface for the second build order lane and a graphical representation of the second digital order. If NO, there is enough space, then the method 5000 skips to step 5042. If YES, there is not enough space, then method 5000 proceeds to step 5040, which removes from the build station user interface the first build order lane and the graphical representation of the first digital order. Step 5042 presents a second build order lane within the build station user interface. Step 5044 presents, within the second build order lane, a graphical representation of a second digital order. Step 5046 determines whether a first user input to the build station computing device has been received, wherein the first user input is a swipe on the display of the build station computing device within the first build order lane. If NO, no first user input received, then method 5000 skips to step 5050 at the top of FIG. 50E. If YES, a first user input has been received, then method 5000 proceeds to step 5048, which removes from the build station user interface the first build order lane and the graphical representation of the first digital order and terminates method 5000.

Figure 50E:
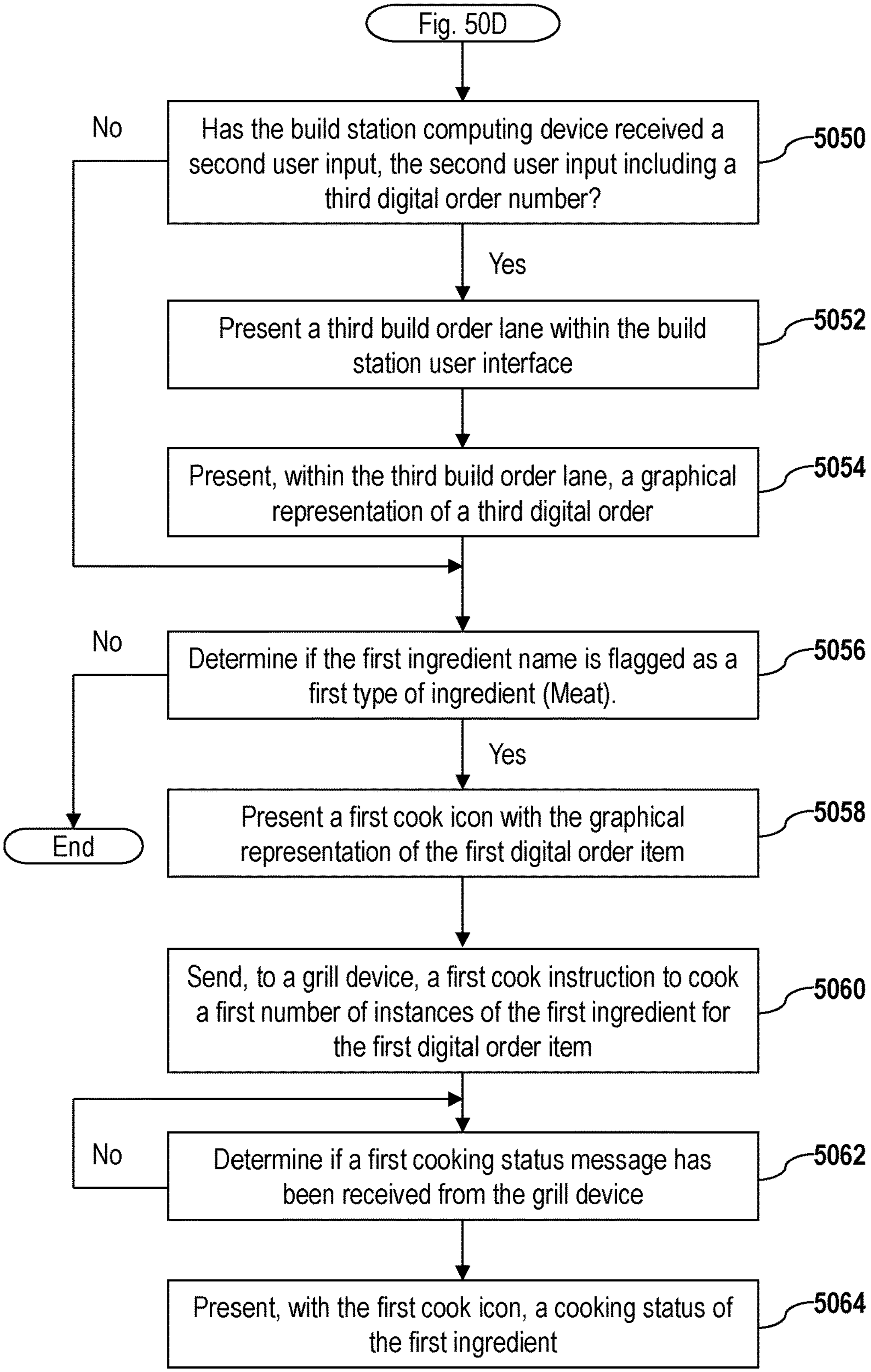

FIG. 50E shows method 5000 continuing with step 5050, which determines whether the build station computing device has received a second user input, the second user input including a third digital order number. If NO, no such input received, then method 5000 skips to step 5056. If YES, the method 5000 proceeds to step 5052, which presents a third build order lane within the build station user interface. Step 5054 presents, within the third build order lane, a graphical representation of a third digital order.

Step 5056 determines if the first ingredient name is flagged as a first type of ingredient (e.g. Meat). If NO, then method 5000 terminates. If YES, then method 5000 proceeds to step 5058, which presents a first cook icon with the graphical representation of the first digital order item. Step 5060 sends, to a grill device, a first cook instruction to cook a first number of instances of the first ingredient for the first digital order item.

Step 5062 determines if a first cooking status message has been received from the grill device. If NO, then method 5000 loops back on step 5062. If YES, then method 5000 proceeds to step 5064, which presents, with the first cook icon, a cooking status of the first ingredient.

Pack Station Module

Figure 37:
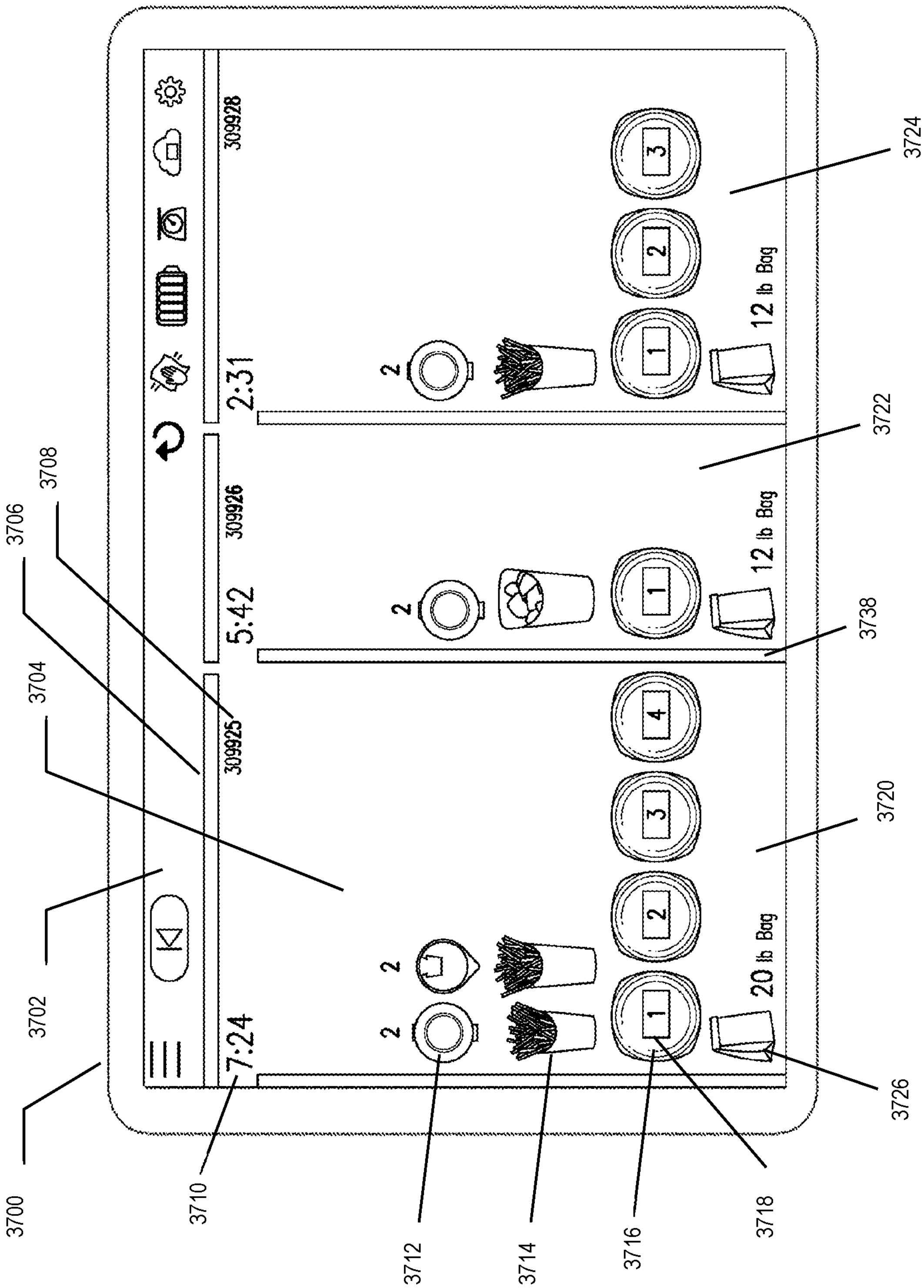
FIG. 37 shows a pack station user interface with multiple pack lanes and multiple items in each lane.

FIG. 37 shows a pack station computing device 3700 displaying a pack station user interface 3702 with multiple order lanes and graphical representations of multiple order items in each lane, each order item displayed in multiple columns. The pack station user interface 3702 is divided into a first pack order lane 3720, a second pack order lane 3722, and a third pack order lane 3724, each displaying a graphical packing guide 3704 for a digital order. The lanes are separated by graphical dividers 3738. A first status bar 3706 is presented over the graphical representation of a first order 3704 along with a first order number 3708, and an elapsed time 37310 for the order. A graphical representation of a first order 3704 is presented in the first pack order lane 3720, with item icons representing the digital order items, including a first item icon 3716 (a burger). Digital order item numbers 3718 are presented on or with some of the item icons. Standard items such as sides and condiments are represented with side item icons 3714 and condiment icons 3712, but are not presented with digital order item numbers. A packing container icon 3726 is displayed in the pack order lane, along with text describing the container (e.g. 20 lb. bag). The item icons (3712, 3714, 3716) are presented in one or more layers within the first pack order lane 3720, a bottom layer representing items to be packed first, a middle layer representing items to be packed second, and a top layer representing items to be packed last. In the exemplary embodiment, the pack lanes are vertical, but in other embodiments, they may be horizontal.

Figure 38:
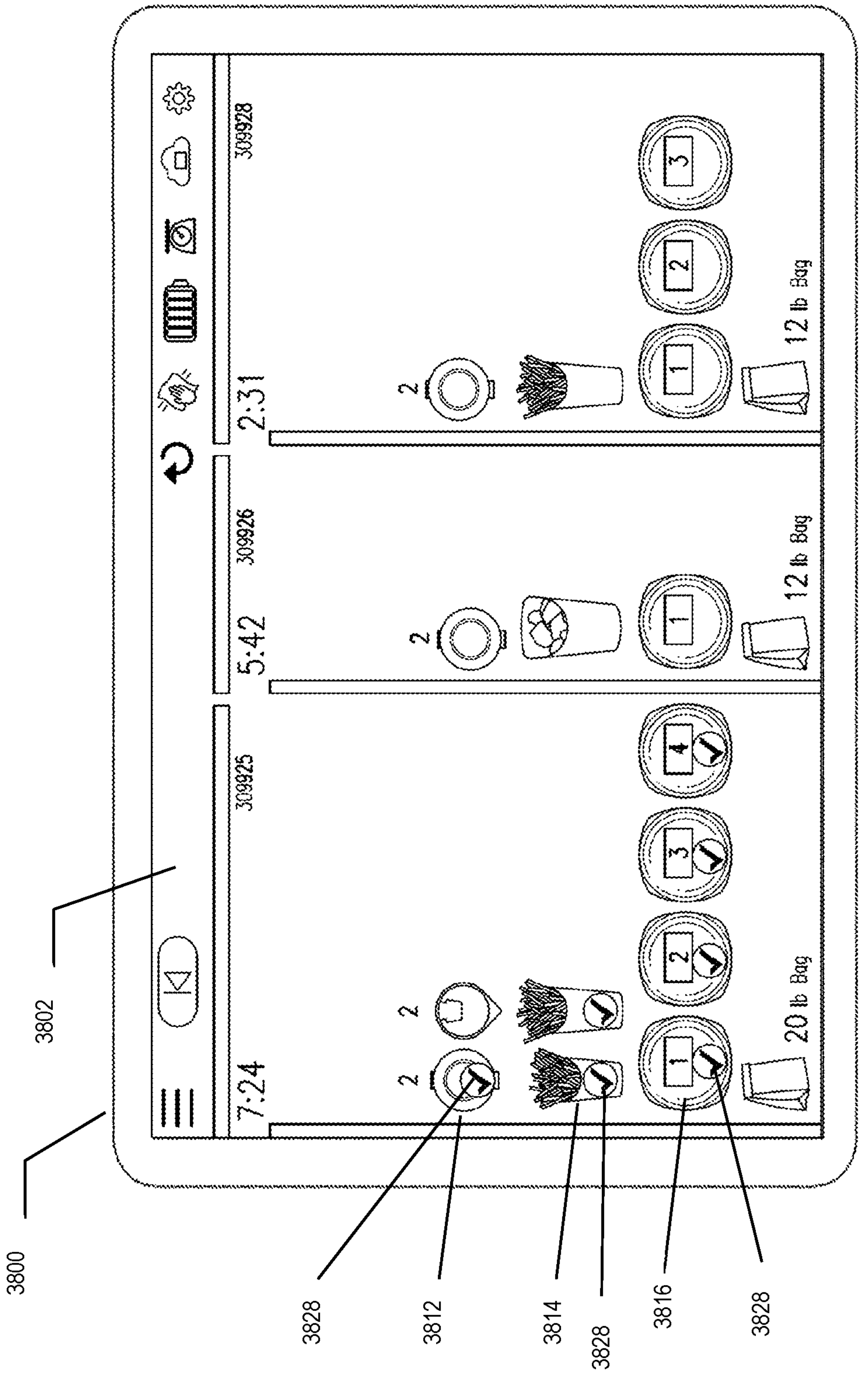
FIG. 38 shows a pack station user interface with multiple items displayed in the first pack lane displayed with check icons.

FIG. 38 shows a pack station computing device 3800 displaying a pack station user interface 3802 with multiple items displayed in the first order pack lane displayed with check icons 3828. As the user packs the order, the user can tap on the icons representing the items packed (e.g. item icon 3816, side icon 3814, condiment icon 3812). A check icon 3828 is placed on each and flagged as being packed.

Figure 39:
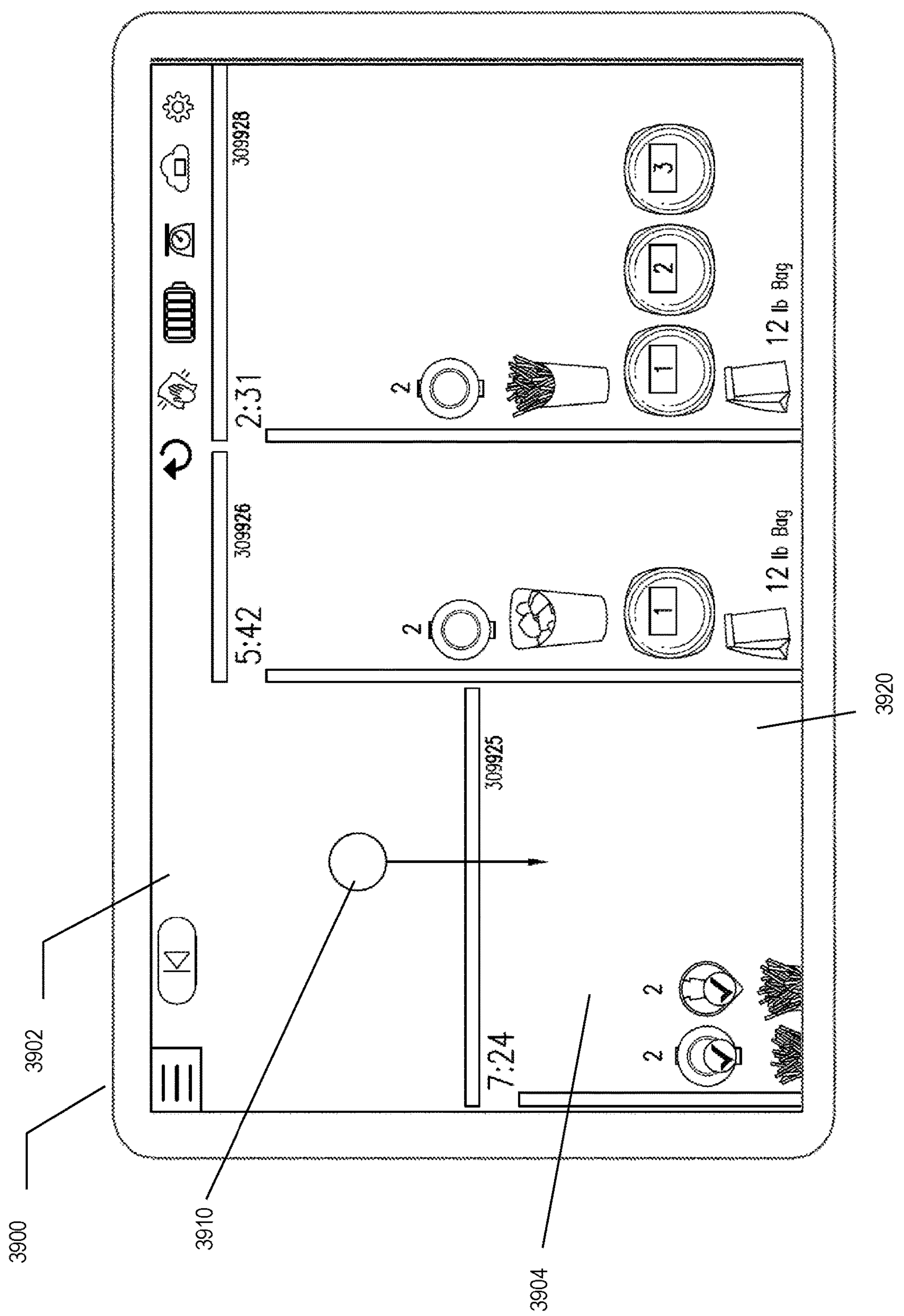
FIG. 39 shows a pack station user interface with a packed order in the first pack lane being removed from the user interface with a swipe by the user on the display.

FIG. 39 shows a pack station computing device 3900 displaying a pack station user interface 3902 with an order 3904 being removed from the user interface 3902 with a swipe by a user. When an order has been packed, the user can dismiss the order by swiping 3910 downward within that order pack lane 3920. The remaining pack order lanes shift left and any waiting order can be presented on the right. In embodiment with horizontal lanes, the swipe can be to the left or the right.

Figure 40:
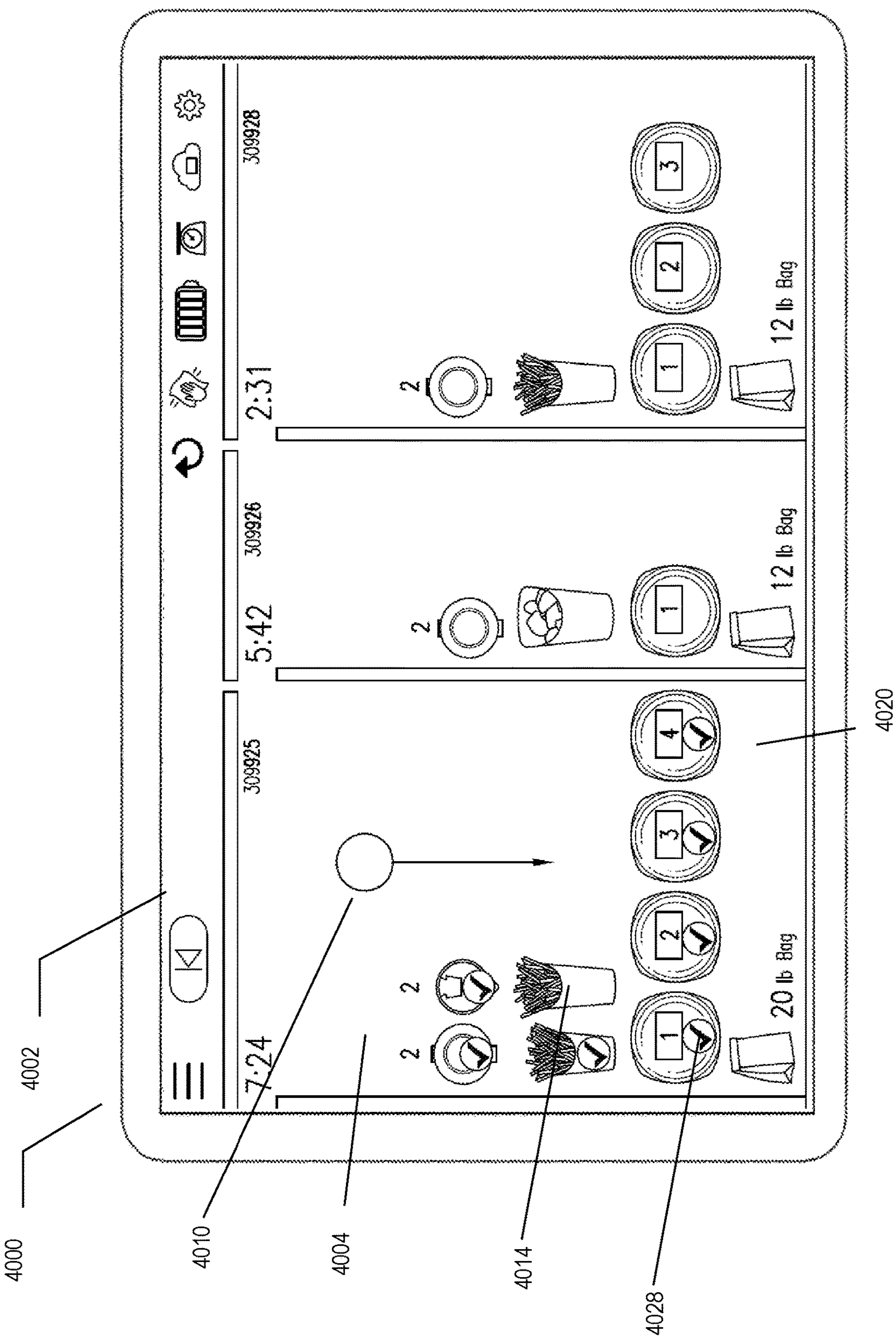
FIG. 40 shows a pack station user interface with an incompletely packed order in the first pack lane that cannot be removed from the user interface with a swipe by the user on the display.

FIG. 40 shows a pack station computing device 4000 displaying a pack station user interface 4002 with an incompletely packed order 4004 in the first order pack lane 4020 that cannot be removed from the user interface 4002 with a swipe by the user. One item icon 4014 in the first order pack lane 4020 does not have a check icon 4028 as all the other item icons do. The pack station computing device 4000 will not let the order 4004 be dismissed until all items have check icons 4028. In some embodiments, pack station computing device 4000 receives a measured weight input from a scale and only allows dismissal of the order if the measured weight input is within an expected weight range for the first digital order.

Figure 41:
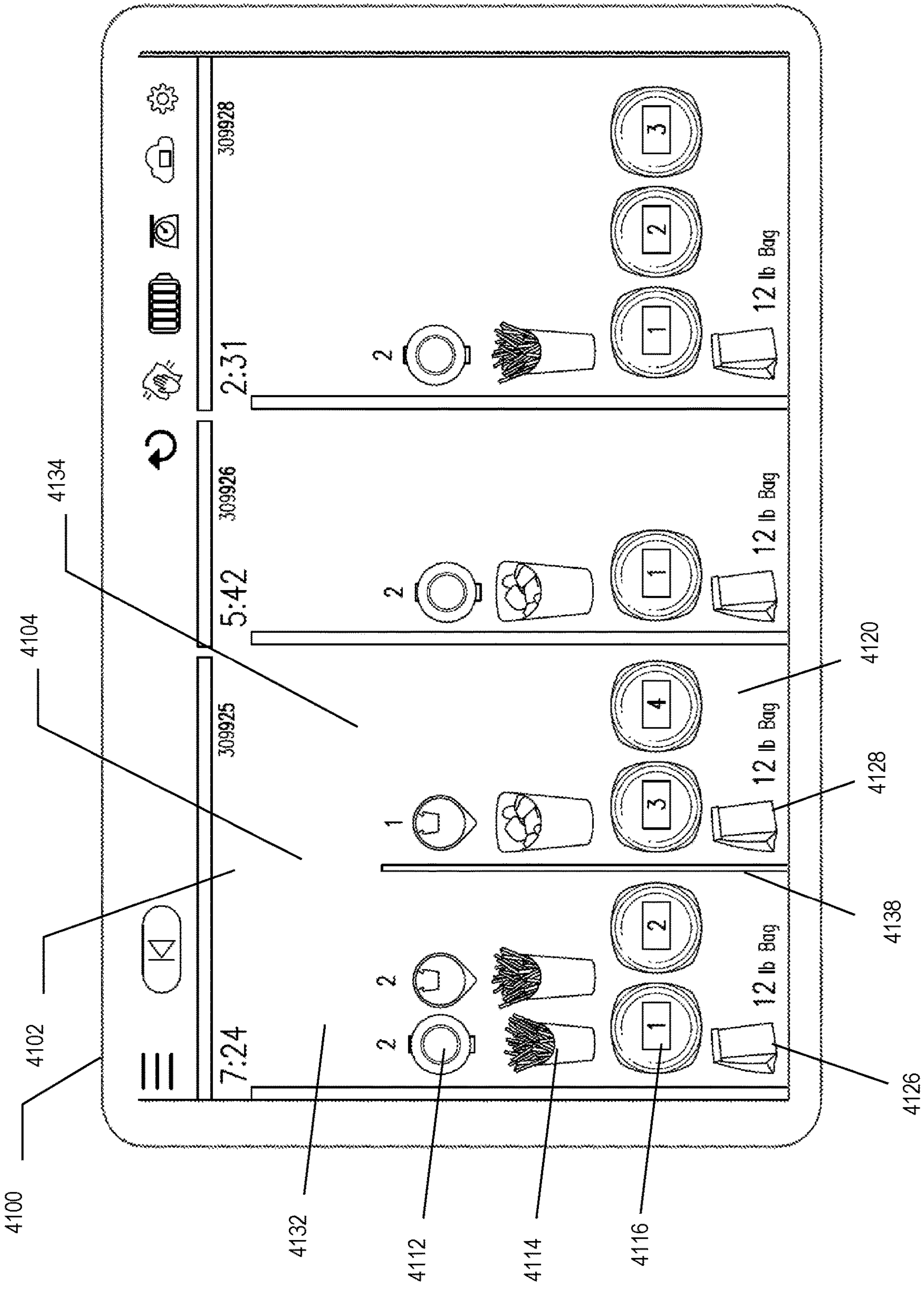
FIG. 41 shows a pack station user interface with a pack lane and order items divided into two portions with a divider between each assigned a different container.

FIG. 41 shows a pack station computing device 4100 displaying a pack station user interface 4102 with a first pack lane 4120 and order items (4112, 4114, 4116) divided into a first portion 4132 and a second portion 4134 with a divider 4138 between them. When the pack station computing device 4100 determines that a digital order has too much weight or volume for the available containers it will split the order and designate the additional containers. Here, the first digital order 4104 is divided into a first container 4126 (12 lb. bag) and a second container 4128.

Figure 51A:
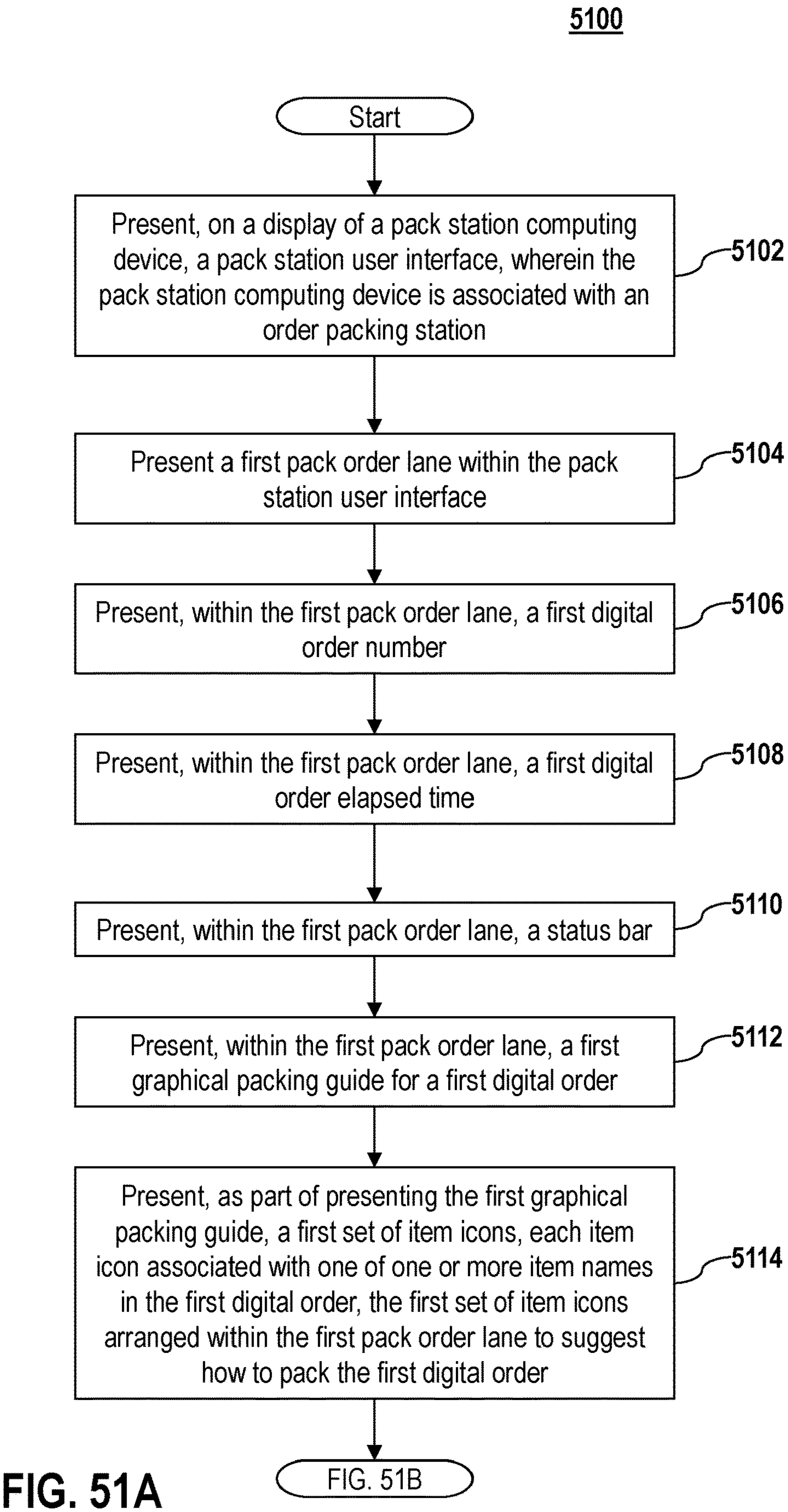
FIGS. 51A-51C show a flow chart for a method for the pack station module.
Figure 51B:
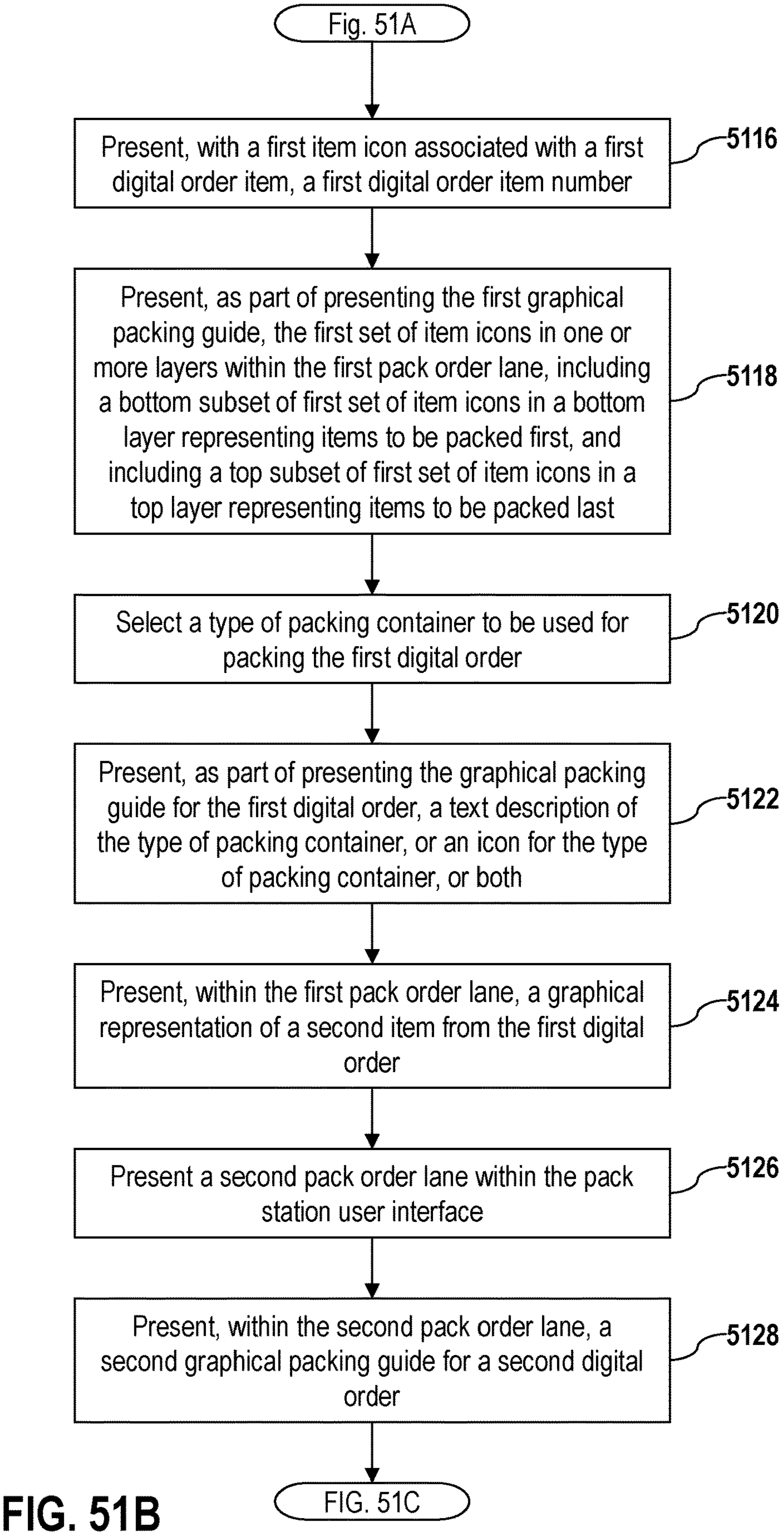
Figure 51C:
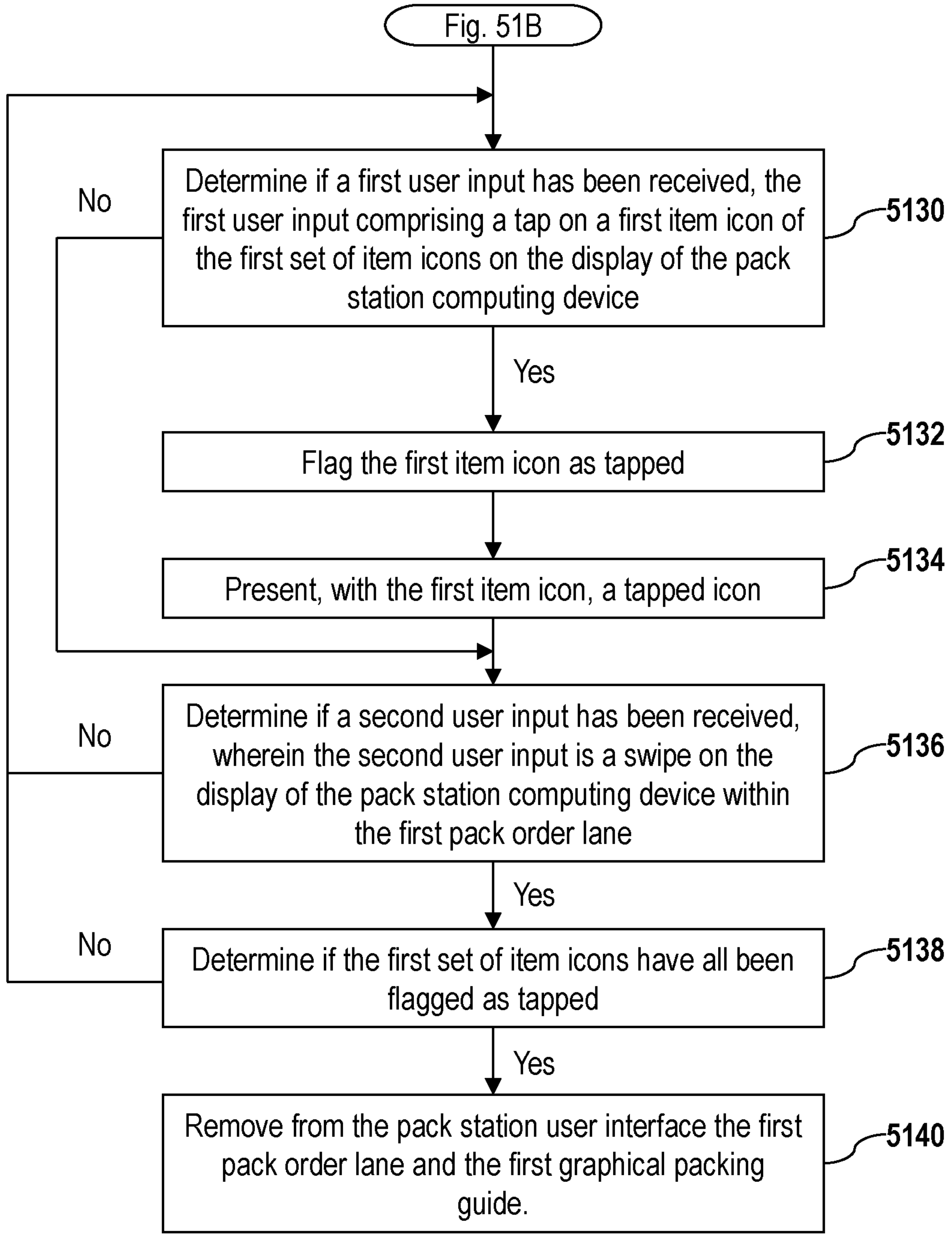

FIGS. 51A-51C show a flow chart for method 5100, a method for the pack station module 716. On FIG. 51A, method 5100 starts with step 5102, which presents, on a display of a pack station computing device, a pack station user interface, wherein the pack station computing device is associated with an order packing station. Step 5104 presents a first pack order lane within the pack station user interface. Step 5106 presents, within the first pack order lane, a first digital order number. Step 5108 presents, within the first pack order lane, a first digital order elapsed time. Step 5110 presents, within the first pack order lane, a status bar. Step 5112 presents, within the first pack order lane, a first graphical packing guide for a first digital order. Step 5144 presents, as part of presenting the first graphical packing guide, a first set of item icons, each item icon associated with one of one or more item names in the first digital order, the first set of item icons arranged within the first pack order lane to suggest how to pack the first digital order.

On FIG. 51B, method 5100 continues with step 5116, which presents, with the first item icon associated with a first digital order item, a first digital order item number. Step 5118 presents, as part of presenting the first graphical packing guide, the first set of item icons in one or more layers within the first pack order lane, including a bottom subset of first set of item icons in a bottom layer representing items to be packed first, and including a top subset of first set of item icons in a top layer representing items to be packed last. Step 5120 selects a type of packing container to be used for packing the first digital order. The selection is made based on the known inventory of the various types of packing containers available and based on the known volume and weight of the items in the first digital order. Step 5122 presents, as part of presenting the graphical packing guide for the first digital order, a text description of the type of packing container, or an icon for the type of packing container, or both. Step 5124 presents, within the first pack order lane, a graphical representation of a second item from the first digital order. Step 5126 presents a second pack order lane within the pack station user interface. Step 5128 presents, within the second pack order lane, a second graphical packing guide for a second digital order.

On FIG. 51C, method 5100 continues with step 5130 which determines if a first user input has been received, the first user input comprising a tap on a first item icon of the first set of item icons on the display of the pack station computing device. If NO, no such input has been received, then method 5100 skips to step 5136. If YES, then method 5100 proceeds to step 5132, which flags the first item icon as tapped. Step 5134 presents, with the first item icon, a tapped icon. This lets the user indicate that the corresponding item has been packed.

Step 5136 Determine if a second user input has been received, wherein the second user input is a swipe on the display of the pack station computing device within the first pack order lane. If NO, no such input has been received, then method 5100 loops back to step 5130. If YES, then method 5100 proceeds to step 5138, which determines if the first set of item icons have all been flagged as tapped. If NO, the items have not all been flagged as tapped, then method 5100 loops back to step 5130. If YES, then method 5100 proceeds to step 5140 removes from the pack station user interface the first pack order lane and the first graphical packing guide.

Figure 52A:
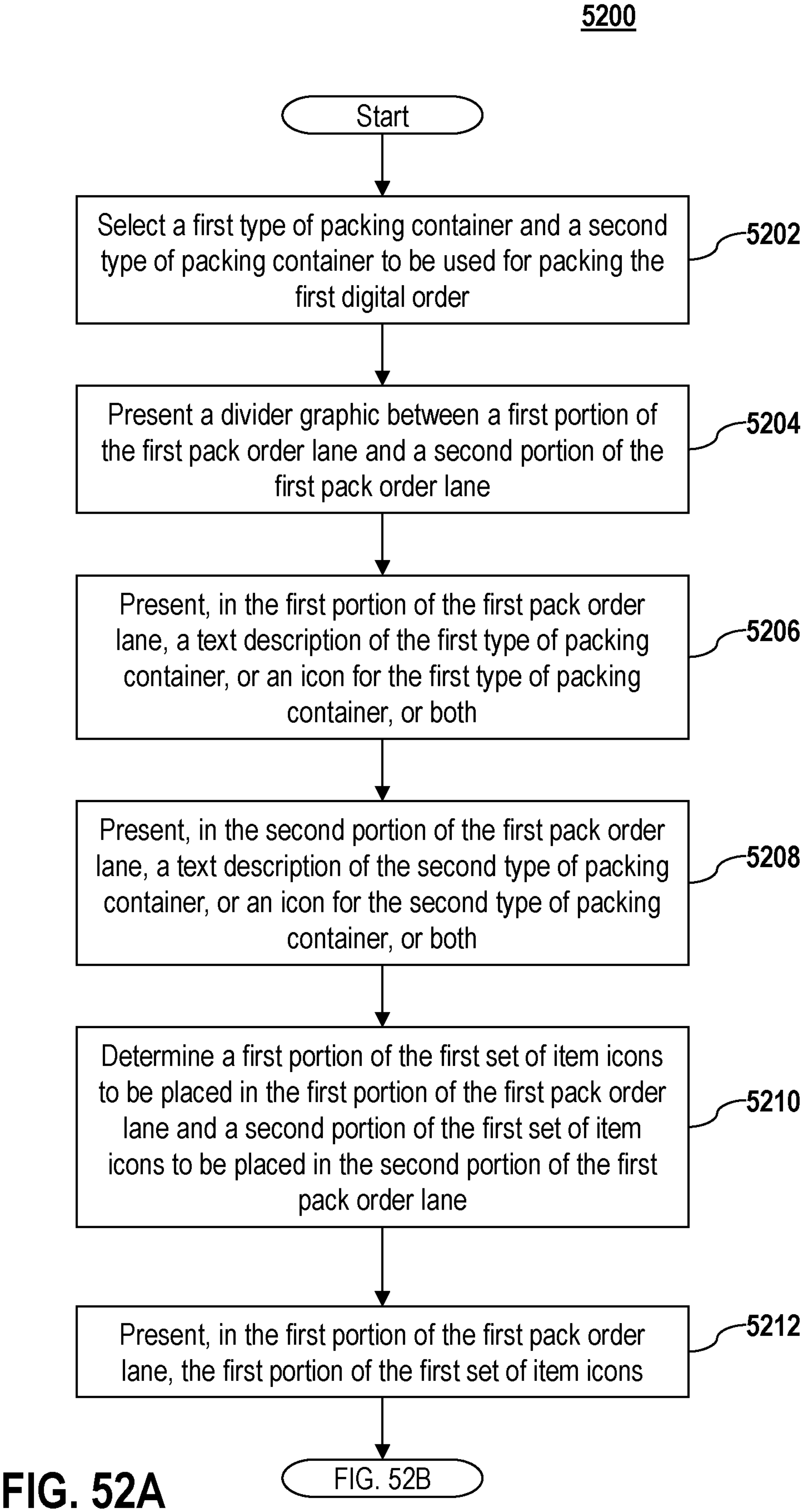
FIGS. 52A-52B show a flow chart for a method for the pack station module regarding packing an order into multiple containers.
Figure 52B:
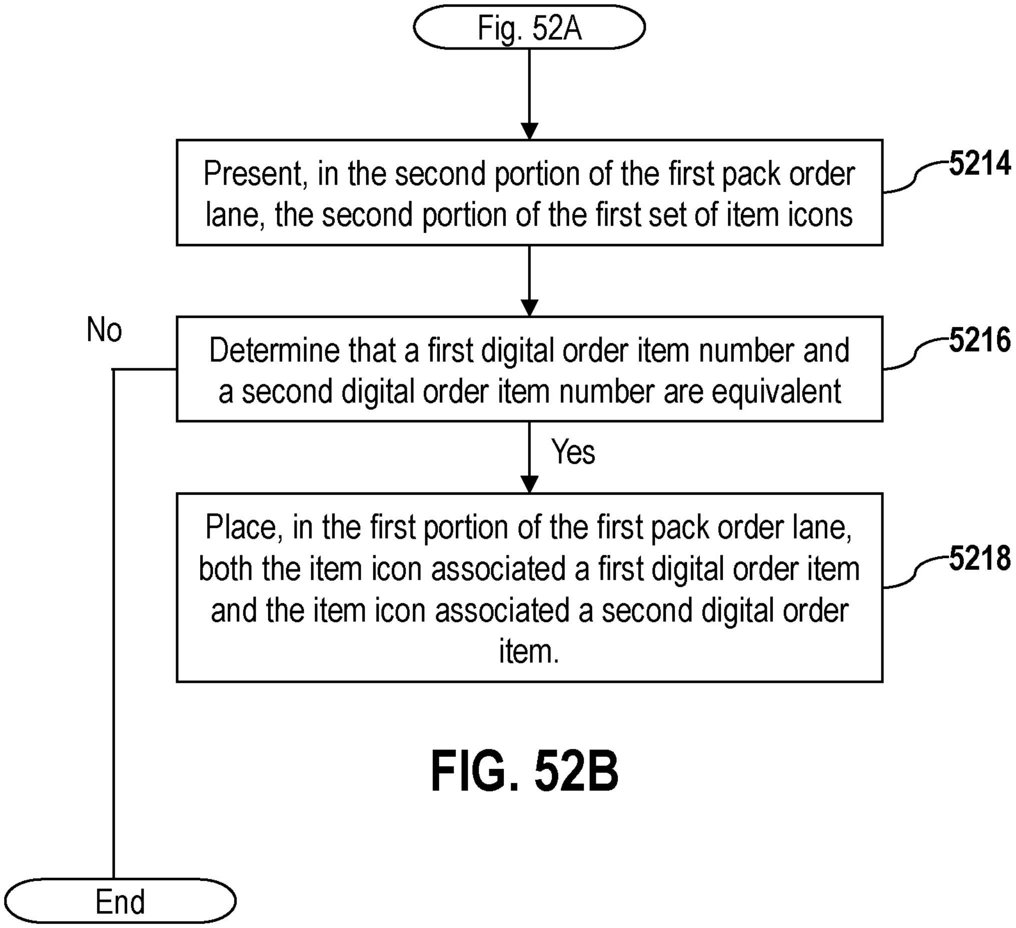

FIGS. 52A-52B show a flow chart for method 5200, a method for the pack station module 716 regarding packing an order into multiple containers. On FIG. 52A, method 5200 starts with step 5202, which selects a first type of packing container and a second type of packing container to be used for packing the first digital order. The pack station module determiners whether to select a second container based on the known weights and volumes of the items in the digital order and the known capacity of the types of containers. Step 5204 presents a divider graphic between a first portion of the first pack order lane and a second portion of the first pack order lane. Step 5206 presents, in the first portion of the first pack order lane, a text description of the first type of packing container, or an icon for the first type of packing container, or both. Step 5208 presents, in the second portion of the first pack order lane, a text description of the second type of packing container, or an icon for the second type of packing container, or both.

Step 5210 determines a first portion of the first set of item icons are to be placed in the first portion of the first pack order lane and a second portion of the first set of item icons to be placed in the second portion of the first pack order lane. Item icons are placed based on the known weights and volumes of the items in the digital order and the known capacity of the types of containers. Step 5212 presents, in the first portion of the first pack order lane, the first portion of the first set of item icons.

On FIG. 52B, method 5200 starts with step 5214, which presents, in the second portion of the first pack order lane, the second portion of the first set of item icons. Step 5216 determines if a first digital order item number and a second digital order item number are equivalent. If NO, method 5200 terminates. If YES, method 5200 proceeds to step 5218, which places, in the first portion of the first pack order lane, both the item icon associated a first digital order item and the item icon associated a second digital order item. This ensures subitems are placed in the same portion of the same pack order lane as their associated order item.

Figure 53:
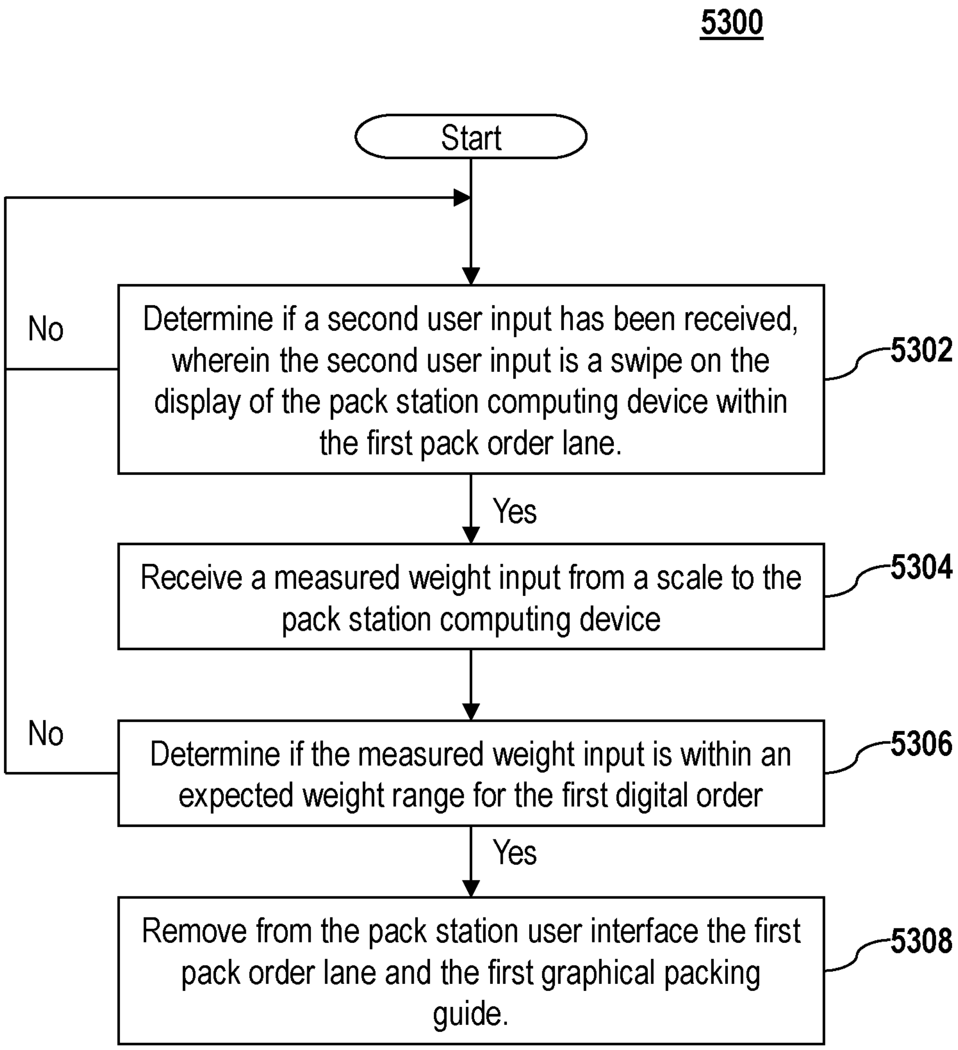
FIG. 53 shows a flow chart for a method for the pack station module regarding ensuring an order is packed by comparing measured and expected weights.

FIG. 53 shows a flow chart for method 5300, a method for the pack station module 716 regarding ensuring an order is packed by comparing measured and expected weights. Method 5300 starts with step 5302, which determines if a second user input has been received, wherein the second user input is a swipe on the display of the pack station computing device within the first pack order lane. If NO, then method 5300 loops back to step 5302. If YES, then method 5300 proceeds to step 5304, which receives a measured weight input from a scale to the pack station computing device. Step 5306 determines if the measured weight input is within an expected weight range for the first digital order. If NO, then method 5300 loops back to step 5302. If YES, then method 5300 proceeds to step 5308, which removes from the pack station user interface the first pack order lane and the first graphical packing guide.

Figure 54:
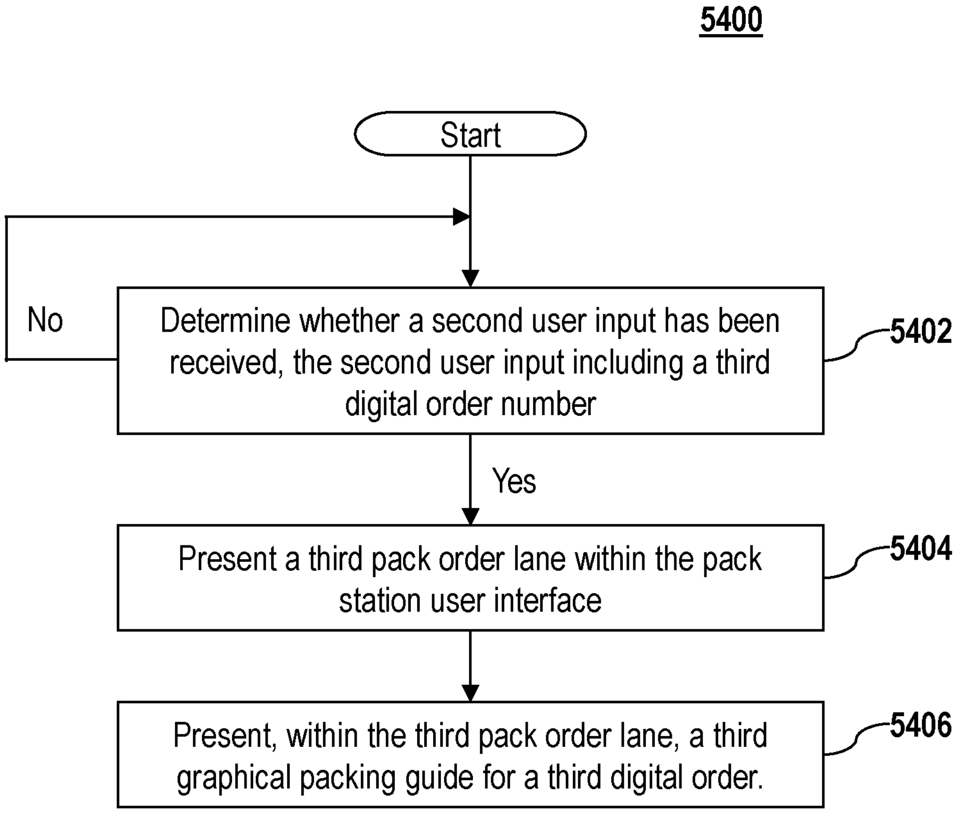
FIG. 54 shows a flow chart for a method for the pack station module regarding user input to call up a particular order by digital order number.

FIG. 54 shows a flow chart for method 5400, a method for the pack station module 716 regarding user input to call up a particular order by digital order number. Method 5400 starts with step 5402, which determines whether a second user input has been received, the second user input including a third digital order number. If NO, then method 5400 loops back to step 5402. If YES, then method 5400 proceeds to step 5404. which presents a third pack order lane within the pack station user interface. Step 5406 presents, within the third pack order lane, a third graphical packing guide for a third digital order.

Figure 55:
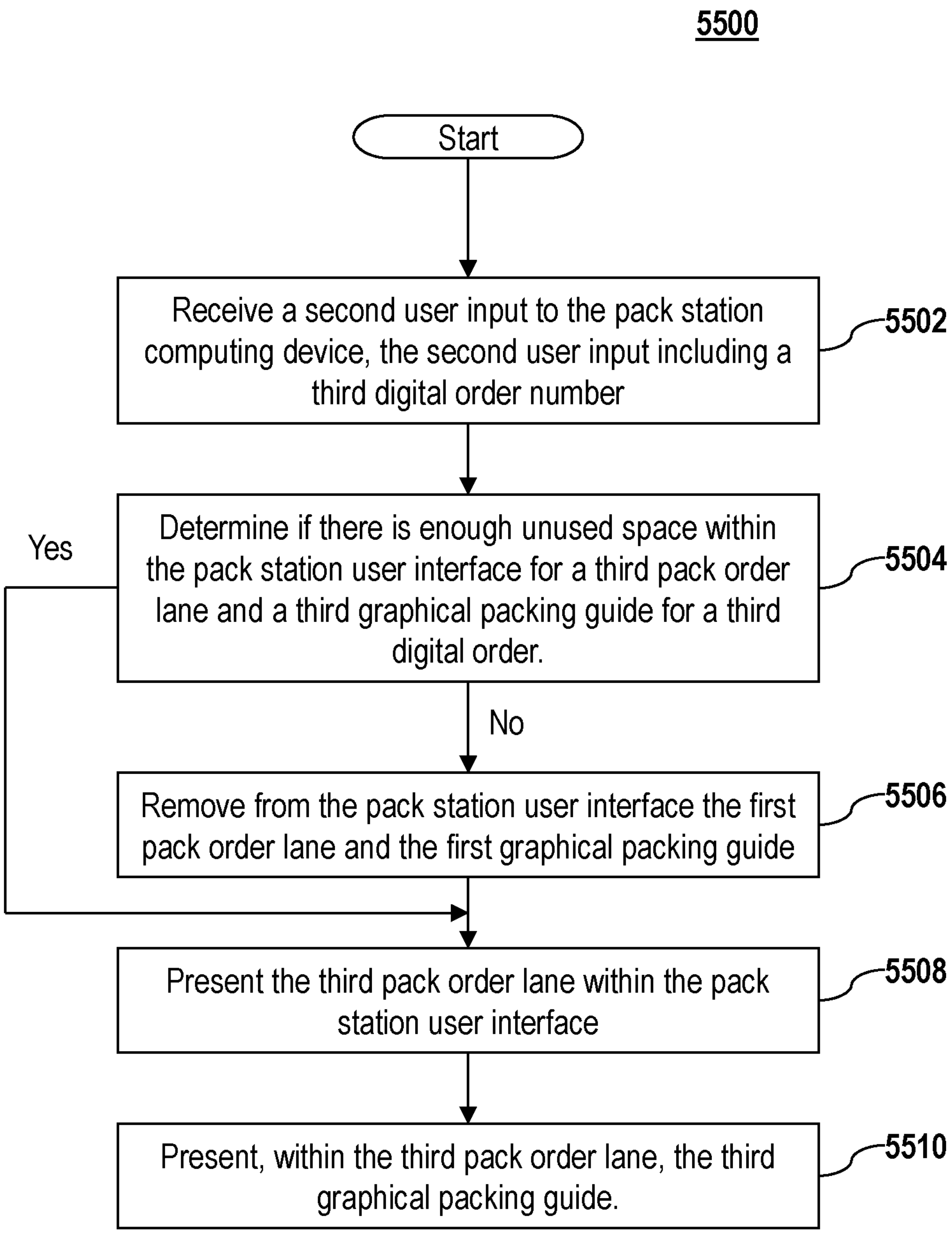
FIG. 55 shows a flow chart for a method for the pack station module regarding bumping a pack order lane and digital order to make room on the display for another digital order.

FIG. 55 shows a flow chart for method 5500, a method for the pack station module 716 regarding bumping a pack order lane and digital order to make room on the display for another digital order. Method 5400 starts with step 5502, which receives a second user input to the pack station computing device, the second user input including a third digital order number.

Step 5504 determines if there is enough unused space within the pack station user interface for a third pack order lane and a third graphical packing guide for a third digital order. If YES, then method 5500 skips to step 5508. If NO, then method 5500 proceeds to step 5506, which removes from the pack station user interface the first pack order lane and the first graphical packing guide. Step 5508 presents the third pack order lane within the pack station user interface. Step 5510 presents, within the third pack order lane, the third graphical packing guide.

What is claimed is:

1. A method for a grill station computing device in a commercial kitchen comprising the steps of:

presenting, on a display of the grill station computing device, a grill station user interface;

presenting a plurality of grill lanes including a first grill lane within the grill station user interface, wherein each grill lane is a unique portion of the grill station user interface representing a unique portion of a surface of a grill, the first grill lane divided between a first queue grill lane and a first active grill lane;

determining a first number of instances of a first ingredient to be cooked, the first ingredient associated with a first ingredient name;

determining a current status of each of the plurality of grill lanes;

selecting the first grill lane for grilling the first ingredient based on the current status of the plurality of grill lanes;

presenting, in the first queued grill lane, a first grill ingredient icon associated with the first ingredient name;

presenting, with the first grill ingredient icon, a first grill icon quantity set to the first number of instances;

receiving a first user input selecting the first grill ingredient icon;

moving the first grill ingredient icon to the first active grill lane;

timing down a first grill ingredient timer from a first ingredient cook timer start value; and presenting a real-time value of the first grill ingredient timer with the first grill ingredient icon.

2. The method of claim 1, wherein the first user input is a first tap on the first grill ingredient icon on the display of the grill station computing device.

3. The method of claim 1, wherein presenting the first grill ingredient icon further comprises the step of:

presenting the first ingredient name with the first grill ingredient icon.

4. The method of claim 1, further comprising the step of:

sending a first cooking status message to a build station device with the real-time value of the first grill ingredient timer and a first digital order item number.

5. The method of claim 1, wherein determining the first number of instances of the first ingredient to be cooked further comprises the steps of:

searching a first digital order item for ingredient names that are tagged for grilling; and determining the first number of instances of the first ingredient to be cooked by counting instances of the first ingredient name in the first digital order item that are tagged for grilling.

6. The method of claim 1, wherein determining the first number of instances of the first ingredient to be cooked for the first digital order item further comprises the steps of:

receiving, from a build station device, as part of determining the first number of instances of a first ingredient to be cooked for a first digital order item, a first cook instruction to cook the first number of instances of the first ingredient for the first digital order item.

7. The method of claim 1, further comprising the steps of:

detecting that the first grill ingredient timer has completed timing down from the first ingredient cook timer start value;

presenting a flip icon with the first grill ingredient icon;

receiving a second user input selecting the first grill ingredient icon, wherein the second user input is a second tap on the first grill ingredient icon;

removing the flip icon;

timing down the first grill ingredient timer from a first ingredient flip side timer start value; and presenting the real-time value of the first grill ingredient timer with the first grill ingredient icon.

8. The method of claim 7, further comprising the steps of:

detecting that the first grill ingredient timer has completed the timing down from the first ingredient flip side timer start value; and presenting a done icon with the first grill ingredient icon.

9. The method of claim 8, further comprising the step of:

sending a second cooking status message to a build station device that the first ingredient for the first digital order item is done.

10. The method of claim 8, further comprising the step of:

receiving a third user input selecting the first grill ingredient icon, wherein the third user input is a third tap on the first grill ingredient icon; and removing the first grill ingredient icon.

11. The method of claim 10, further comprising the step of:

sending a third cooking status message to a build station device that the first number of instances of the first ingredient for the first digital order item have been moved to a transfer area.

12. The method of claim 1, further comprising the steps of:

determining that a modifier flag is set, the modifier flag associated with any instance of the first ingredient name in the first digital order item; and presenting, with the first grill ingredient icon, a first grill modifier icon.

13. A grill station computing device comprising:

a display;

one or more processors; and one or more computer-readable media storing computer-executable instructions that, when executed, cause the one or more processors to perform acts comprising:

presenting, on a display of the grill station computing device, a grill station user interface;

presenting a first grill lane within the grill station user interface, the first grill lane one of a plurality of grill lanes, wherein each grill lane is a unique portion of the grill station user interface representing a unique portion of a surface of a grill, each of the plurality of grill lanes divided into a queue grill lane and an active grill lane, the first grill lane divided between a first queue grill lane and a first active grill lane;

determining a first number of instances of a first ingredient to be cooked, the first ingredient associated with a first ingredient name;

determining a current status of each of the plurality of grill lanes;

selecting the first grill lane for grilling the first ingredient based on the current status of the plurality of grill lanes;

presenting, in the first queued grill lane, a first grill ingredient icon associated with the first ingredient name;

presenting, with the first grill ingredient icon, a first grill icon quantity set to the first number of instances;

receiving a first user input selecting the first grill ingredient icon;

moving the first grill ingredient icon to the first active grill lane;

timing down a first grill ingredient timer from a first ingredient cook timer start value; and presenting a real-time value of the first grill ingredient timer with the first grill ingredient icon.

14. The grill station computing device as recited in claim 13, wherein the first user input is a first tap on the first grill ingredient icon on the display of the grill station computing device.

15. The grill station computing device as recited in claim 13, wherein presenting the first grill ingredient icon further comprises the step of:

presenting the first ingredient name with the first grill ingredient icon.

16. The grill station computing device as recited in claim 13, the instructions further comprising the step of:

sending a first cooking status message to a build station device with the real-time value of the first grill ingredient timer and a first digital order item number.

17. The grill station computing device as recited in claim 13, wherein determining the first number of instances of the first ingredient to be cooked further comprises the steps of:

searching a first digital order item for ingredient names that are tagged for grilling; and determining the first number of instances of the first ingredient to be cooked by counting instances of the first ingredient name in the first digital order item that are tagged for grilling.

18. The grill station computing device as recited in claim 13, wherein determining the first number of instances of the first ingredient to be cooked for the first digital order item further comprises the steps of:

receiving, from a build station device, as part of determining the first number of instances of a first ingredient to be cooked for a first digital order item, a first cook instruction to cook the first number of instances of the first ingredient for the first digital order item.

19. The grill station computing device as recited in claim 13, the instructions further comprising the steps of:

detecting that the first grill ingredient timer has completed timing down from the first ingredient cook timer start value;

presenting a flip icon with the first grill ingredient icon;

receiving a second user input selecting the first grill ingredient icon, wherein the second user input is a second tap on the first grill ingredient icon;

removing the flip icon;

timing down the first grill ingredient timer from a first ingredient flip side timer start value; and presenting the real-time value of the first grill ingredient timer with the first grill ingredient icon.

20. The grill station computing device as recited in claim 13, the instructions further comprising the steps of:

detecting that the first grill ingredient timer has completed the timing down from the first ingredient flip side timer start value; and presenting a done icon with the first grill ingredient icon.

21. The grill station computing device as recited in claim 13, the instructions comprising the step of:

sending a second cooking status message to a build station device that the first ingredient for the first digital order item is done.

22. The method of claim 1, wherein presenting the plurality of grill lanes further includes presenting one or more border lines within the grill station user interface, the one or more border lines dividing at least a portion of the grill station user interface into the plurality of grill lanes; and wherein presenting the plurality of grill lanes further includes presenting a plurality of dividing lines within the grill station user interface, each of the plurality of grill lanes with one of the dividing lines presented therein between the queue grill lane and the active grill lane.

23. The method of claim 22, wherein presenting a plurality of grill lanes further includes presenting a first dividing line between the first queue grill lane and the first active grill lane;

wherein presenting a plurality of grill lanes further includes presenting a second grill lane within the grill station user interface, wherein the second grill lane is divided between a second queue grill lane and a second active grill lane, and presenting a second dividing line between the second queue grill lane and the second active grill lane; and wherein presenting a plurality of grill lanes further includes presenting a first border line between the first grill lane and the second grill lane.

24. The method of claim 22, wherein the plurality of grill lanes presented on the grill station interface correspond to lanes on a physical grill.

* * * * *